US009292866B2

(12) United States Patent
Allaire et al.

(10) Patent No.: US 9,292,866 B2
(45) Date of Patent: Mar. 22, 2016

(54) DISTRIBUTION OF CONTENT

(75) Inventors: Jeremy Allaire, Chestnut Hill, MA (US); Robert Mason, Lincoln, MA (US)

(73) Assignee: Brightcove Inc., Boston, MA (US)

( * ) Notice: Subject to any disclaimer, the term of this patent is extended or adjusted under 35 U.S.C. 154(b) by 1172 days.

(21) Appl. No.: 13/051,282

(22) Filed: Mar. 18, 2011

(65) Prior Publication Data
US 2011/0166918 A1 Jul. 7, 2011

Related U.S. Application Data

(62) Division of application No. 11/202,683, filed on Aug. 12, 2005, now Pat. No. 7,925,973.

(51) Int. Cl.
*G06F 17/00* (2006.01)
*G06Q 30/06* (2012.01)
*G06F 17/30* (2006.01)
*G06Q 30/02* (2012.01)

(52) U.S. Cl.
CPC .......... *G06Q 30/06* (2013.01); *G06F 17/30038* (2013.01); *G06Q 30/0239* (2013.01); *G06Q 30/0273* (2013.01); *G06Q 30/0274* (2013.01); *G06Q 30/0601* (2013.01); *G06Q 30/0631* (2013.01)

(58) Field of Classification Search
CPC ................................................. G06F 17/30038
USPC ......... 715/200, 201, 203, 204, 243, 246, 248, 715/253
See application file for complete search history.

(56) References Cited

U.S. PATENT DOCUMENTS

| 5,629,980 A | 5/1997 | Stefik et al. |
| 5,745,879 A | 4/1998 | Wyman |
| 6,144,991 A | 11/2000 | England |
| 6,173,317 B1 | 1/2001 | Chaddha et al. |

(Continued)

FOREIGN PATENT DOCUMENTS

| EP | 1338987 | 8/2003 |
| JP | 2009-505239 A | 2/2009 |

(Continued)

OTHER PUBLICATIONS

International Search Report and Written Opinion for corresponding International Application No. PCT/US06/31444, 6 pages.

(Continued)

*Primary Examiner* — Gregory J Vaughn
(74) *Attorney, Agent, or Firm* — Kilpatrick Townsend & Stockton LLP

(57) ABSTRACT

Among other things, publishers of digital content are enabled each to define, for each of one or more digital content items, a style in which the digital content item is to be presented to a user and a condition under which the user may have the digital content item presented. The digital content items are stored in a content library, the styles and conditions associated with the digital content items are stored in a server. Each of the digital content items is enabled to be presented to users within presentation contexts that are accessible to the users and controlled by presentation context providers. The presentation of the digital content items includes obtaining the digital content items from the server and controlling the presentation to occur under the conditions and in the styles defined by the publishers.

11 Claims, 53 Drawing Sheets

(56) References Cited

U.S. PATENT DOCUMENTS

| | | | |
|---|---|---|---|
| 6,240,555 B1 | 5/2001 | Shoff et al. | |
| 6,772,209 B1 | 8/2004 | Chernock et al. | |
| 6,983,371 B1* | 1/2006 | Hurtado et al. | 713/189 |
| 7,110,984 B1* | 9/2006 | Spagna et al. | 705/57 |
| 7,188,085 B2* | 3/2007 | Pelletier | 705/50 |
| 7,206,748 B1* | 4/2007 | Gruse et al. | 705/51 |
| 7,213,005 B2* | 5/2007 | Mourad et al. | 705/64 |
| 7,269,564 B1* | 9/2007 | Milsted et al. | 705/1.1 |
| 7,660,902 B2 | 2/2010 | Graham et al. | |
| 7,716,077 B1 | 5/2010 | Mikurak | |
| 7,885,887 B2 | 2/2011 | Camelio | |
| 7,921,052 B2* | 4/2011 | Dabney et al. | 705/37 |
| 7,925,973 B2 | 4/2011 | Allaire et al. | |
| 7,930,347 B2 | 4/2011 | Maxwell et al. | |
| 2001/0037223 A1* | 11/2001 | Beery et al. | 705/4 |
| 2002/0046101 A1* | 4/2002 | Ogawa et al. | 705/14 |
| 2002/0138439 A1 | 9/2002 | Matsushima et al. | |
| 2003/0004880 A1 | 1/2003 | Banerjee et al. | |
| 2003/0014483 A1 | 1/2003 | Stevenson et al. | |
| 2003/0088873 A1 | 5/2003 | McCoy et al. | |
| 2003/0105721 A1* | 6/2003 | Ginter et al. | 705/54 |
| 2003/0196204 A1 | 10/2003 | Thiagarajan et al. | |
| 2004/0010417 A1 | 1/2004 | Peled | |
| 2004/0015427 A1 | 1/2004 | Camelio | |
| 2004/0032393 A1 | 2/2004 | Brandenberg et al. | |
| 2004/0078825 A1 | 4/2004 | Murphy | |
| 2005/0011947 A1 | 1/2005 | Reddy et al. | |
| 2005/0033657 A1 | 2/2005 | Herrington et al. | |
| 2005/0043060 A1 | 2/2005 | Brandenberg et al. | |
| 2005/0050218 A1 | 3/2005 | Sheldon | |
| 2005/0050442 A1* | 3/2005 | Pope et al. | 715/500 |
| 2005/0144072 A1 | 6/2005 | Perkowski et al. | |
| 2005/0165686 A1 | 7/2005 | Zack et al. | |
| 2005/0187877 A1 | 8/2005 | Tadayon et al. | |
| 2005/0246193 A1 | 11/2005 | Roever et al. | |
| 2005/0251408 A1* | 11/2005 | Swaminathan et al. | 705/1 |
| 2005/0289112 A1 | 12/2005 | Sargent et al. | |
| 2006/0031285 A1 | 2/2006 | Ruhnke et al. | |
| 2006/0085343 A1* | 4/2006 | Lisanke et al. | 705/50 |
| 2006/0173985 A1 | 8/2006 | Moore | |
| 2006/0230021 A1 | 10/2006 | Diab et al. | |
| 2006/0259462 A1 | 11/2006 | Timmons | |
| 2007/0038567 A1 | 2/2007 | Allaire et al. | |
| 2007/0038931 A1 | 2/2007 | Allaire et al. | |
| 2007/0100690 A1 | 5/2007 | Hopkins | |
| 2008/0216106 A1 | 9/2008 | Maxwell et al. | |
| 2011/0191163 A1 | 8/2011 | Allaire et al. | |

FOREIGN PATENT DOCUMENTS

| | | |
|---|---|---|
| JP | 2013-061949 A | 4/2013 |
| WO | WO-00/39733 | 7/2000 |
| WO | WO-2005/003899 | 1/2005 |

OTHER PUBLICATIONS

Extended Supplementary Search Report and Opinion for European Patent Application No. 06801298.8, mailed Mar. 2, 2011, 11 pages.

U.S. Appl. No. 13/051,297, filed Dec. 20, 2002 Non-Final Rejection mailed Sep. 9, 2014, 17 pages.

U.S. Appl. No. 13/051,297, filed Dec. 20, 2002 Final Rejection mailed Feb. 12, 2015, 16 pages.

U.S. Appl. No. 13/051,297, filed Dec. 20, 2002 Non-Final Rejection mailed Jul. 9, 2015, 20 pages.

U.S. Appl. No. 11/271,712, filed Sep. 9, 2005 Non-Final Rejection mailed Jan. 8, 2009, 128 pages.

U.S. Appl. No. 11/271,712, filed Sep. 9, 2005 Final Rejection mailed Nov. 18, 2009, 38 pages.

U.S. Appl. No. 11/271,712, filed Sep. 9, 2005 Non-Final Rejection mailed Mar. 29, 2013, 42 pages.

U.S. Appl. No. 11/271,712, filed Sep. 9, 2005 Final Rejection mailed Mar. 28, 2014, 28 pages.

U.S. Appl. No. 11/271,712, filed Sep. 9, 2005 Non-Final Rejection mailed Oct. 2, 2014, 40 pages.

U.S. Appl. No. 11/271,712, filed Sep. 9, 2005 Final Rejection mailed Apr. 29, 2015, 45 pages.

* cited by examiner

```
;; Database Schema
;; ---------------
;; Account Management
;; ---------------

;; Base user account
create table user (
    id bigint not null auto_increment,
    version integer not null,
    email varchar(255) not null unique,
    password varchar(32) not null,
    account_locked bit not null,
    failed_logins integer not null,
    account_disabled bit not null,
    req_pass_reset bit not null,
    title varchar(32),
    first_name varchar(128),
    last_name varchar(128),
    address_1 varchar(128),
    address_2 varchar(128),
    city varchar(128),
    state varchar(32),
    postal_code varchar(32),
    country varchar(128),
    day_phone varchar(64),
    evening_phone varchar(64),
    secret_question integer,
    secret_answer varchar(255),
    allow_marketing bit not null,
    viewed_priv_pol bit not null,
    date_created datetime not null,
    date_last_login datetime not null,
    primary key (id)
) type=InnoDB;

;; Self-explanatory; builds upon user table
create table consumer (
    user_id bigint not null,
    version integer not null,
    is_primary_account bit not null,
    how_found integer not null,
    allow_adult bit not null,
    review_total integer,
    review_rating integer,
    primary key (user_id)
) type=InnoDB;
```

FIG. 47

```sql
;; The Publisher organization/company/corporation
create table organization (
    id bigint not null auto_increment,
    version integer not null,
    display_name varchar(32) not null unique,
    short_desc varchar(255),
    long_desc text,
    thumb_image_id bigint,
    url varchar(128),
    tax_id varchar(32),
    address_1 varchar(128),
    address_2 varchar(128),
    city varchar(128),
    state varchar(32),
    postal_code varchar(32),
    country varchar(128),
    primary_phone varchar(64),
    date_created datetime not null,
    date_last_modified datetime not null,
    primary key (id)
) type=InnoDB;

;; Builds upon user table. Multiple publisher accounts can belong to the same Organization
create table publisher (
    id bigint not null auto_increment,
    is_administrator bit not null,
    is_contributor bit not null,
    user_id bigint not null,
    organization_id bigint not null,
    primary key (id)
) type=InnoDB;
;; ------------
;; Product Catalog
;; ------------

;; Represents media assets (videos, images, mp3s, etc)
create table asset (
    id bigint not null auto_increment,
    version integer not null,
    organization_id bigint,
    folder_name varchar(250),
    display_name varchar(100),
    original_filename varchar(250),
    current_filename varchar(250),
    file_size bigint,
    hash_code varchar(40),
    upload_timestamp_millis bigint,
    asset_type_enum tinyint,
    drm_encoded bit,
    cdn_stored bit,
    local_path_root varchar(25),
    primary key (id)
) type=InnoDB;
```

FIG. 48

```
;; Base type for all items that can be sold (rentals, purchases, subscriptions, etc)
create table economic_entity (
    id bigint not null auto_increment,
    version integer not null,
    organization_id bigint not null,
    item_state integer,
    published_date datetime,
    complete bit,
    reference_id varchar(150),
    creation_date date,
    display_name varchar(60) not null,
    short_description varchar(250),
    long_description text,
    ad_supported bit,
    free bit,
    primary key (id)
) type=InnoDB;

;; Represents a video rental or pay-to-own entitt
create table non_recurring_economic_entity (
    economic_entity_id bigint not null,
    purchase_amount double precision,
    rental_amount double precision,
    primary key (economic_entity_id)
) type=InnoDB;

create table recurring_economic_entity (
    economic_entity_id bigint not null,
    monthly_amount double precision,
    yearly_amount double precision,
    primary key (economic_entity_id)
) type=InnoDB;

;; Relate an EE to their tags (aka keywords)
create table ee_to_tag (
    ee_id bigint not null,
    tag_id bigint not null,
    primary key (ee_id, tag_id)
) type=InnoDB;
;; Categories/Genres can be organized into different catalogs
create table catalog (
    id bigint not null auto_increment,
    short_description text,
    long_description text,
    display_name varchar(128),
    active bit,
    primary key (id)
) type=InnoDB;
```

FIG. 49

```
;; A category is a genre
create table category (
    id bigint not null auto_increment,
    version integer not null,
    short_description text,
    long_description text,
    display_name varchar(128),
    catalog_id bigint,
    primary key (id)
) type=InnoDB;

;; Parent-child relationship between categories/genres
create table category_to_category (
    category_id bigint not null,
    child_category_id bigint not null,
    primary key (category_id, child_category_id)
) type=InnoDB;

;; Relate an "Economic Entity" (e.g. video title, subscription) to a node
;; in the category/genre tree
create table category_to_ee (
    category_id bigint not null,
    ee_id bigint not null,
    primary key (category_id, ee_id)
) type=InnoDB;

;; Internal management table for deleted files
create table deleted_file (
    id bigint not null auto_increment,
    organization_id bigint,
    asset_id bigint,
    asset_type_enum tinyint,
    original_filename varchar(250),
    current_filename varchar(250),
    absolute_path varchar(250),
    transit_file_path varchar(250),
    cdn_stored bit,
    server_lock bigint,
    delete_error bit,
    primary key (id)
) type=InnoDB;
```

FIG. 50

```
;; ----------------
;; Tags aka Keywords
;; ---------------- create table tag (
   id bigint not null auto_increment,
   version integer not null,
   name varchar(64),
   lower_case_name varchar(64),
   image varchar(128),
   primary key (id)
) type=InnoDB;

create table assigned_tags_organization (
   organization_id bigint not null,
   tag_id bigint not null,
   primary key (organization_id, tag_id)
) type=InnoDB;

create table used_tags_organization (
   organization_id bigint not null,
   tag_id bigint not null,
   primary key (organization_id, tag_id)
) type=InnoDB;

;; ----------------
;; Player Templates
;; ----------------

;; Represents different template types (Publisher Player, Affiliate Player,
;; BC.com Player, MSFT Media Center, etc)
create table interface_type (
   id bigint not null auto_increment,
   version integer not null,
   name varchar(128) not null,
   primary key (id)
) type=InnoDB;
```

FIG. 51

```
;; The Player definition - i.e. what templates are available
create table template (
    id bigint not null auto_increment,
    version integer not null,
    name varchar(128) not null,
    thumbnail_url varchar(255),
    detail_url varchar(255),
    edit_swf_url varchar(255),
    viewer_swf_url varchar(255),
    html_snippet_url varchar(255),
    pub_default bit,
    interface_type_id bigint not null,
    category_id bigint,
    description varchar(255),
    default_instance_id bigint,
    preview_instance_id bigint,
    primary key (id)
) type=InnoDB;

;; Players can be organized into groups
create table template_category (
    id bigint not null auto_increment,
    version integer not null,
    name varchar(128) not null,
    description varchar(255),
    category_id bigint,
    primary key (id)
) type=InnoDB;

;; Configuration settings for Players
create table template_configuration_item (
    id bigint not null auto_increment,
    version integer not null,
    key_name varchar(128) not null,
    value_str varchar(255),
    asset_id bigint,
    template_instance_id bigint not null,
    primary key (id)
) type=InnoDB;

;; Created instances of Players
create table template_instance (
    id bigint not null auto_increment,
    version integer not null,
    name varchar(128) not null,
    is_default bit,
    active bit,
    complete bit,
    template_id bigint not null,
    organization_id bigint,
    primary key (id)
) type=InnoDB;
```

FIG. 52

```
;; A video promoted within a Player
create table featured_item (
    id bigint not null auto_increment,
    version integer not null,
    item_id bigint not null,
    item_type_id bigint,
    organization_id bigint,
    item_list_id bigint,
    primary key (id)
) type=InnoDB;

;; A list of videos promoted within a Player
create table featured_item_list (
    id bigint not null auto_increment,
    version integer not null,
    name varchar(255),
    primary key (id)
) type=InnoDB;

;; Represents content that is placed into a Player Template
create table content_type (
    id bigint not null auto_increment,
    version integer not null,
    name varchar(128) not null,
    class_name varchar(255),
    is_primary bit,
    primary key (id)
) type=InnoDB;

;; --------------------------------
;; Manage asset uploads and their state
;; -------------------------------- create table upload_server (
    id bigint not null auto_increment,
    server_name varchar(100) unique,
    upload_monitor varchar(10) unique,
    primary key (id)
) type=InnoDB;

create table upload_state (
    id bigint not null,
    version integer not null,
    organization_id bigint,
    state_code_enum tinyint,
    drm_encode bit,
    push_to_cdn bit,
    standard_hash bit,
    previous_size bigint,
    last_change bigint,
    transit_file_path varchar(250),
    error_message varchar(250),
    server_lock bigint,
    primary key (id)
) type=InnoDB;
```

FIG. 53

DISTRIBUTION OF CONTENT

CROSS REFERENCE TO RELATED APPLICATIONS

This application is a divisional of U.S. patent application Ser. No. 11/202,683, filed Aug. 12, 2005, now U.S. Pat. No. 7,925,973, the entire contents of which are incorporated by reference herein.

TECHNICAL FIELD

This description relates to distribution of content.

BACKGROUND

The well-publicized growth in the use of the Internet generally has been paralleled by an equivalent growth in the number of publishers creating text and graphical content for the Internet. Unlike past mass mediums such as that of television, radio, and newspaper where it can be cost prohibitive to reach large numbers of consumers, the Internet has enabled any publisher to deliver content anywhere in the world at virtually no cost. This radical shift in the economics of text and graphical publishing resulted in tens of millions of websites. While a great deal of any specific content has limited application to a wide-range of the population, the key is that it has become highly cost-effective to create and publish content with vertical or specialized focus, and it is this factor that has made the Internet such a powerful and compelling medium for consumers. Rather than sit idly in front of a broadcast, mass-medium television, consumers sit at their personal computers and query a search engine to find the topics that interest them, no matter how arcane or specialized those topics might be.

More recently, we have witnessed the slow but steady growth of commercial video services on the Internet. In particular, the range and number of video publishers offering fee-based and ad-supported streaming video services has begun to grow. The massive investment telecommunications companies made in the last several years in connectivity and broadband capability has begun to pay off. Broadband penetration has reached a critical mass where the economics of broadband delivery and access are now feasible. At the same time, the increasing sophistication of digital editing, compression and encoding technologies, and the limitations of ordinary cable and broadcast distribution, has set the stage for an explosive growth in the creation of, and demand for, the delivery of video and other digital content over the Internet.

A broad range of TV brands and cable networks have begun to expand their use of the Internet with advertising and subscription supported streaming products. Largely these efforts have been experimental, and in terms of the overall market of mainstream networks, this represents a tiny percentage of the available suppliers. Additionally, there already exists a wave of next-tier providers and producers who currently do not have carriage on cable or satellite who will look to this new open distribution channel as a means to monetize their media.

As the economics and enabling technologies of video distribution on the Internet progresses, the creation of video and other digital content for Internet delivery will experience a similar growth as was seen previously in the creation of specialized text and graphical content. Serving these needs is a primary purpose of the Invention.

SUMMARY

In general, in one aspect, publishers of digital content are enabled each to define, for each of one or more digital content items, a style in which the digital content item is to be presented to a user and a condition under which the user may have the digital content item presented. The digital content items are stored in a content library, the styles and conditions associated with the digital content items are stored in a server. Each of the digital content items is enabled to be presented to users within presentation contexts that are accessible to the users and controlled by presentation context providers. The presentation of the digital content items includes obtaining the digital content items from the server and controlling the presentation to occur under the conditions and in the styles defined by the publishers.

Implementations may include one or more of the following features. The publishers are provided with a selection of predefined templates that can be customized. The publishers may create their own templates that can access the content library. The publishers generate a package that includes one or more of the digital content items; the package includes at least one of a rental, subscription, pay-to-own, and a discount applied to a bundle of content items including the media product. The publisher pays the cost of distribution and delivery. Each of the digital content items is arranged as streaming video or music, or as a downloadable file. The styles define a user experience.

In general, in another aspect, a party that controls a digital presentation context that is accessible to users can permit inclusion in the presentation context of a presentation content code, the presentation content code being configured to present digital content items to the users within the presentation context. The presentation content code is configured to control the presentation of each of the digital content items in accordance with the defined style and condition. The party that controls the digital presentation context is paid for permitting the inclusion of the presentation content code in the presentation context.

Implementations may include one or more of the following features. The digital content items are delivered to a user operating the presentation context in response to receiving the presentation content code. To the user, the digital content appears to be originating directly from the presentation context.

In general, in another aspect, a user or an aggregator aggregates sets of digital content items, which have been offered as publisher subscriptions by publishers, to form custom subscriptions. Revenue is derived from presentation of the custom subscriptions. At least portions of the revenue are distributed to the publishers. The derivation and distribution of revenue is adjusted to reflect volume discounts defined by the publishers with respect to volume of usage by the users for respective digital content items or respective publisher subscriptions.

Implementations may include one or more of the following features. At least one of the custom subscriptions spans at least two different publishers. A custom subscription is priced according to multiple pricing models that are linked to characteristics of different users who have purchased one or more digital content items of a custom subscription. Characteristics include at least one of an interest in a particular topic, and a user's impression of the quality of a publisher.

In general, in another aspect, a first user electronically refers a digital content item to a second user. In connection with the referral, a publisher of the digital content item controls a context in which and a financial condition under which the digital content item may be presented to the other user.

Implementations may include one or more of the following features. The second user is prompted to register if the second user is not a registered member. A preview of the digital content item is sent to the second user with instructions for purchasing the digital content item.

In general, in another aspect, a server maintains information about rights of users to receive presentations of digital content items. Each of the users can receive presentations of the digital content items for which the user has rights from the server at any time at any location and on any one of a variety of presentation devices including personal computers, notebook computers, portable video players, digital versatile disk players, and televisions. The users have customizable tools for viewing the presentations. A payment is received in exchange for the rights.

In general, in another aspect, digital content items of publishers are stored together with information, defined by the publisher, that enables each of the content items to be presented to users through any one of a variety of presentation channels that each provides a presentation context under the control of a presentation context provider. Implementations may include one or more of the following features. The channels include at least one of web browser, networked television, email, instant messaging, rich site summary, and short message service. The content items are indexed using the information defined by the publisher to form a catalog index. A search tool provides information in the catalog index to a user according to searching criteria defined by the user. The information defined by the publisher includes at least one of: a name, date of production, description of content and an identification number.

In general, in another aspect, a central service enables publishers to publish digital content items through the service directly at retail for presentation to users for compensation. The central service also enables the publishers to electronically establish relationships with affiliates to permit the publishers to publish the digital content items through the service and the affiliates indirectly at wholesale for presentation by the affiliates to the users for compensation.

Implementations may include one or more of the following features. The publishers can grant and restrict access to digital content items for affiliates. The affiliates have access to a list of digital content items that are available to them from each of the publishers. The affiliates define packages of the digital content items. The packages include at least one of a rental, subscription, purchase, and a discount applied to a bundle of media content items. The affiliates define packages of the digital content items, wherein the affiliate pays the cost of distribution and delivery and the publisher is compensated for the usage and viewing of the digital content items.

In general, in another aspect, a publisher defines custom digital content packages each including one or more digital content items. The definition of each of the digital content packages includes the context and conditions under which the digital content package may be presented to a given user. The presentation of each of the digital content items to users is controlled based on the characteristics of the user or context in which the presentation is made and on the conditions for the presentation. Compensation passes from the users to the publishers for the presentations. Different packages are defined to enable the publisher to garner revenue, users, contexts, and conditions lying across a full range of a demand curve for the digital content items.

Implementations may include one or more of the following features. A publisher defines titles for the one or more digital content items. The titles include metadata that provides information about at least one of a: content, quality, and condition of the media product. The publisher organizes the titles as a lineup. The publisher inserts advertisements provided by advertising entities into the digital content package and garners revenue from the advertising entities.

In general, in another aspect, a presentation content provider, which electronically provides a presentation context to users, can permit the presentation context to include a publicly available presentation content code that enables a presentation to users of digital content items that are controlled by one or more publishers. The presentation is made under financial conditions and in a presentation style that is defined by the publishers. The presentation content provider is compensated for permitting the presentation content code to be included in the presentation context.

Implementations may include one or more of the following features. The presentation context includes advertisements that generate advertisement revenue. The presentation content provider shares a portion of the advertisement revenue. The presentation content provider shares a portion of revenue collected from payments made by users to receive the digital content items.

Other aspects include methods, systems, apparatus, program products, means for performing actions, and other combinations of the features mentioned above and other features.

Other advantages and features will become apparent from the following description, and from the claims.

DESCRIPTION

FIGS. 8-24 show screenshots of exemplary tools provided by the publisher console for performing the process described in FIG. 7;

FIGS. 47-53 show a database schema used in the content library shown in FIGS. 1-2.

Figure 1:
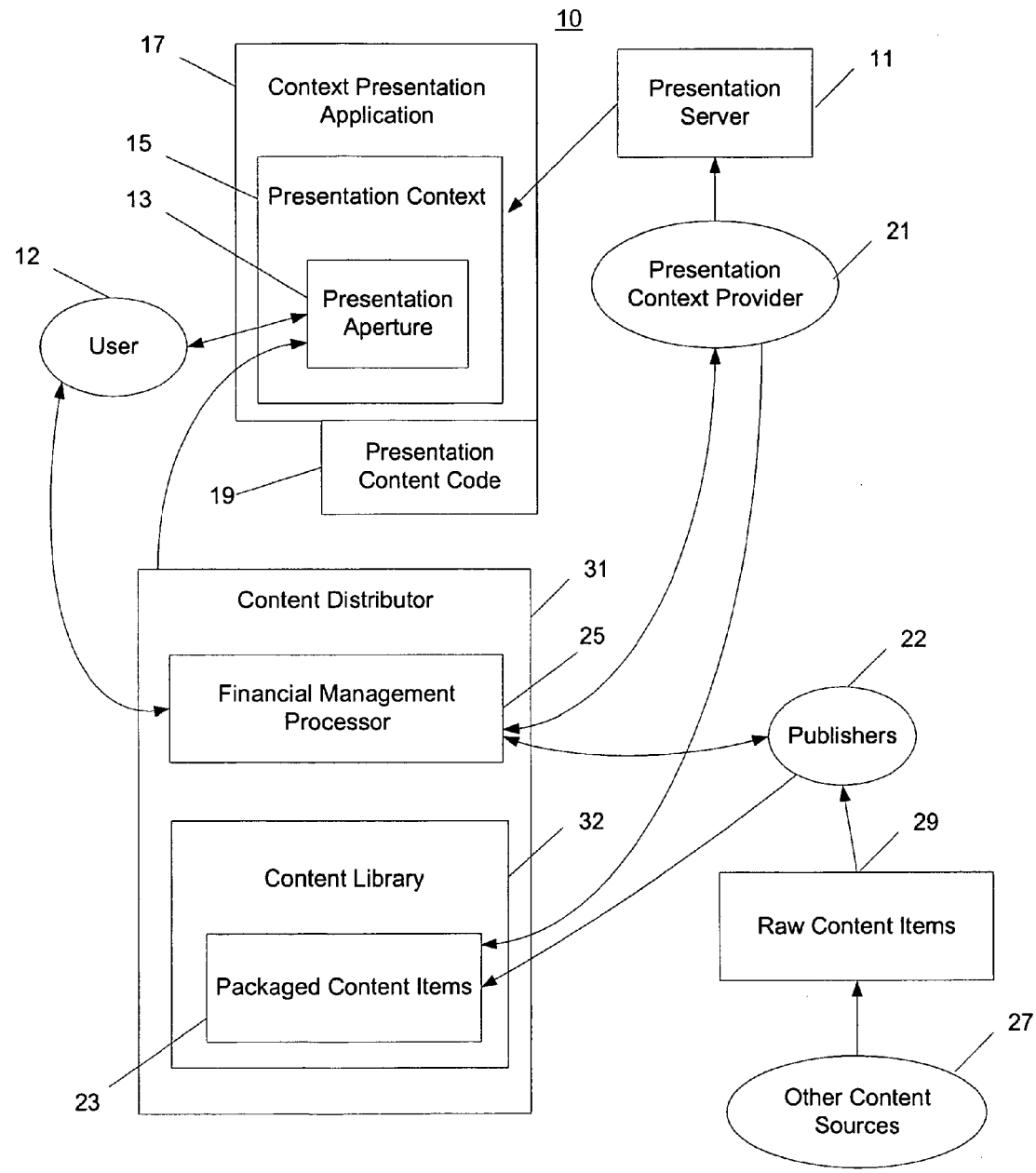
FIG. 1 shows a block diagram of a content distribution system.

As shown in broad terms in FIG. 1, in a content distribution system 10, content (for example, a video clip) can be presented (in some cases interactively) to a user 12 in a presentation aperture 13 (e.g., a rectangular window) within a broader presentation context 15 (e.g., a web page). The presentation context 15 may be provided by a presentation context application 17 (for example, a browser). The presentation aperture 13 may be provided by a presentation content code 19 (say, a snippet of code that implements a media player) that runs in cooperation with the presentation context application 17. The presentation context 15 is delivered from a presentation server 11 (e.g., a web server). The content, style, and terms of use of the presentation context 15 are determined by a presentation context provider 21 that controls the presentation server 11 (e.g., a merchant that hosts a web site).

The content presented to the user 12 in the presentation aperture 13 is provided from a content distributor 31 which maintains a content library 32 of stored items of content 23 packaged for presentation through the presentation content code 19. The creation of the packaged content items 23 is controlled by one or more publishers 22 that have access to raw content items 29 which they either control themselves or can obtain from other content sources 27. For example, the content distributor 31 could be a party that is independent of any presentation context provider 21, publisher 22, other content source 27, or user 12. The content distributor 31 could serve as a central market maker or clearinghouse for packaged content items 23 under a profit-yielding business model.

The publishers 22 could be, for example, owners of video material and the raw content items 29 could be raw video files. The other content sources 27 could be advertisers. The publishers 22 could be anyone who has raw content items 29 to distribute, including individuals.

In some implementations of the system shown in FIG. 1, the publishers 22—not the content distributor 31 or the presentation context provider 21—determine not only which raw content items 29 to include in the packaged content items 23 but also the style and terms under which the packaged content items 23 are provided through the presentation aperture 13 to the user 12. Style could include anything that defines the user 12's experience, including graphical features, sound features, inclusion of non-video elements such as text or still images, and interactive features. Terms could include the price and other conditions under which the presentation is made to the user 12 and the time period during which the presentation would be available, for example.

The system shown in FIG. 1 could be implemented in the context of a variety of business models in which revenue is derived from various parties. Publishers 22 may pay for the opportunity to have packaged content items 23 made available to users 12 through the presentation aperture 13. Users 12 may pay for the presentation of packaged content items. The presentation context provider 21 may pay for the ability to offer the packaged content items 23 of one or more publishers 22. Advertisers may pay for the placement of advertisements as part of the packaged content items 23.

Portions of the revenue could be paid to various parties. The publishers 22 may be paid for packaged content items 23 that they provide. The presentation context providers 21 may be paid for permitting advertising or content items to be delivered to users 12. The users 12 may be paid for agreeing to make themselves subject to content items and advertising, or, in effect, for subjecting themselves to a large volume of content items or advertising. The content distributor 31 may be paid for serving as the central market maker or clearinghouse, for storing packaged content items 23, for managing the flow of revenue and payments, and for other activities.

Financial arrangements that implement the business models may be governed by routine and automated processes, for example, the registration of new users 12 and new publishers, or by negotiation between, for example, a publisher 22 and a particular presentation context provider 21. Presentation context providers 21 that agree to participate and permit packaged content items 23 to be presented to users 12 may be known as affiliates. For example, a web site portal devoted to skiing could agree to include a presentation aperture 13 on its web site for a publisher 22 of ski videos and the financial arrangement between them may be negotiated. The web site portal then becomes an affiliate of the system.

The content distributor 31 can provide the medium for exchange of the revenue and payments contemplated by each business model through financial management processor 25.

The system shown in FIG. 1 enables any publisher 22, including individuals, to easily distribute packaged content items 23 to any user 12 anywhere in the world and to control the style and terms (and therefore the business model) under which the user 12 is given access. Affiliates and other presentation context providers 21 can provide packaged content items 23 of interest to their users 12 with essentially no effort and the prospect of generating additional revenue. Users 12 are exposed to a broader and deeper range of packaged content items 23 and can take advantage of them at different costs under a variety of business models.

A wide variety of implementations of the system are possible. The content items need not be video but could be any kind of digital item, including text, images, sounds, and software. The presentation context 15 need not be a web page but could be any presentation that is suitable for the content being presented and the hardware device on which the presentation is being made, for example, a notebook computer, a workstation, a kiosk, a telephone, or any other portable or handheld device. The content need not be delivered through an IP network but can be conveyed in any manner and by any medium that content can be stored or transmitted.

The remaining sections of the document describe the implementation of these techniques and other features of the system in greater detail.

Figure 2:
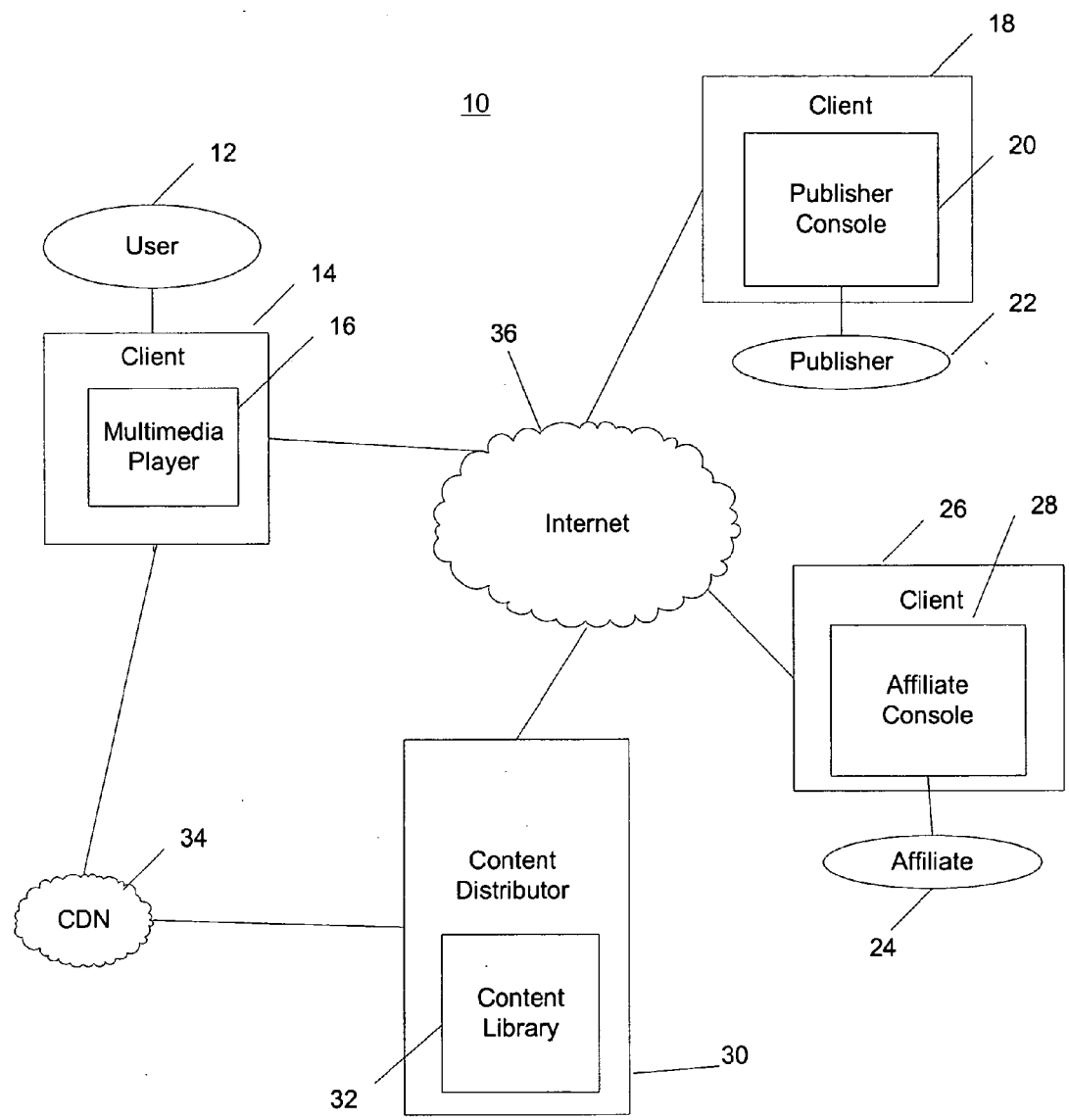
FIG. 2 shows a block diagram of a media content distribution system in further detail.

The part entitled System Overview provides a description of the overall content distribution system shown in FIG. 2 and describes how different components of the system interact with each other.

Figure 3:
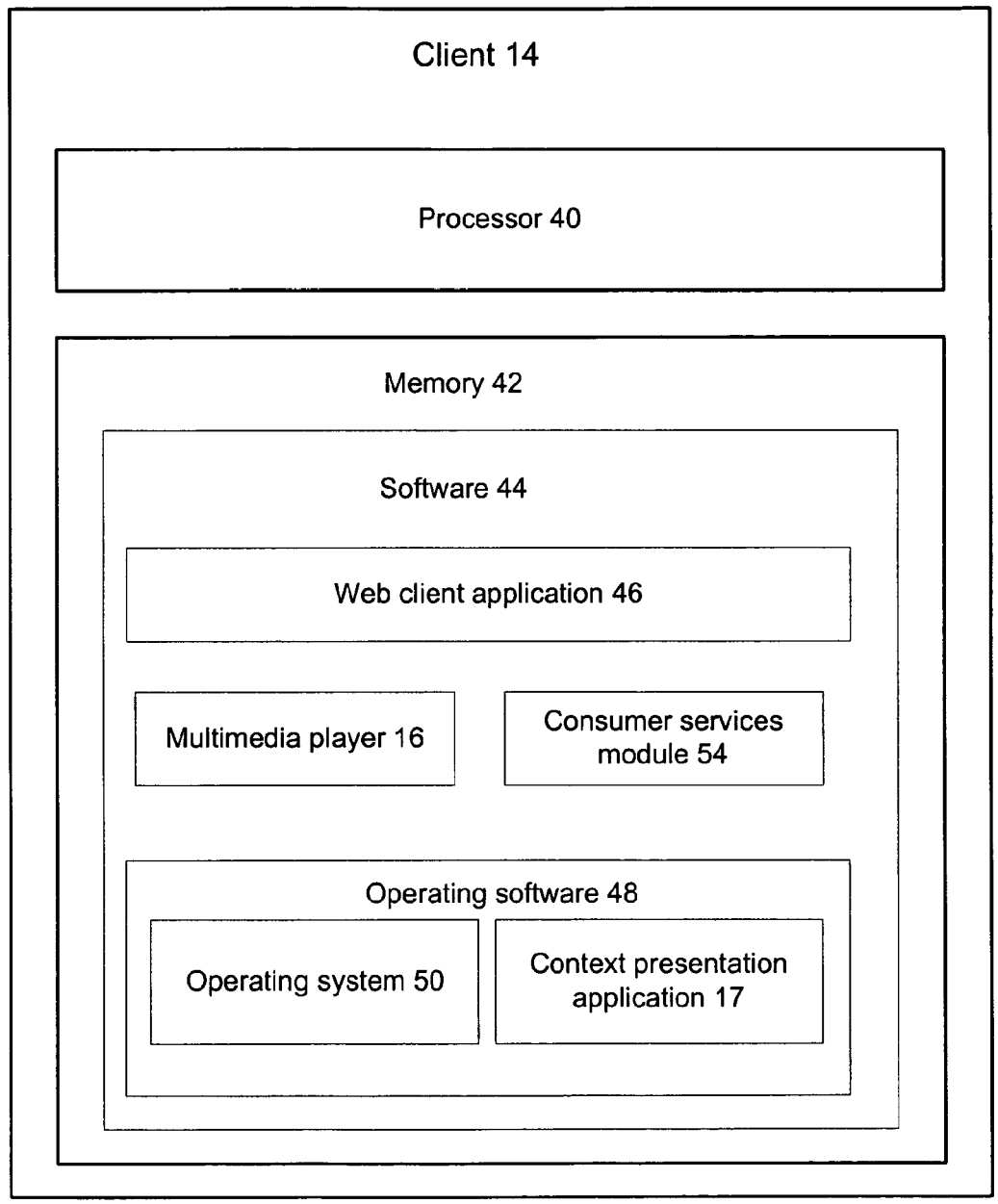
FIG. 3 shows a block diagram of a client computer in the media content delivery system shown in FIG. 2.
Figure 4:
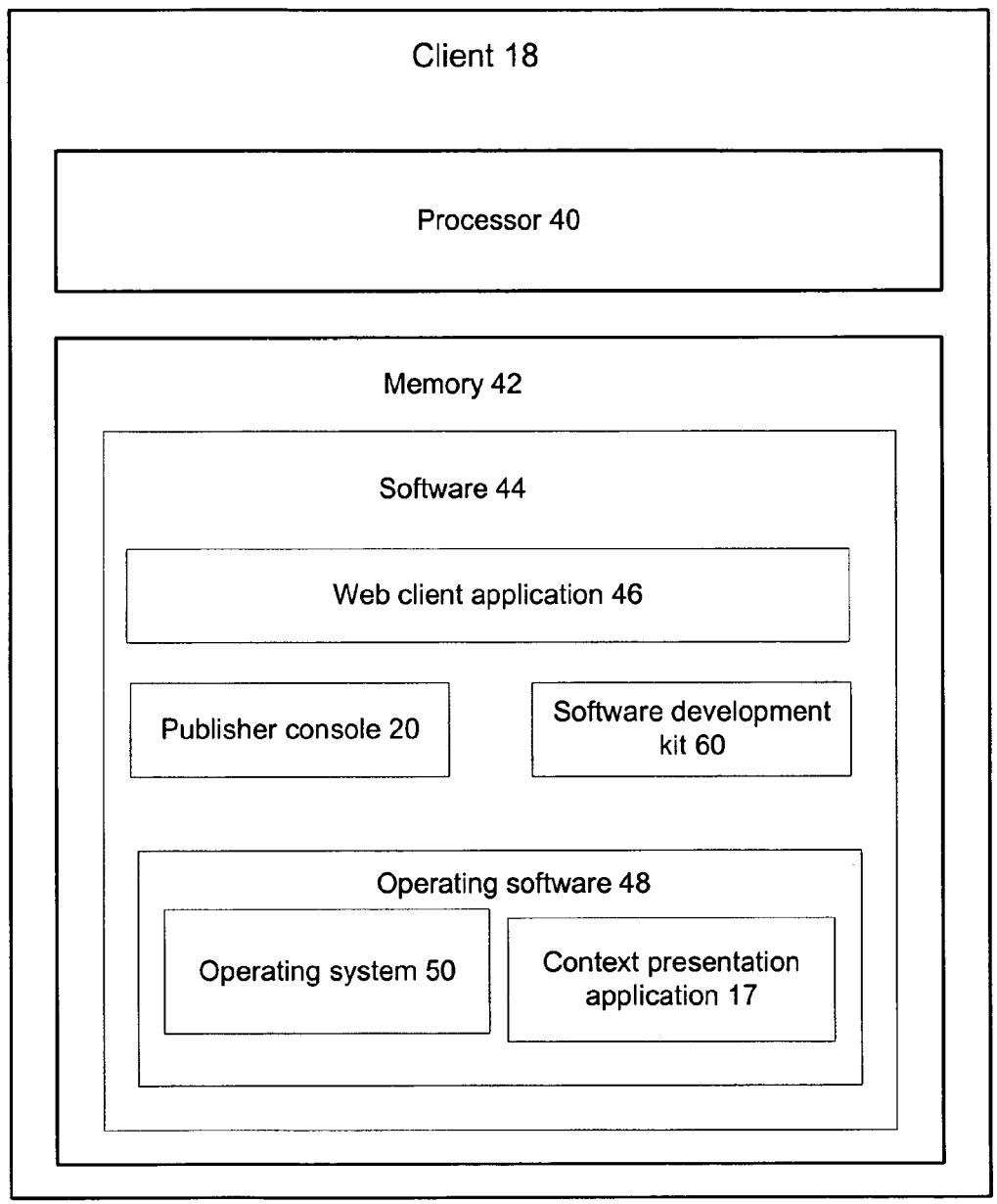
FIG. 4 shows a block diagram of another client computer in the media content delivery system shown in FIG. 2.
Figure 5:
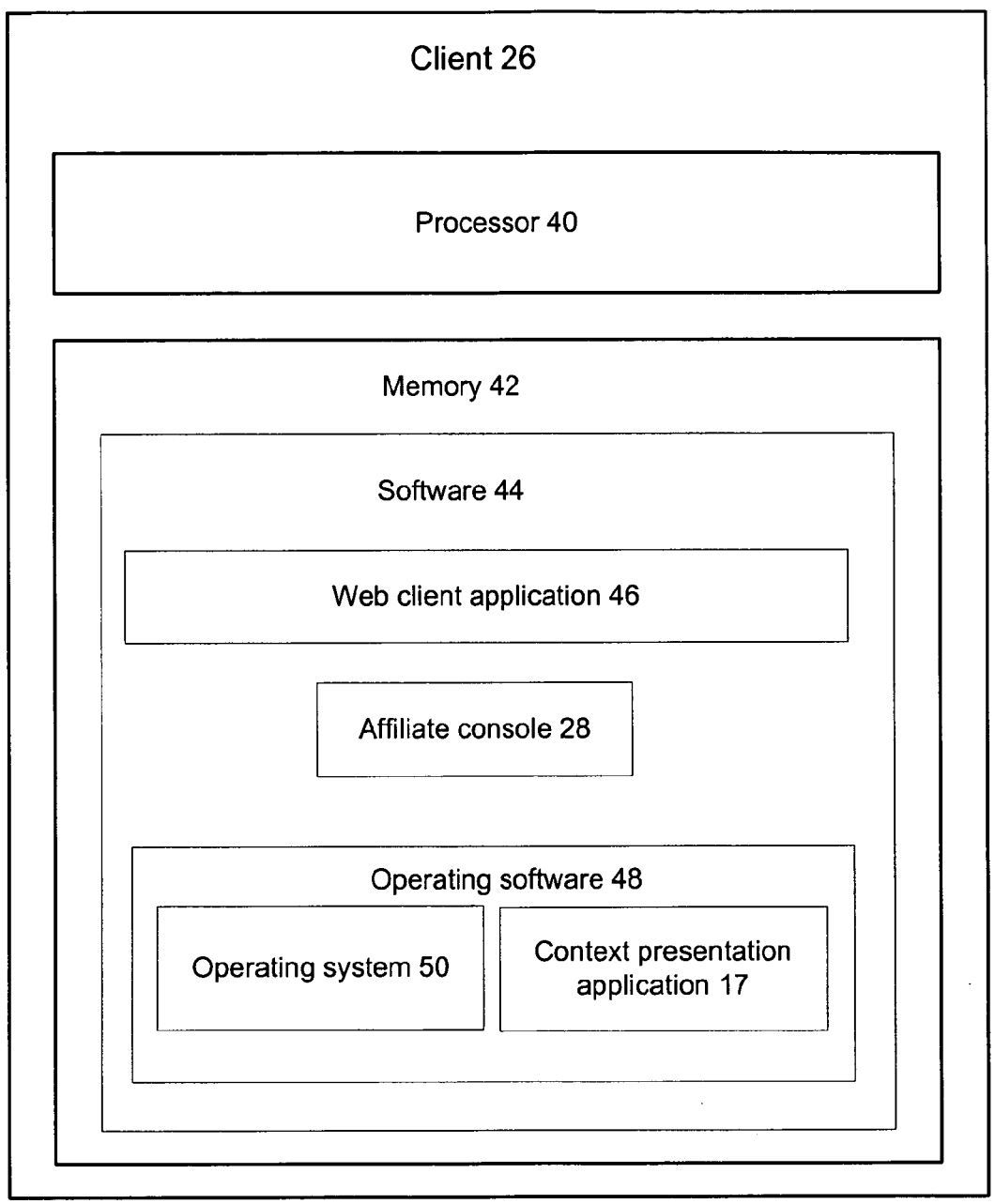
FIG. 5 shows a block diagram of another client computer in the media content delivery system shown in FIG. 2.

The section of that part entitled Overview of Client Platforms describes the hardware and software functions of the user, publisher, and affiliate client platforms shown in FIGS. 3-5, respectively. The sub-section entitled User Platform describes the hardware and software of the user's client computer; the sub-section entitled Publisher Platform describes the hardware and software of the publisher's client computer and introduces the publisher console; and the sub-section entitled Affiliate Platform describes the hardware and software of the affiliate's client computer and introduces the affiliate console.

Figure 6:
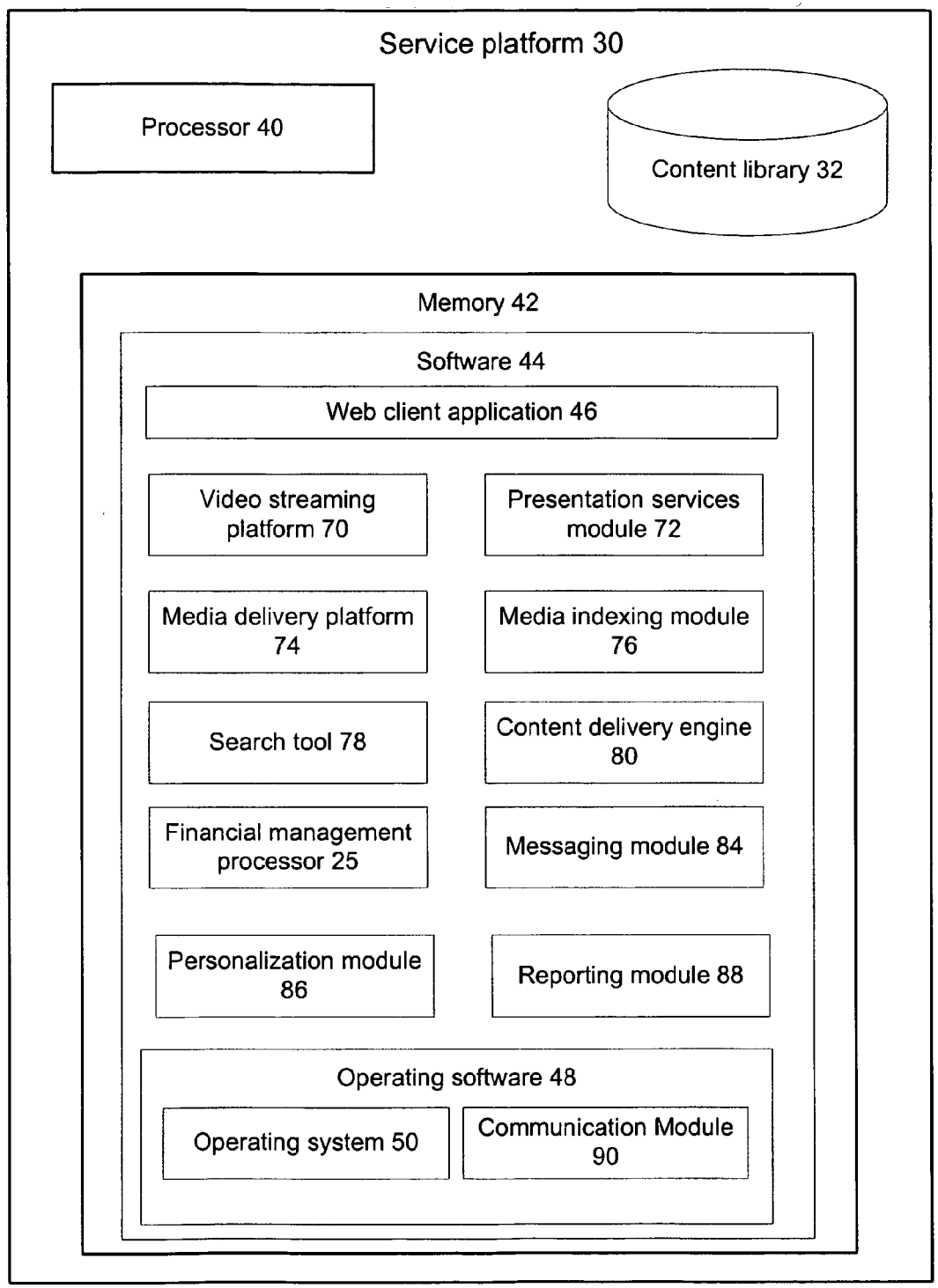
FIG. 6 shows a block diagram of a service platform in the media content delivery system shown in FIG. 2.

The section entitled Service Platform describes the hardware and software of the service platform shown in FIG. 6. The service platform is maintained by the content distributor and includes various software and hardware components for provisioning and distributing content items. The subsections within the Service Platform section describe each of the main software and hardware components and their functionality. These subsections are entitled Content Library, Three-tier Platform, Video Streaming Platform, Media Delivery Platform, Media Indexing Module, Search Tool, Content Delivery Engine, Financial Management Processor, Messaging Module, Personalization Module, and Reporting Module.

Figure 7:
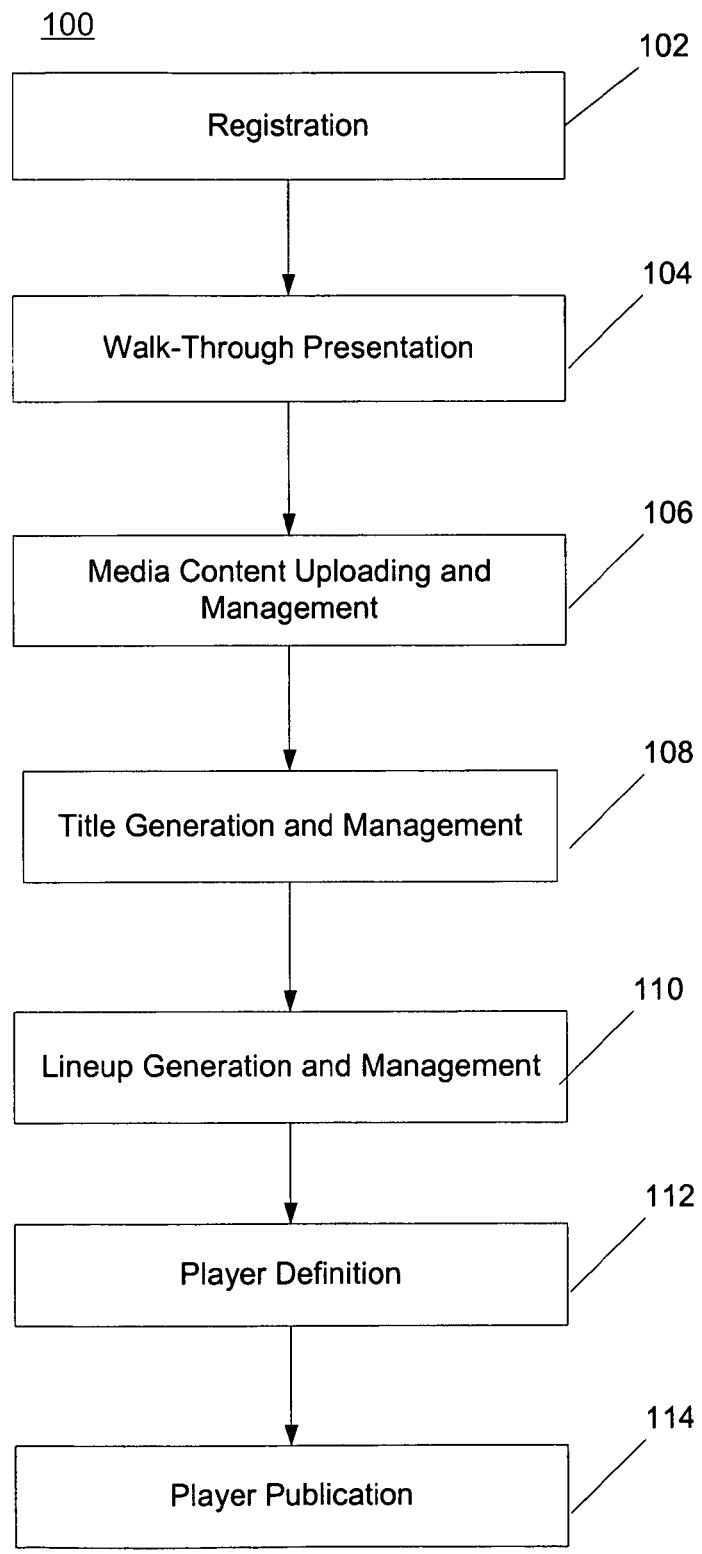
FIG. 7 shows a flowchart of a process for provisioning and publishing media content.
Figure 23:
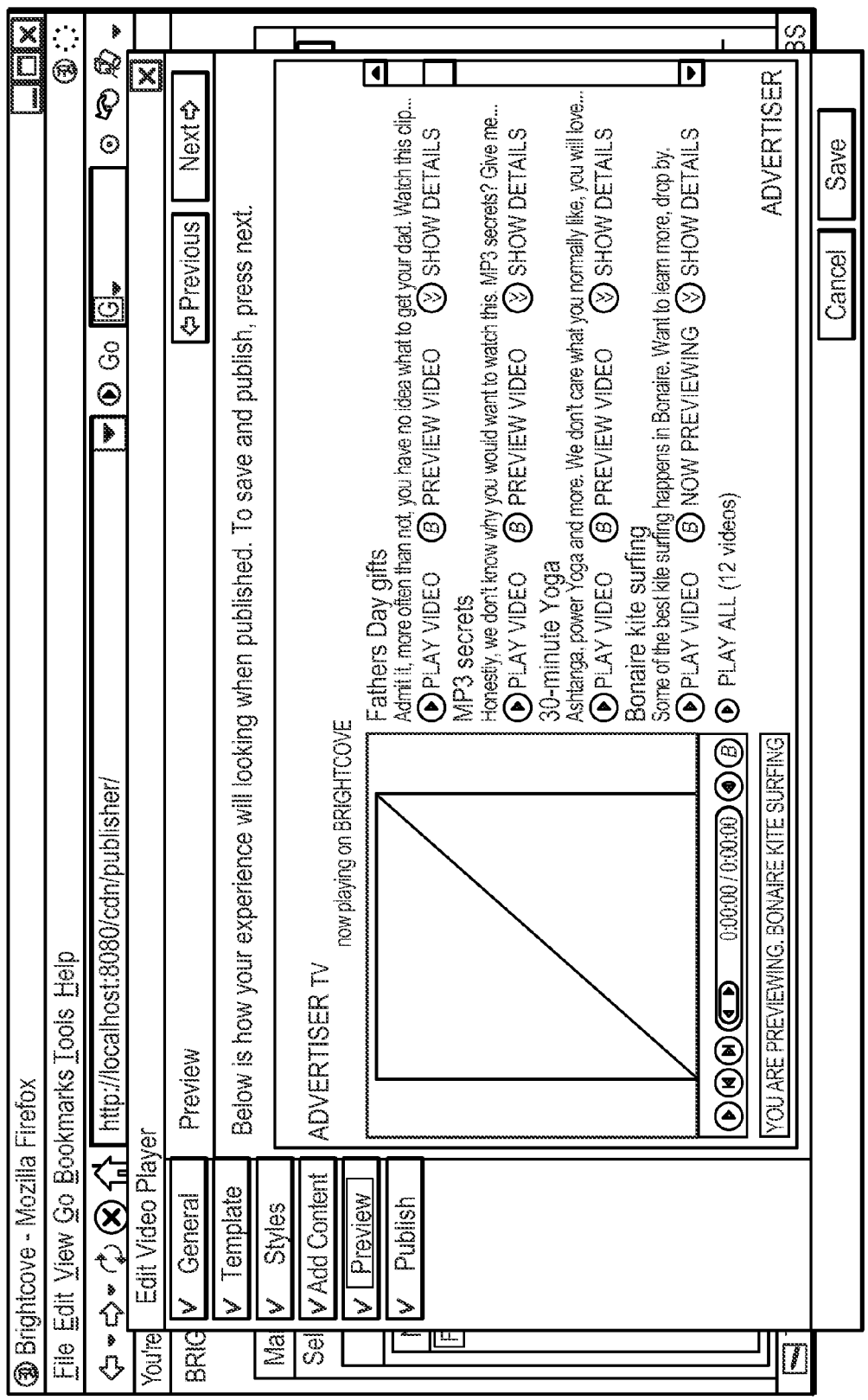
Figure 24:
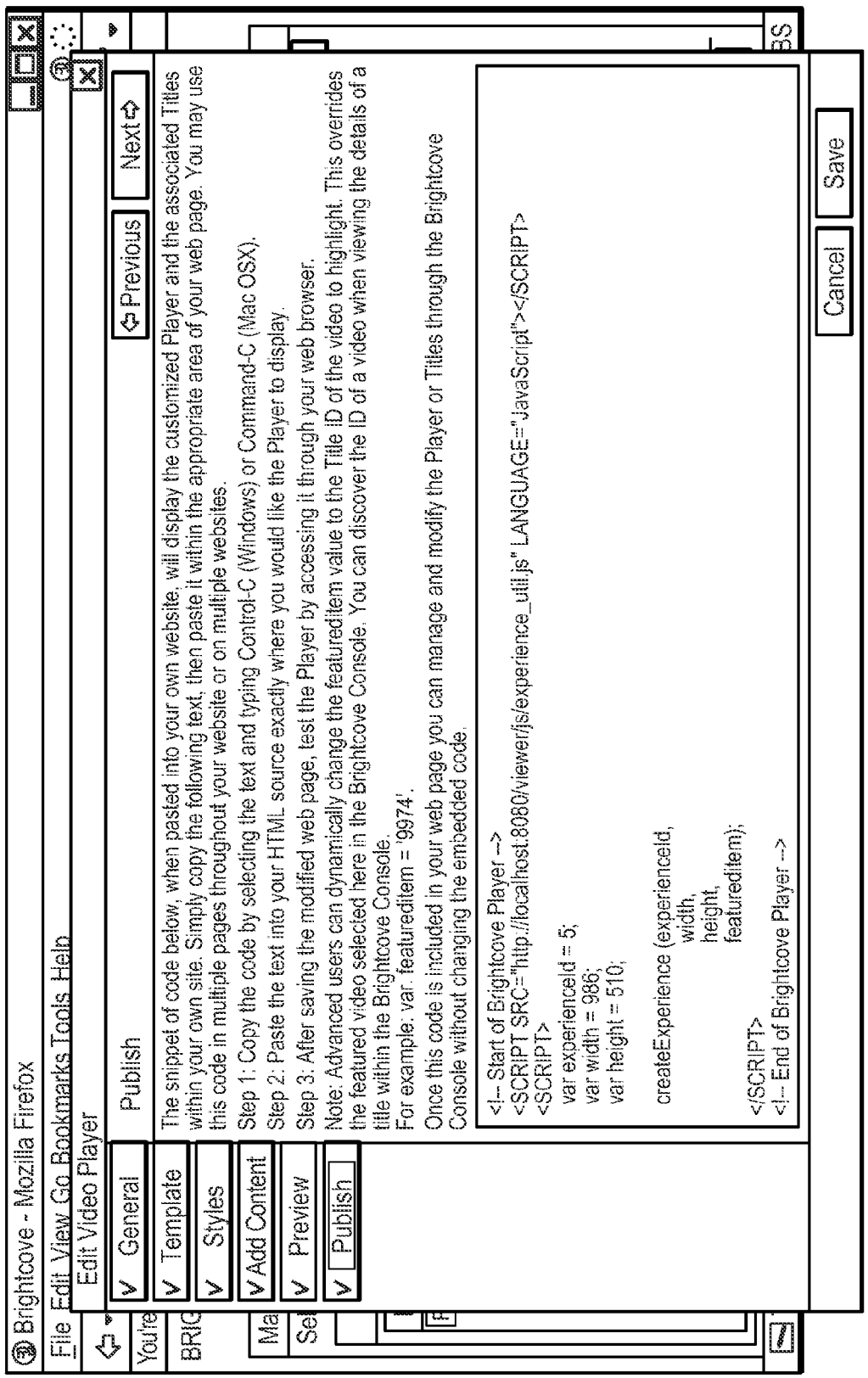
Figure 25:
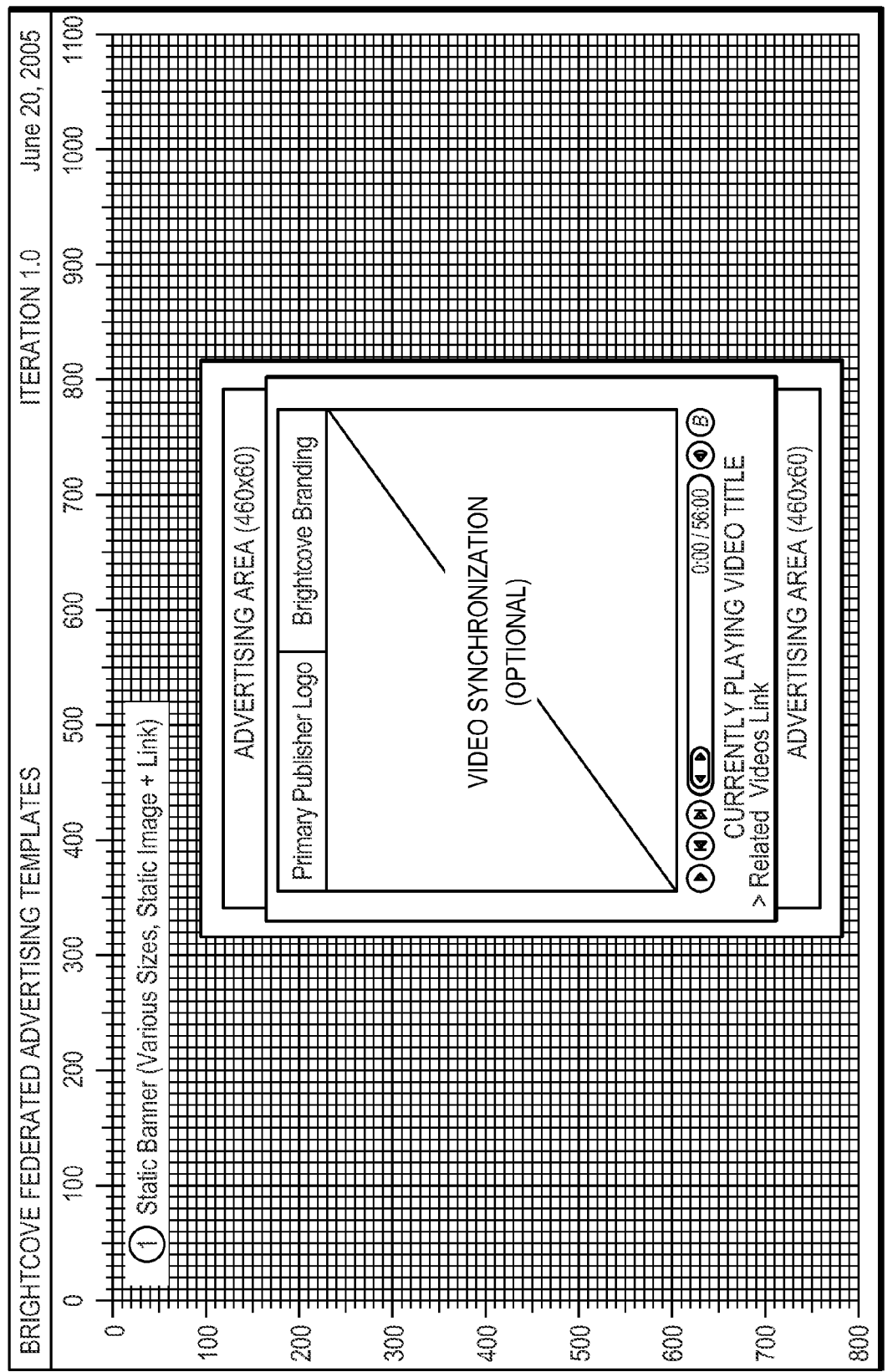
FIGS. 25-40 show screenshots of exemplary advertising templates.
Figure 26:
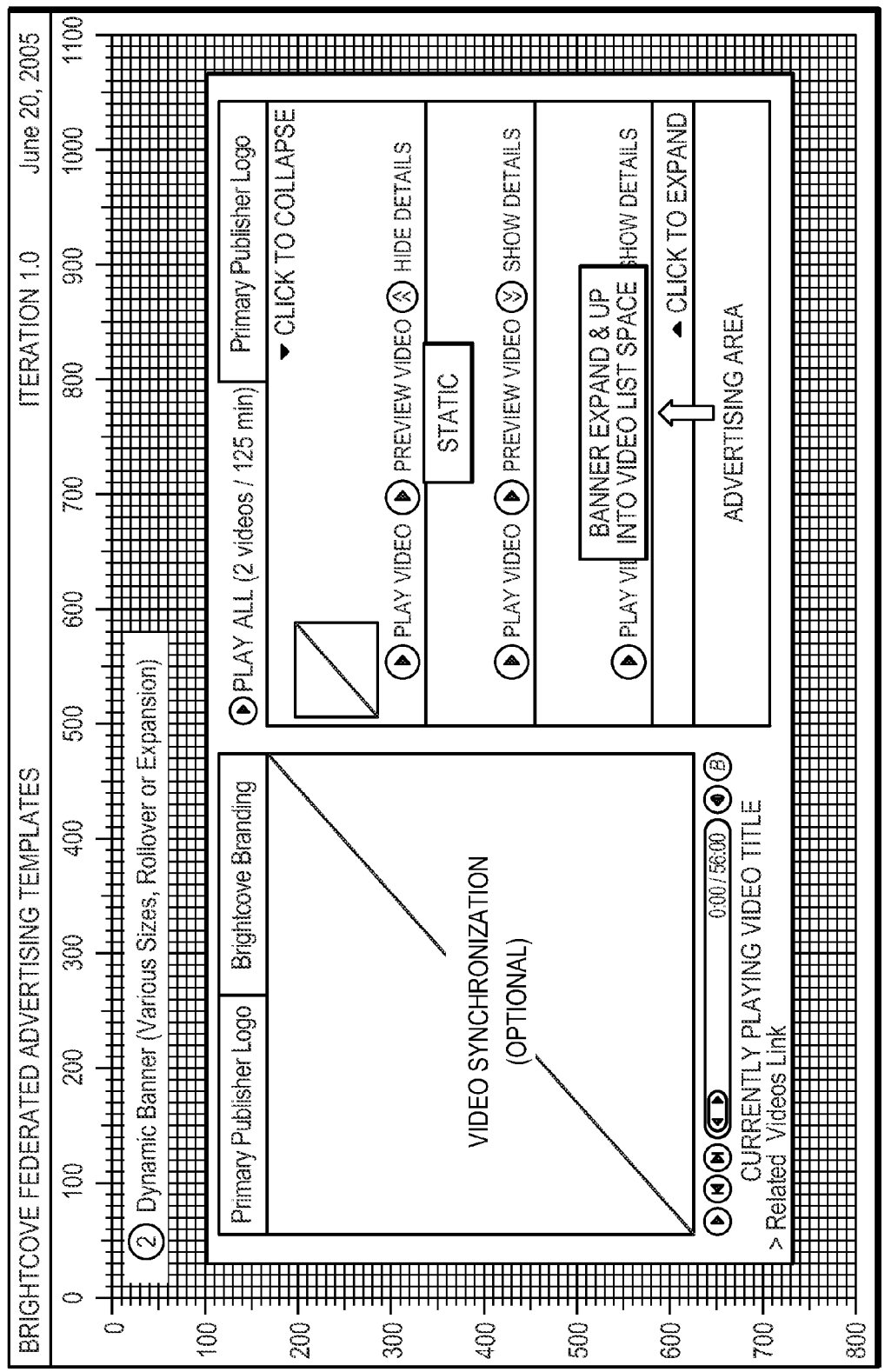
Figure 27:
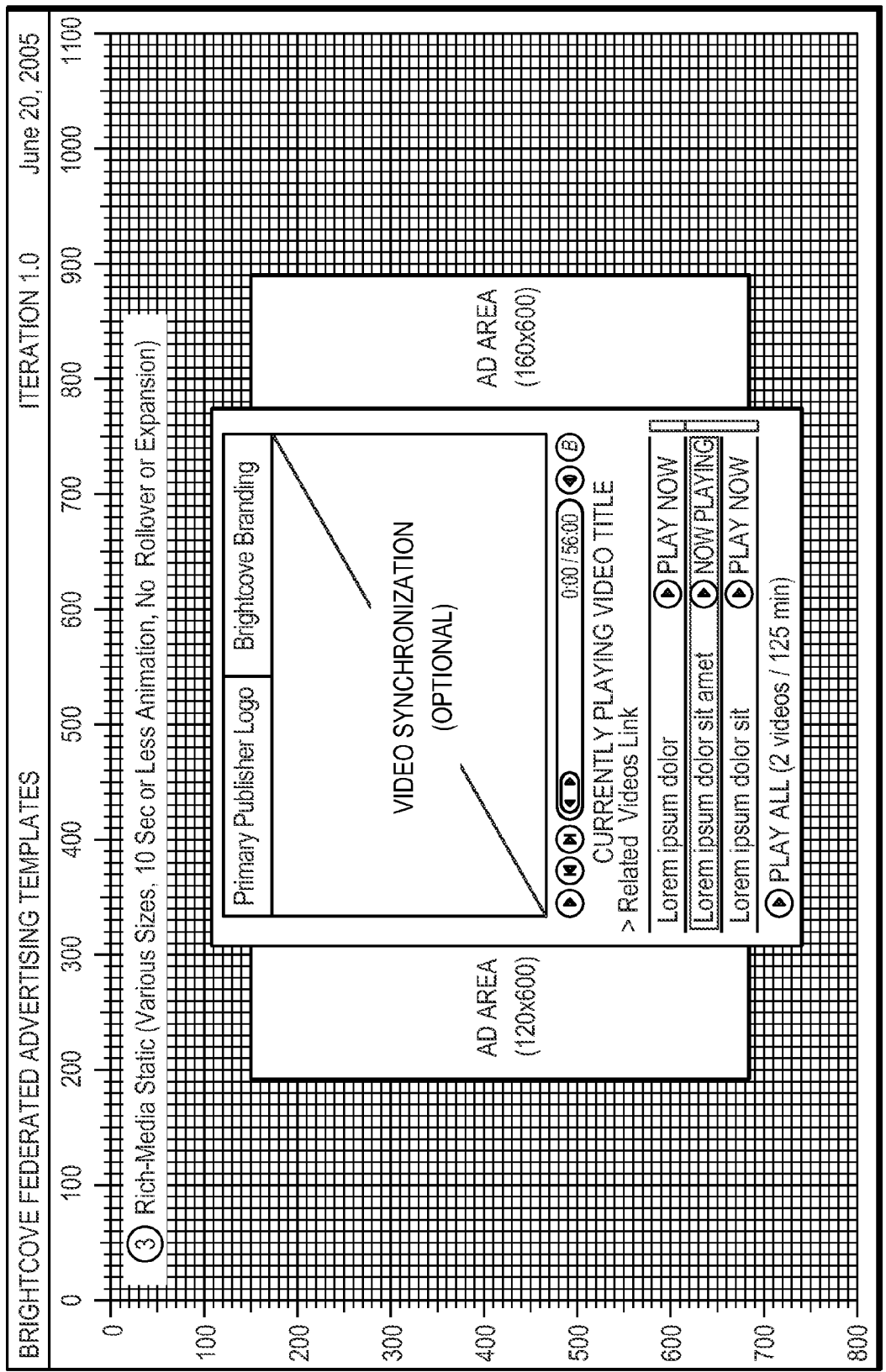
Figure 28:
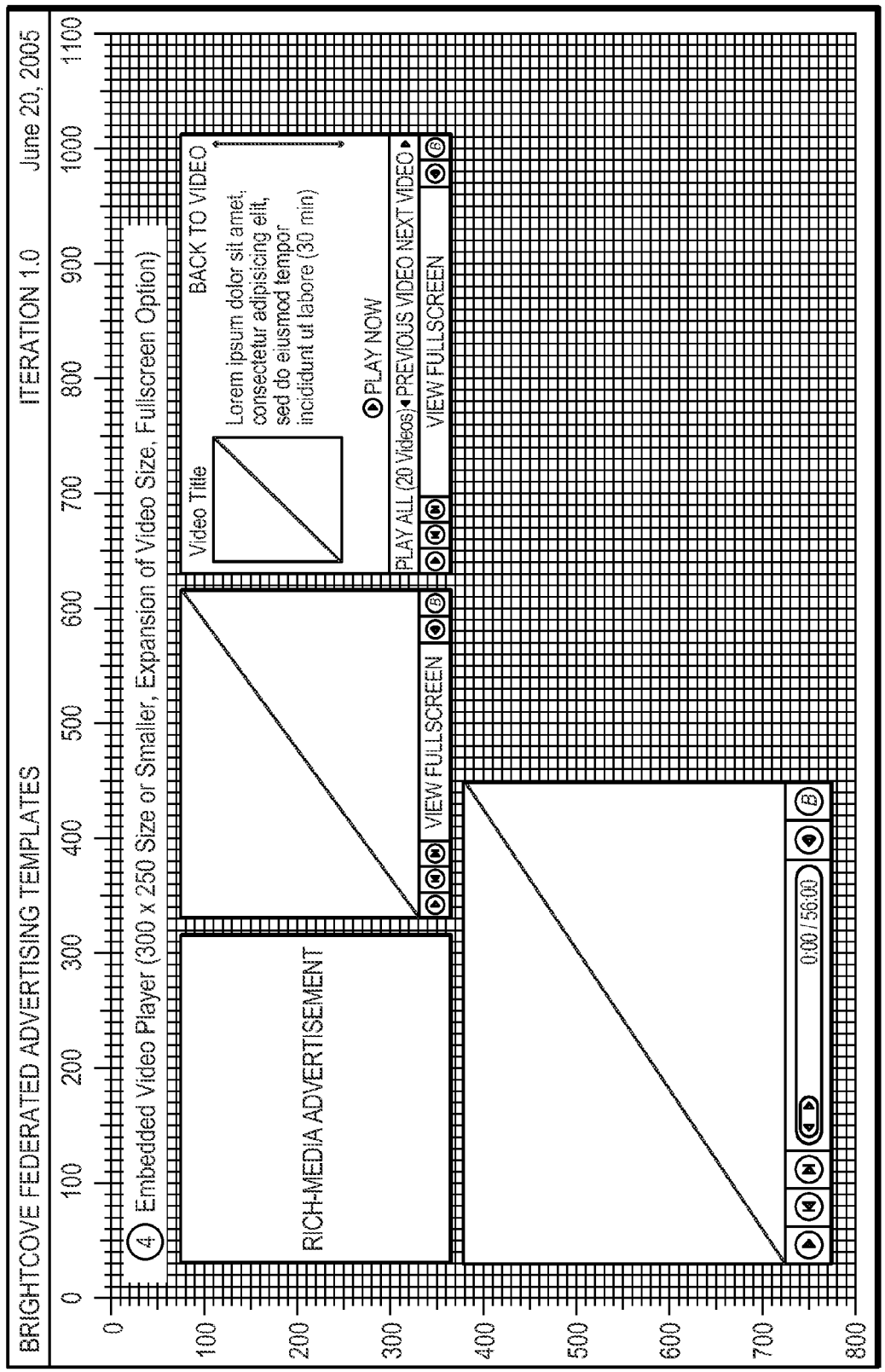
Figure 29:
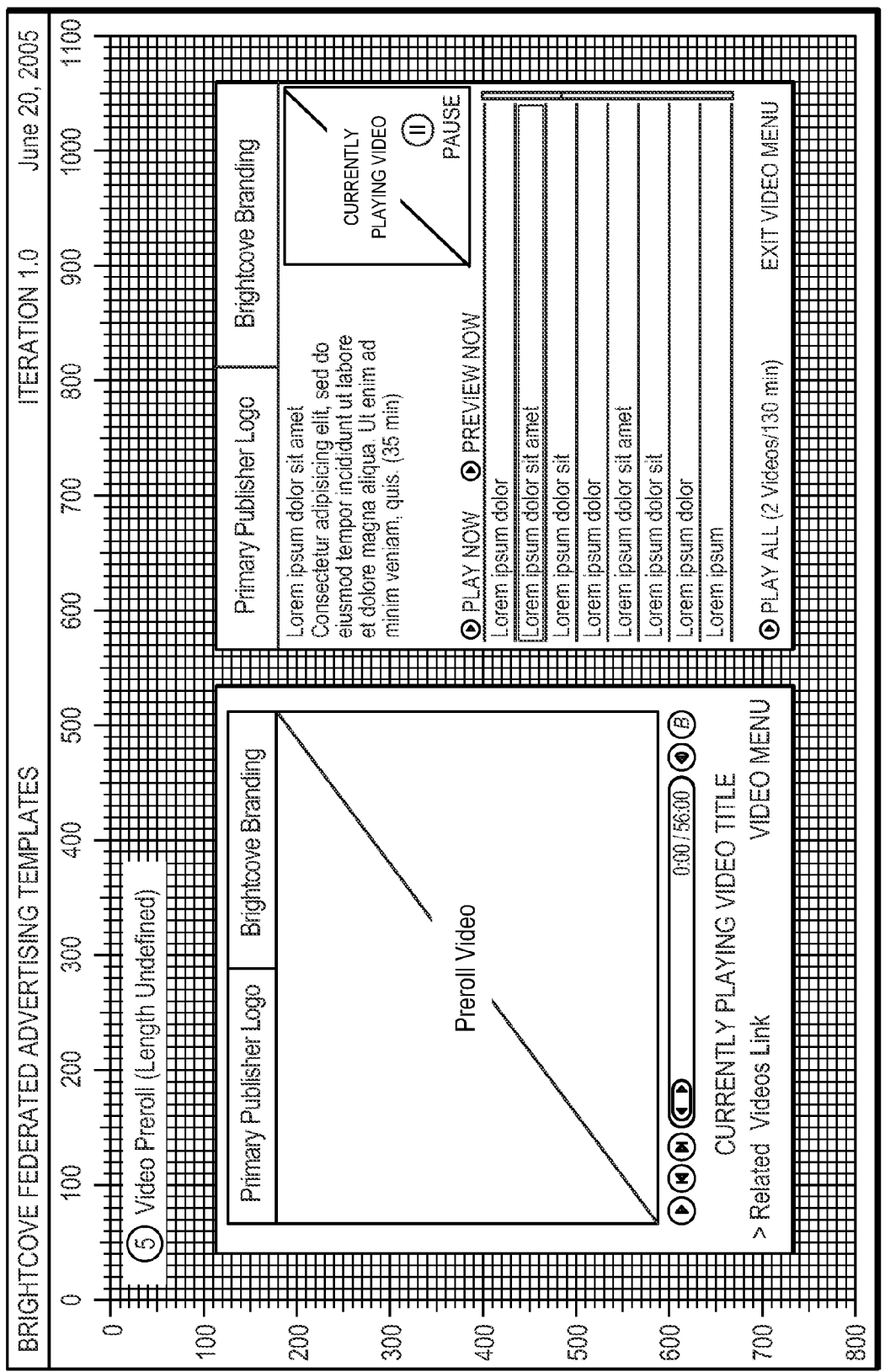
Figure 30:
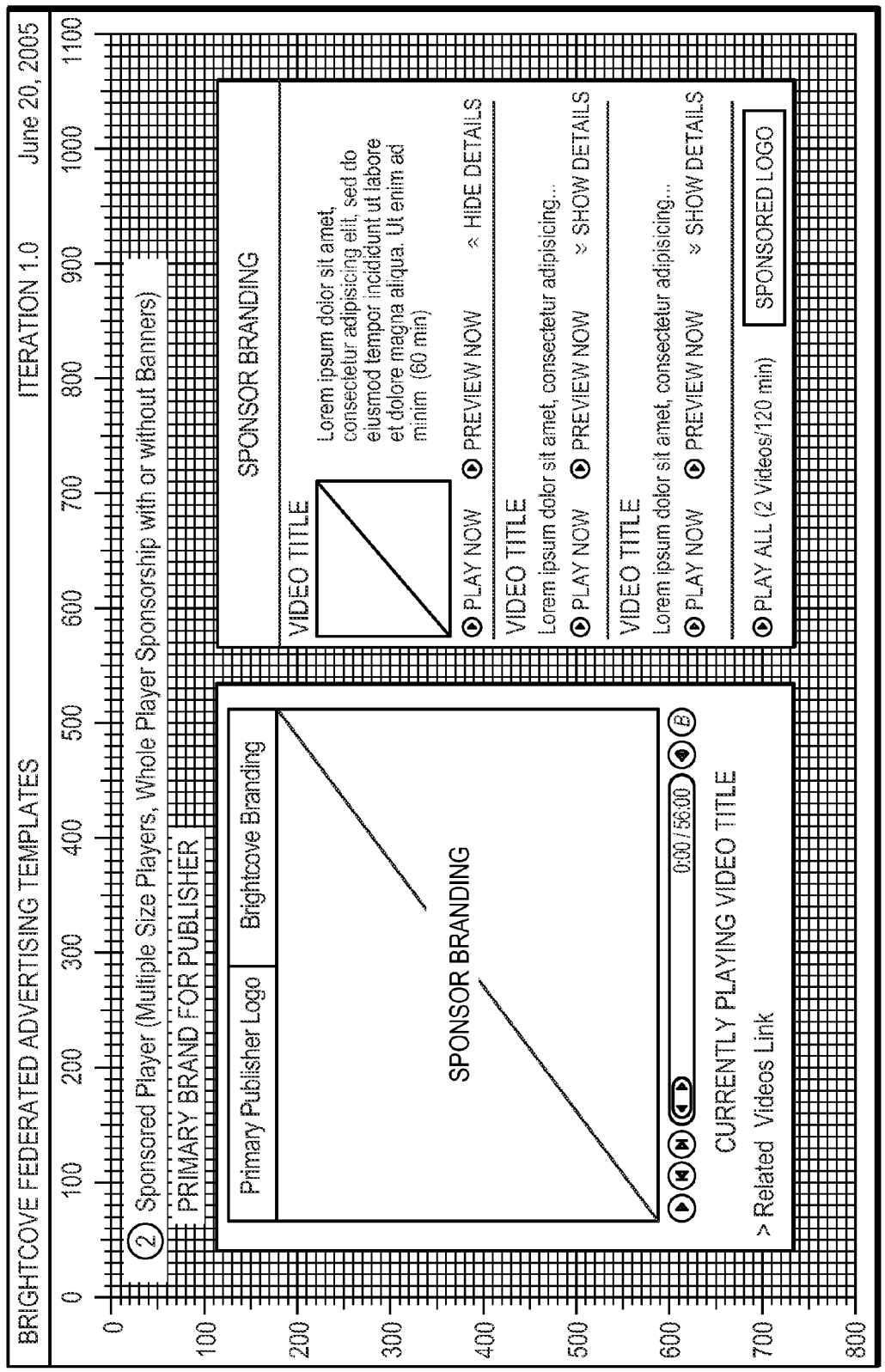
Figure 31:
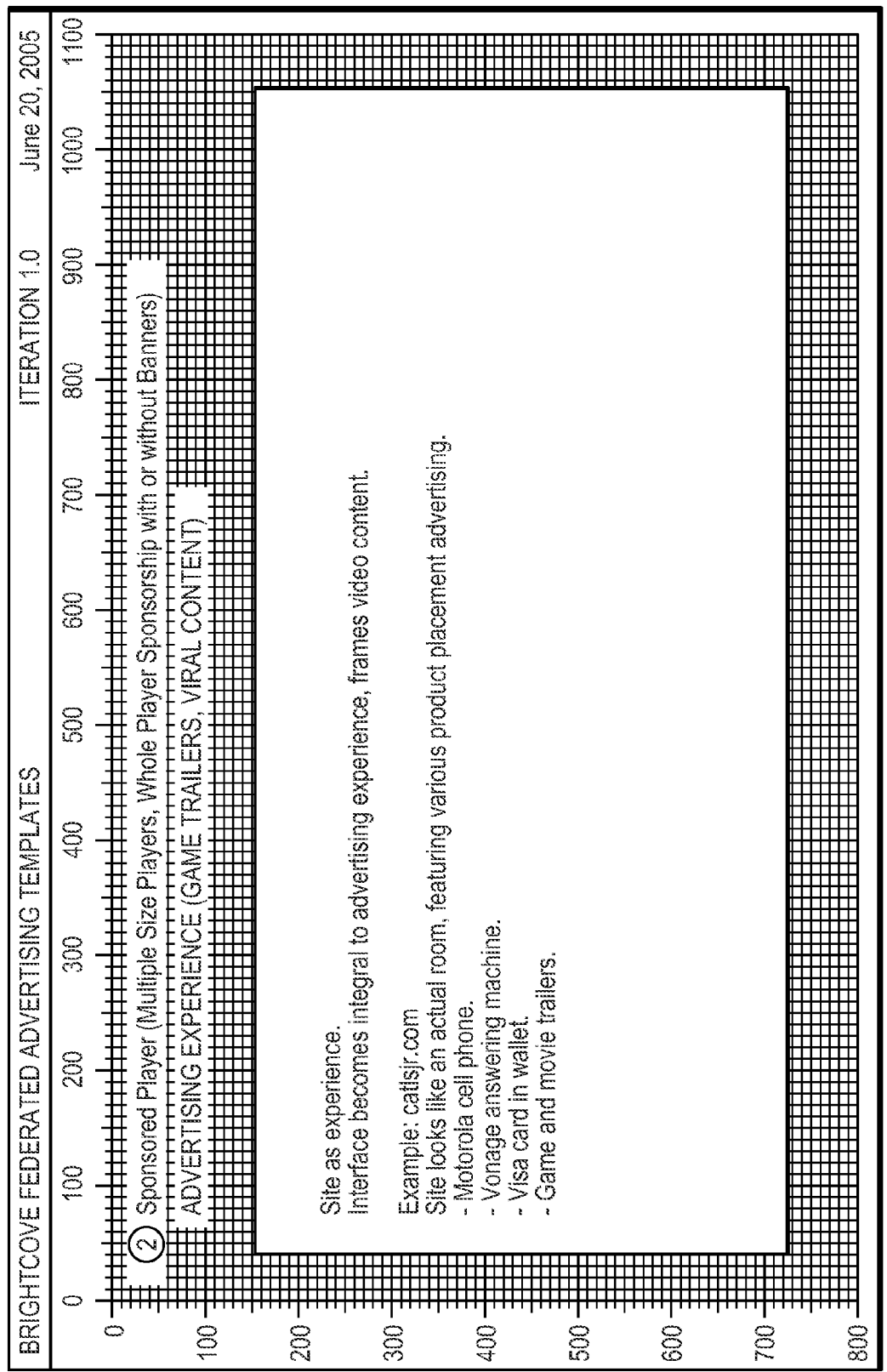
Figure 32:
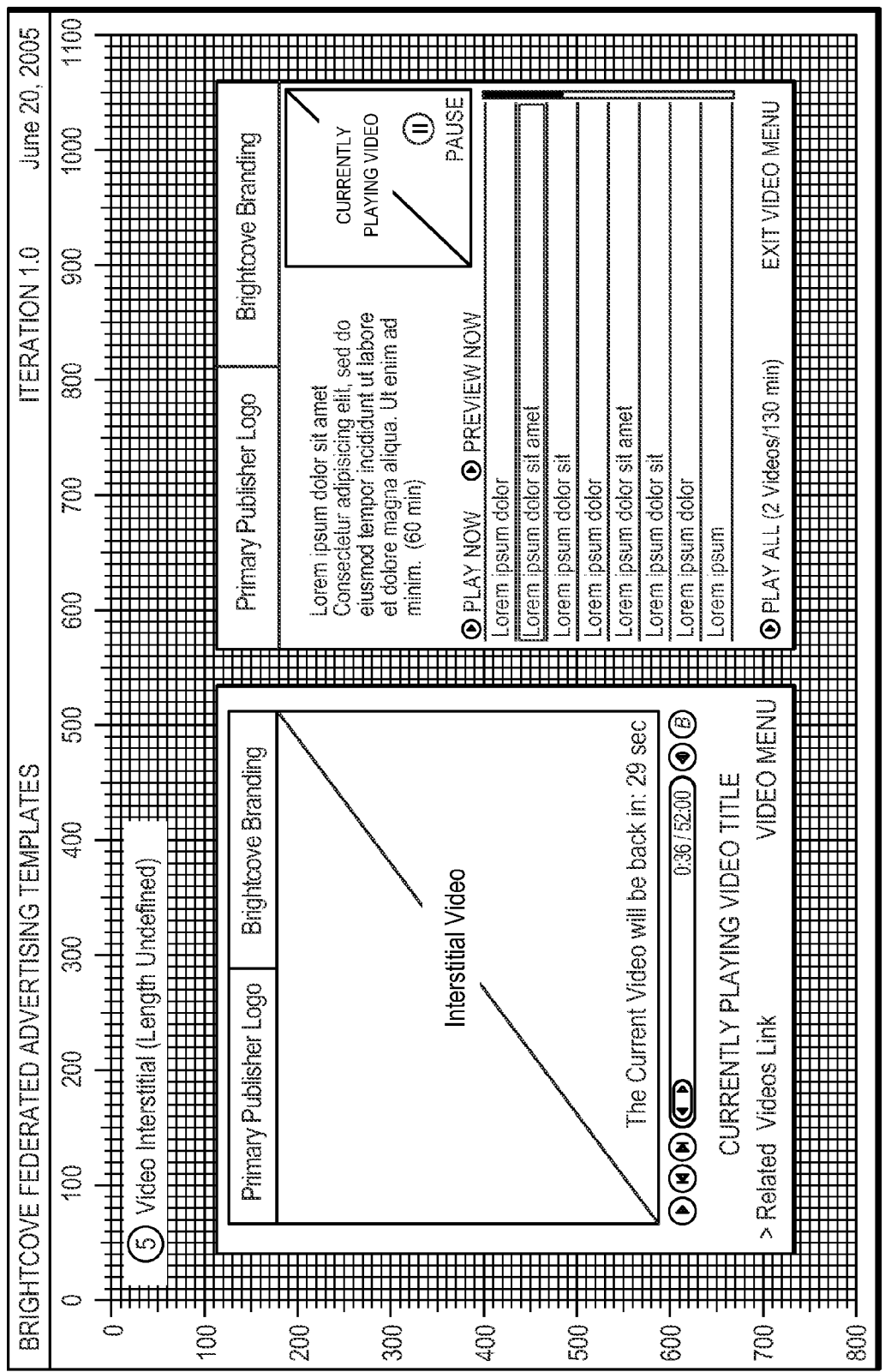
Figure 33:
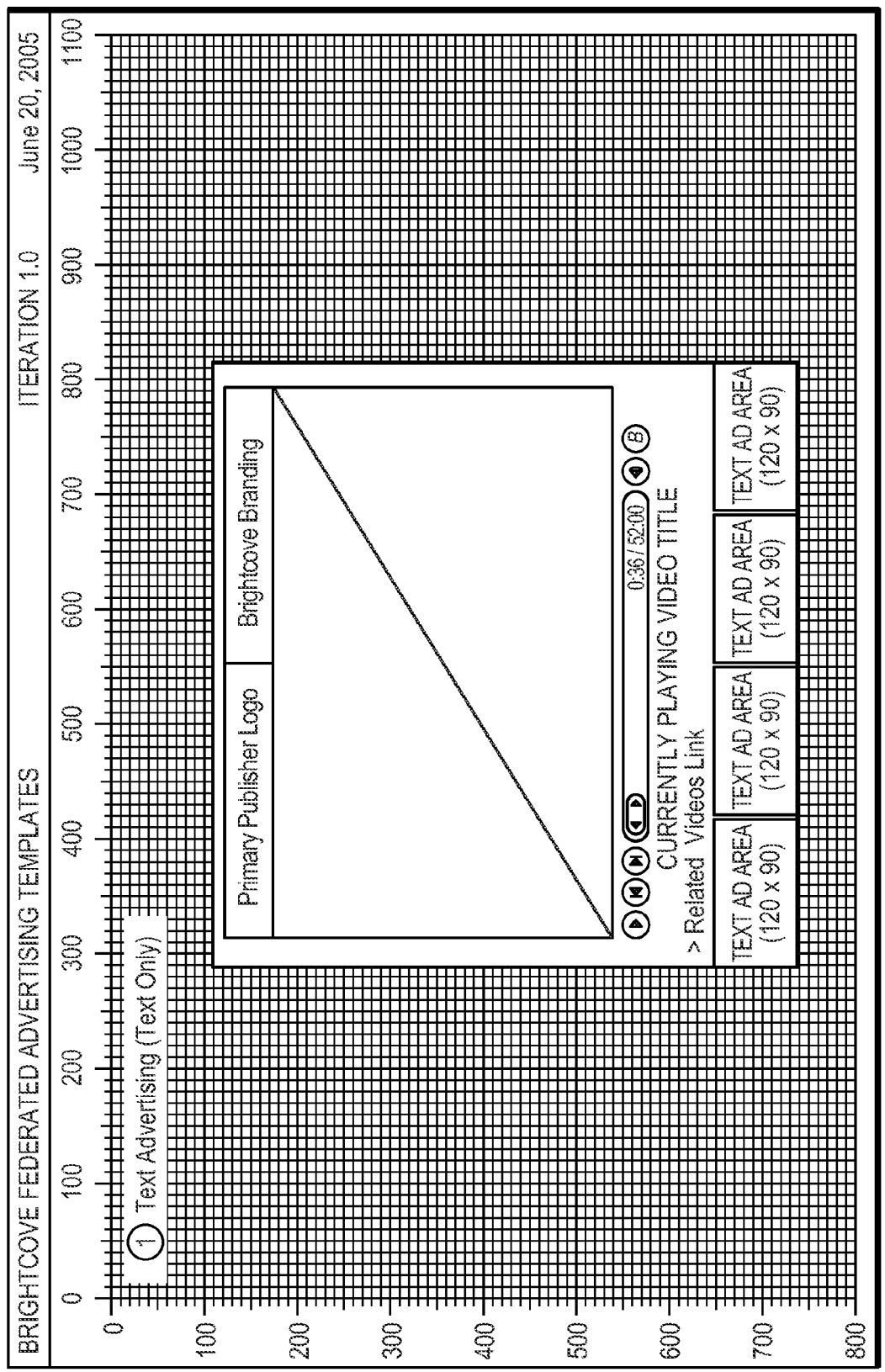
Figure 34:
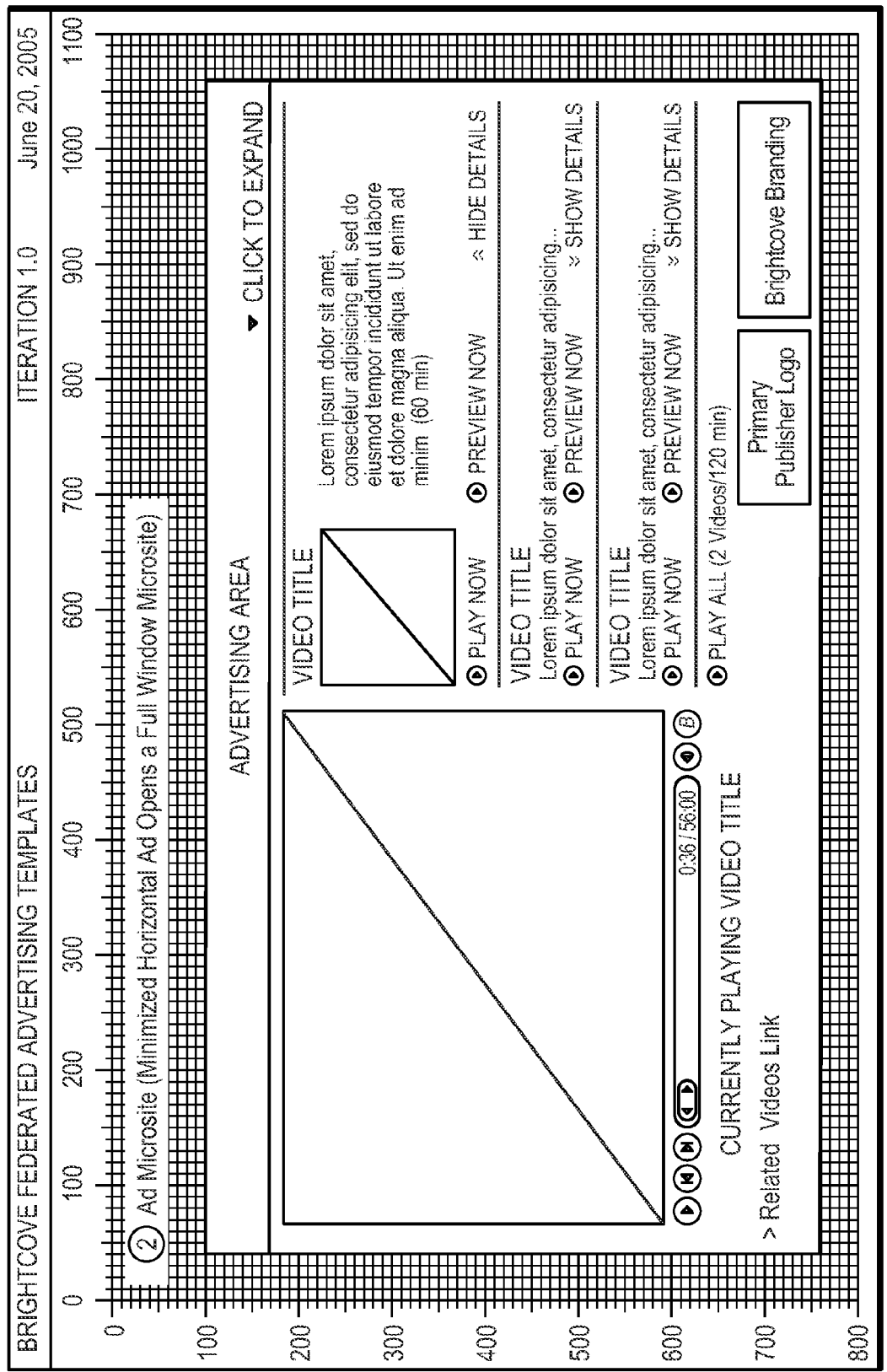
Figure 35:
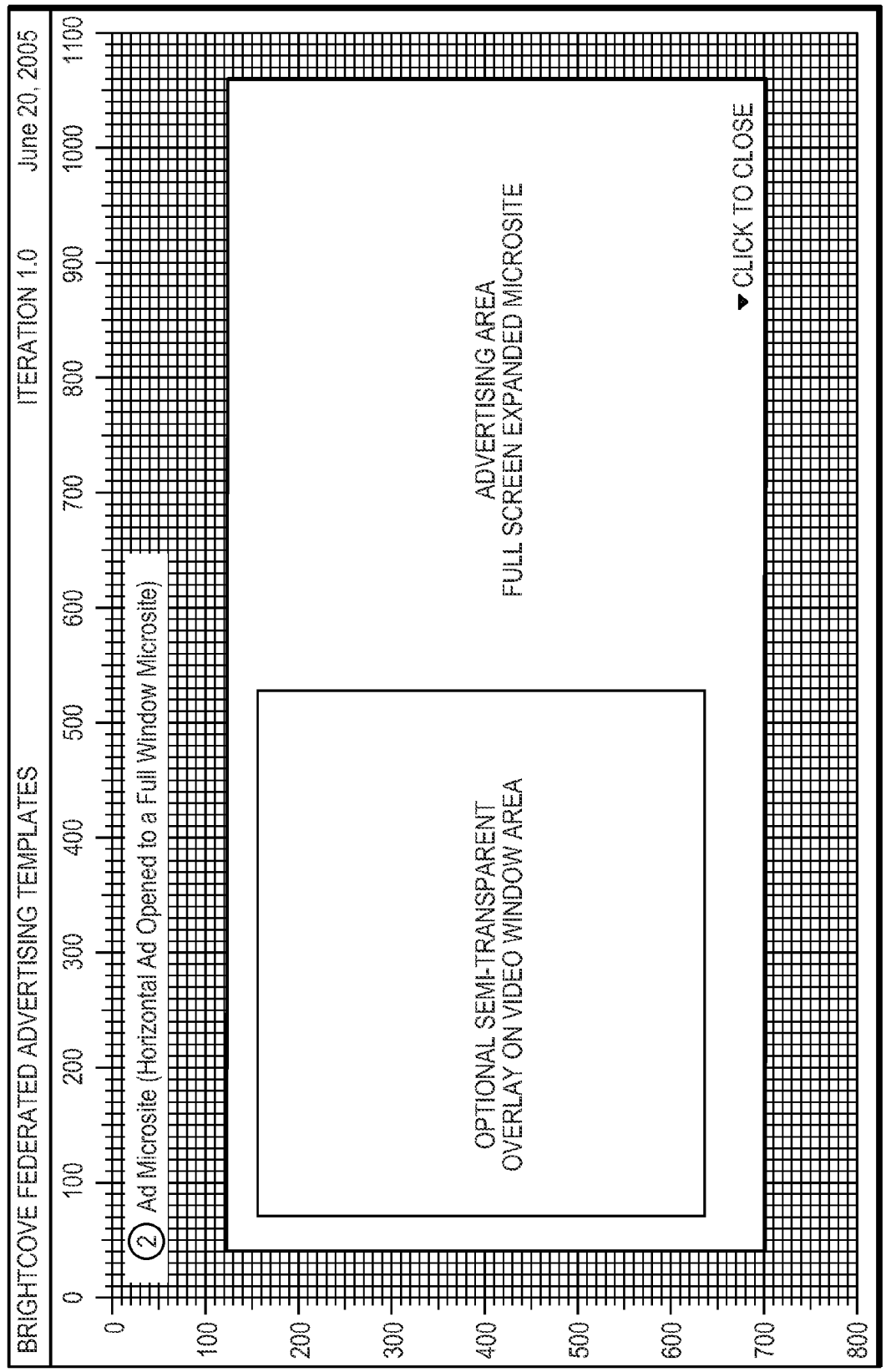
Figure 36:
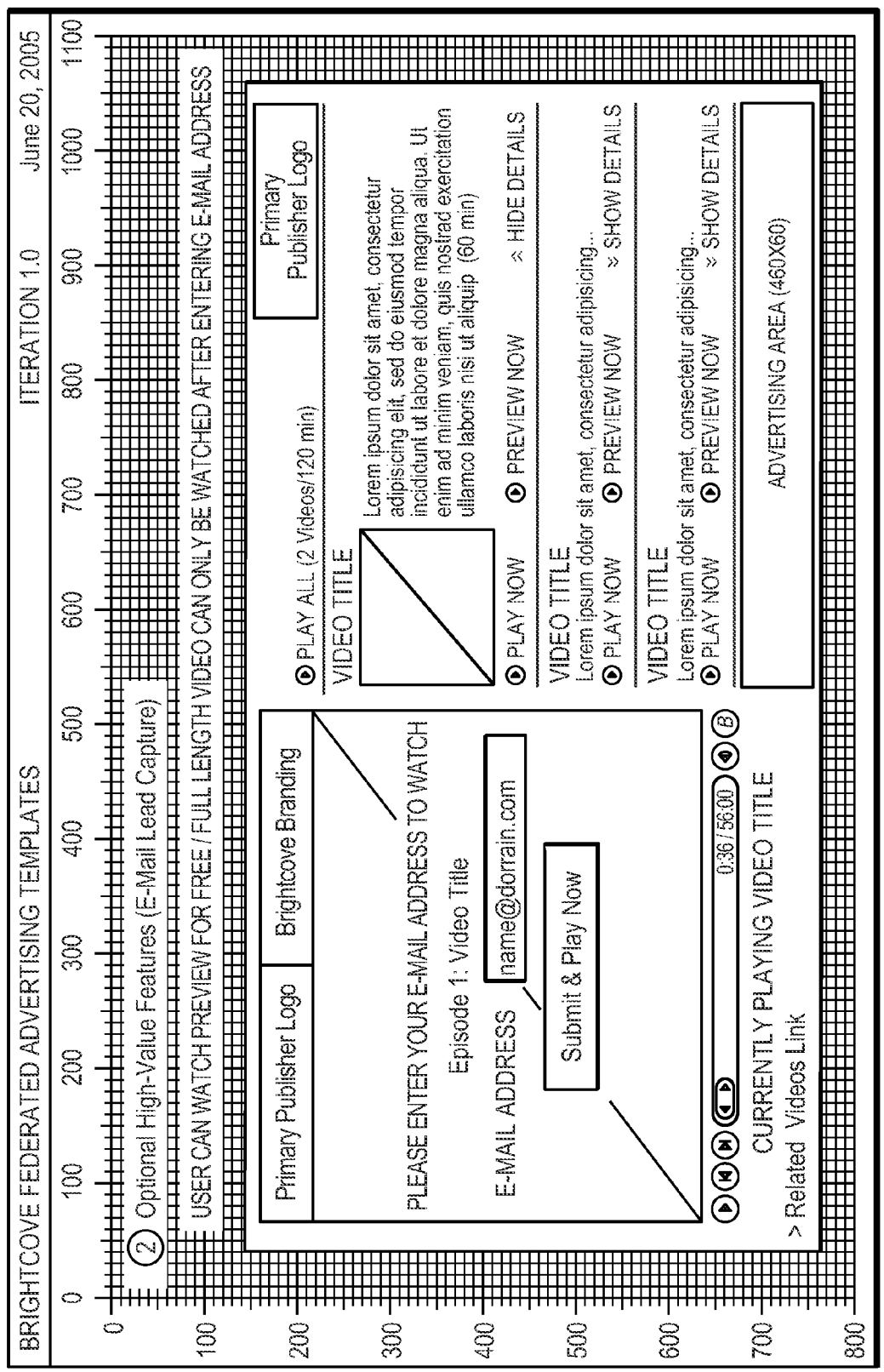
Figure 37:
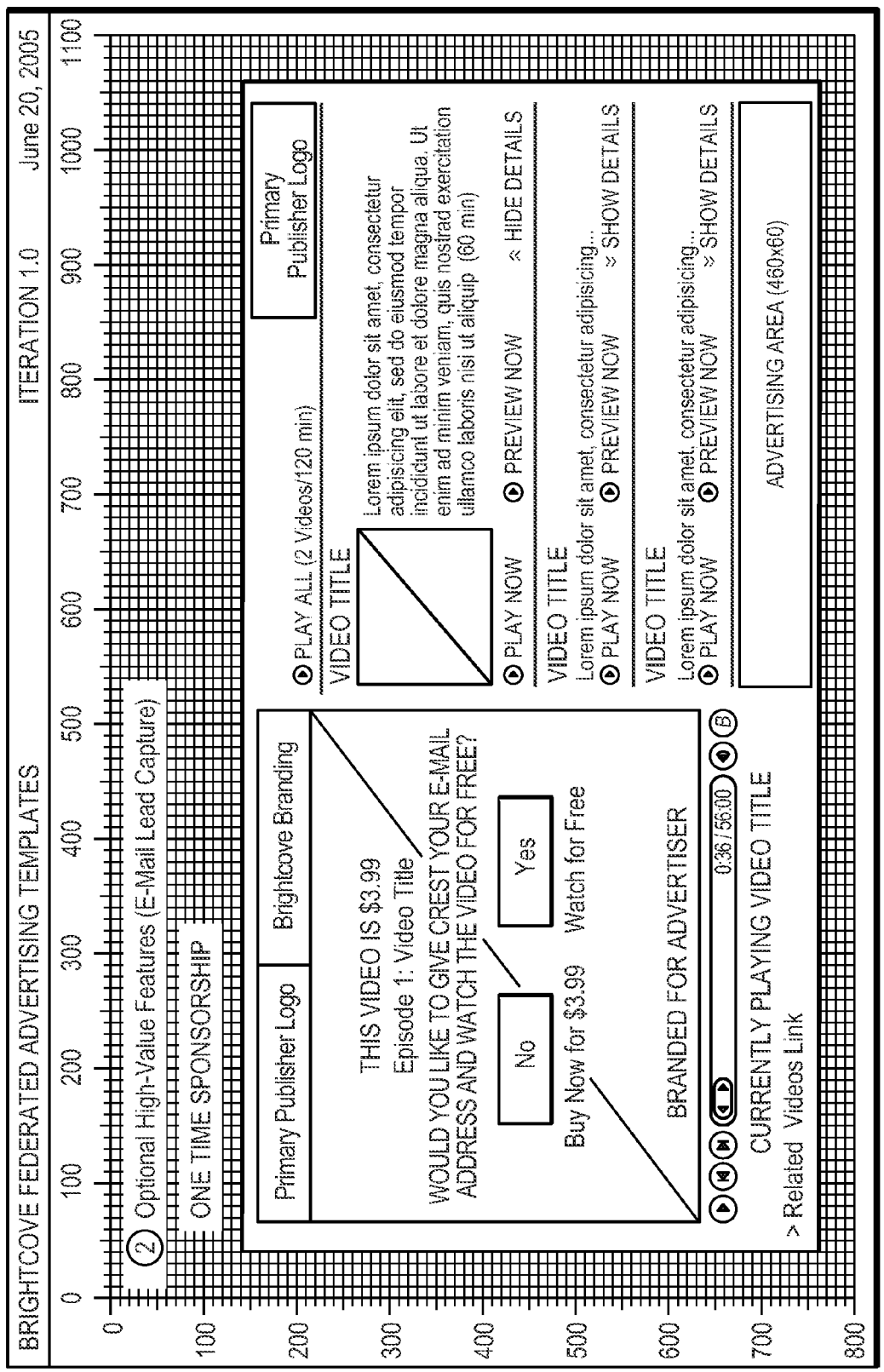
Figure 38:
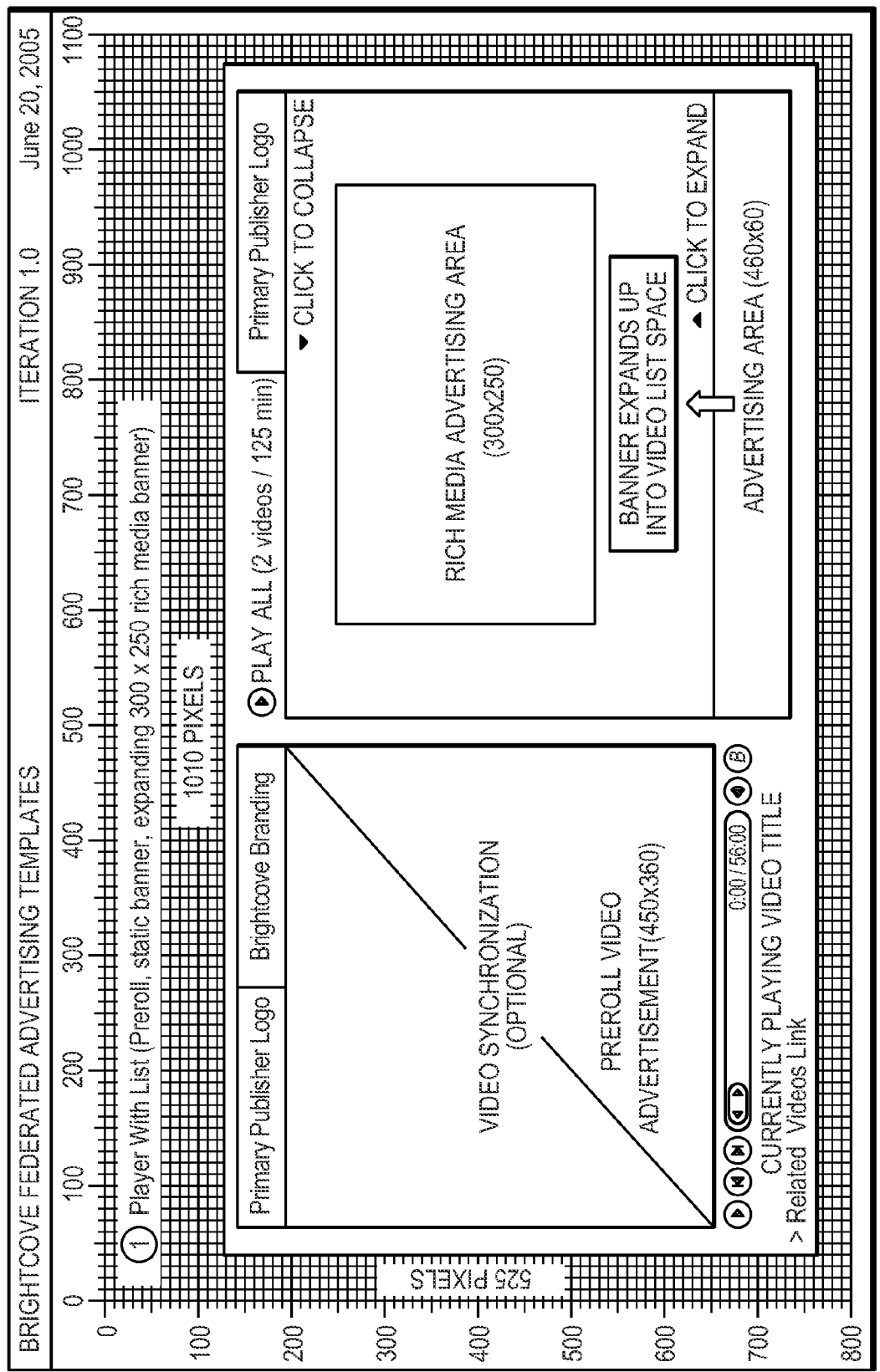
Figure 39:
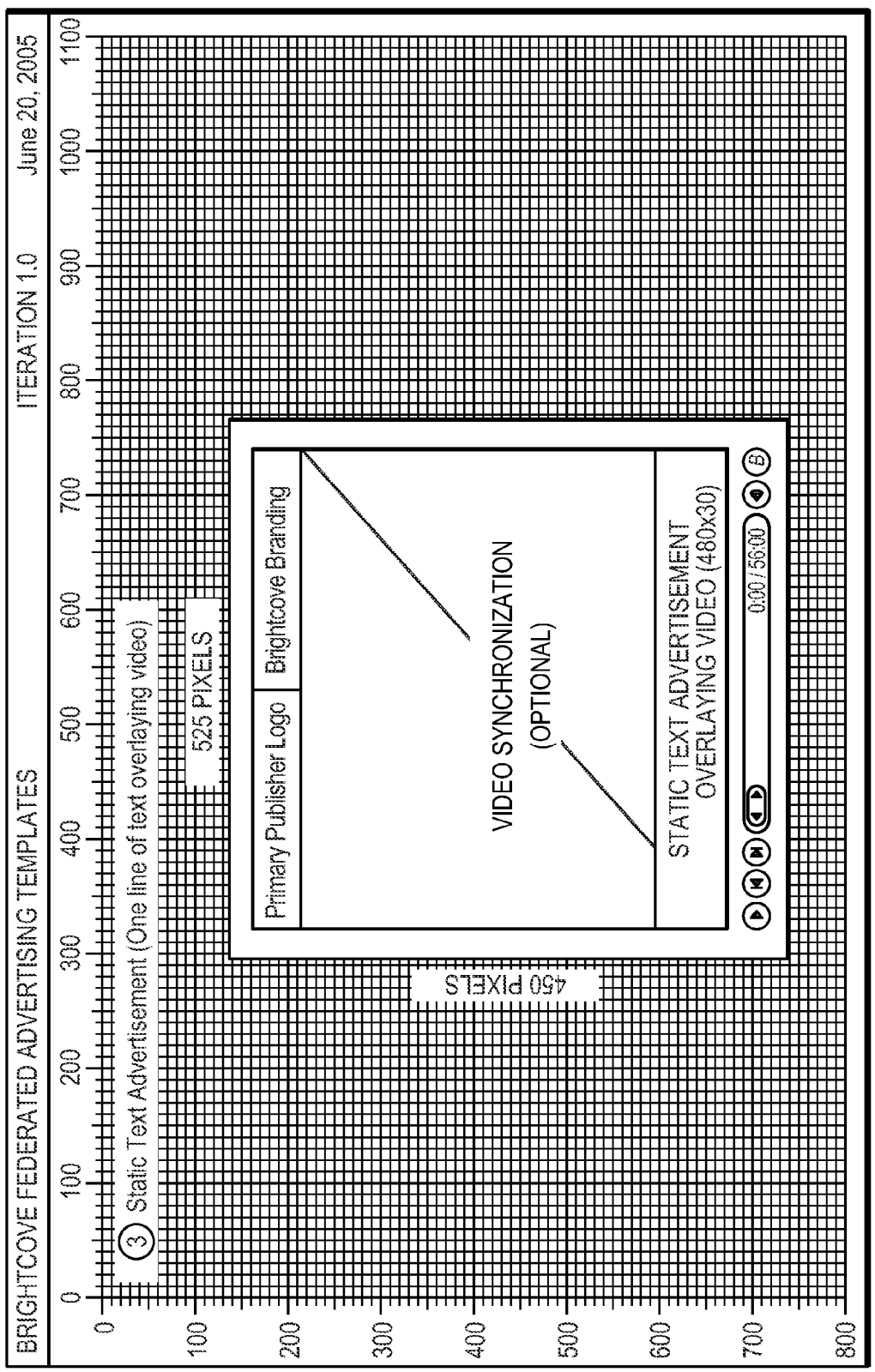
Figure 40:
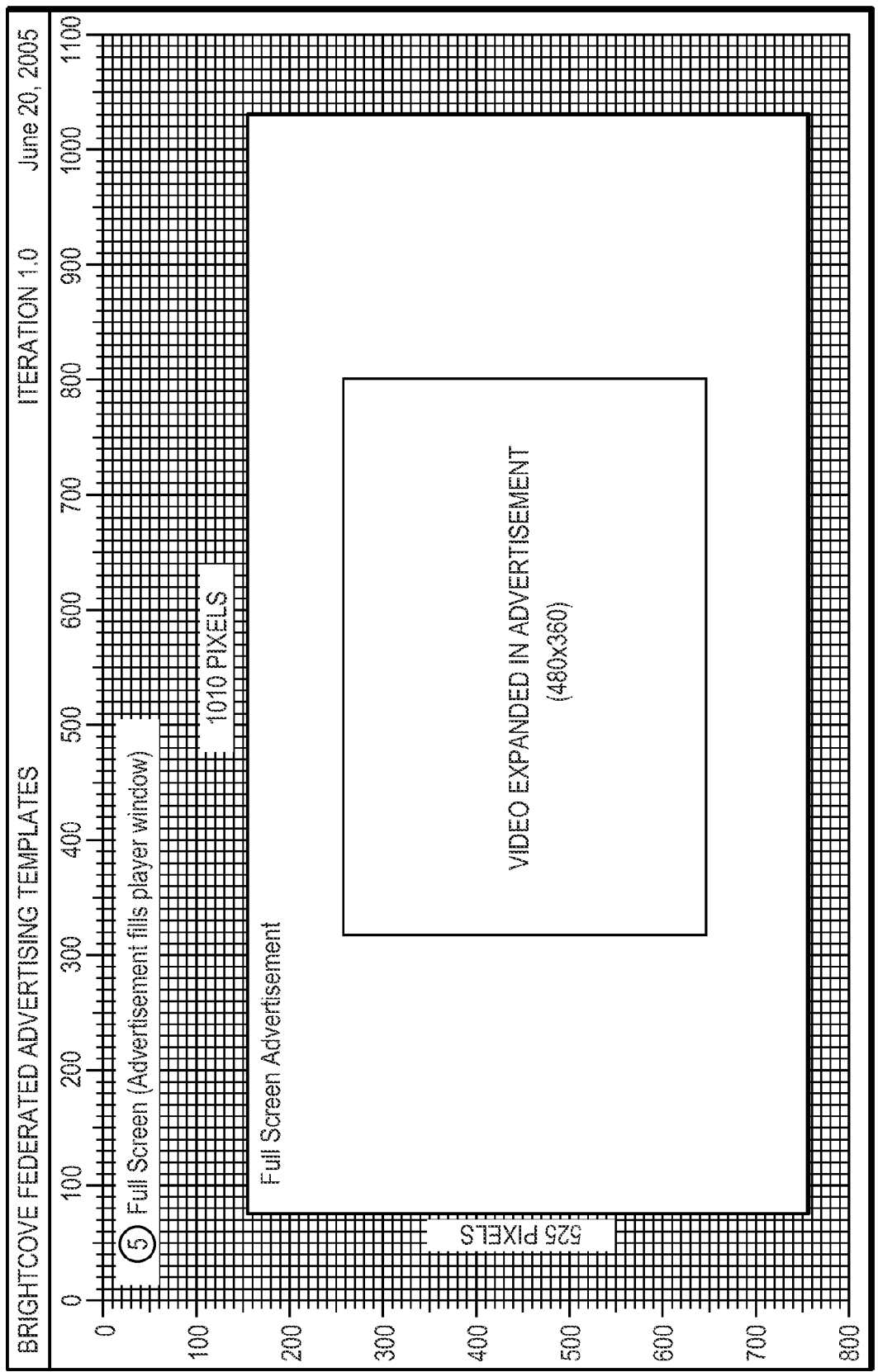
Figure 41:
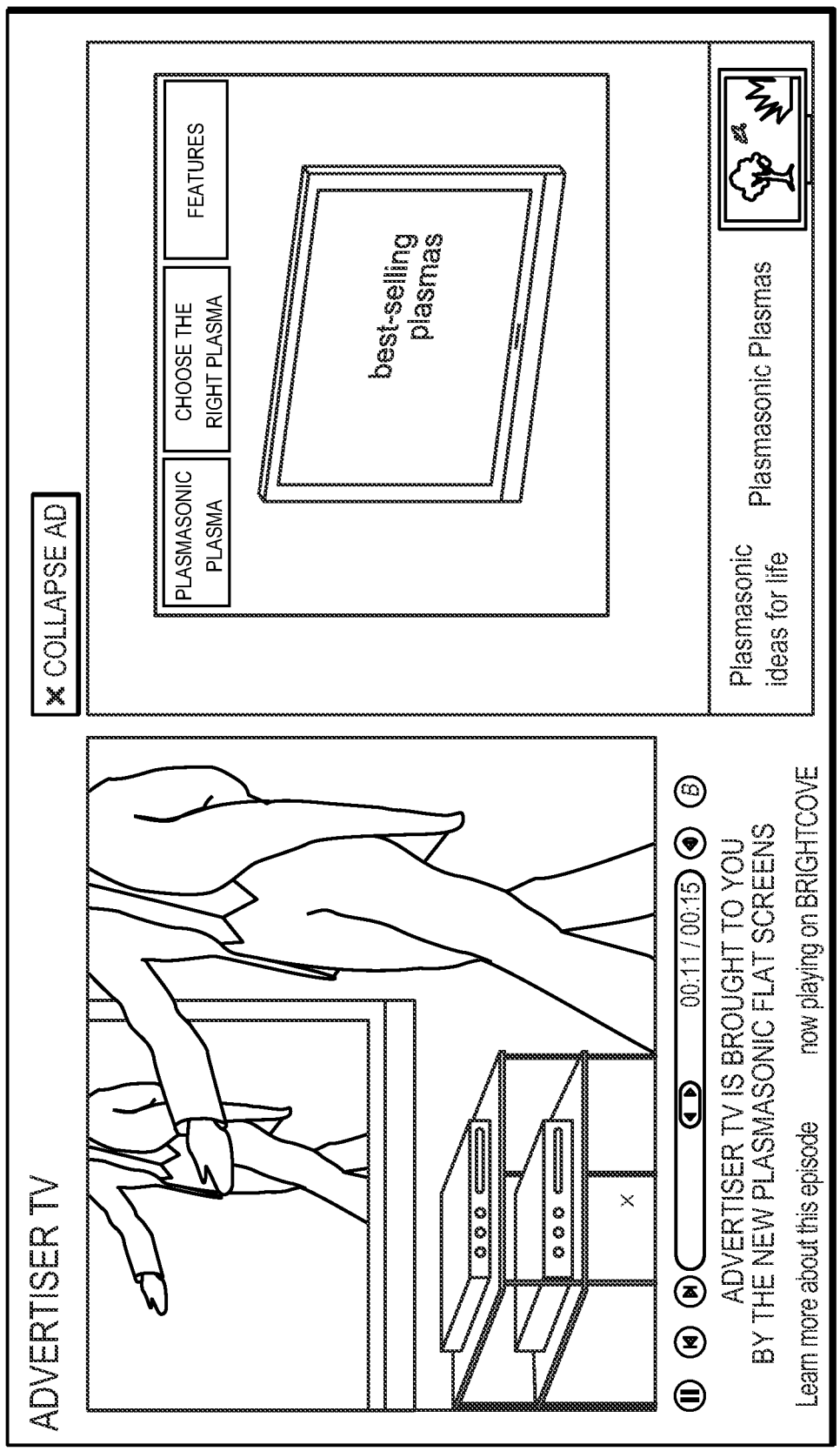
FIGS. 41-46 show screenshots of exemplary players.
Figure 42:
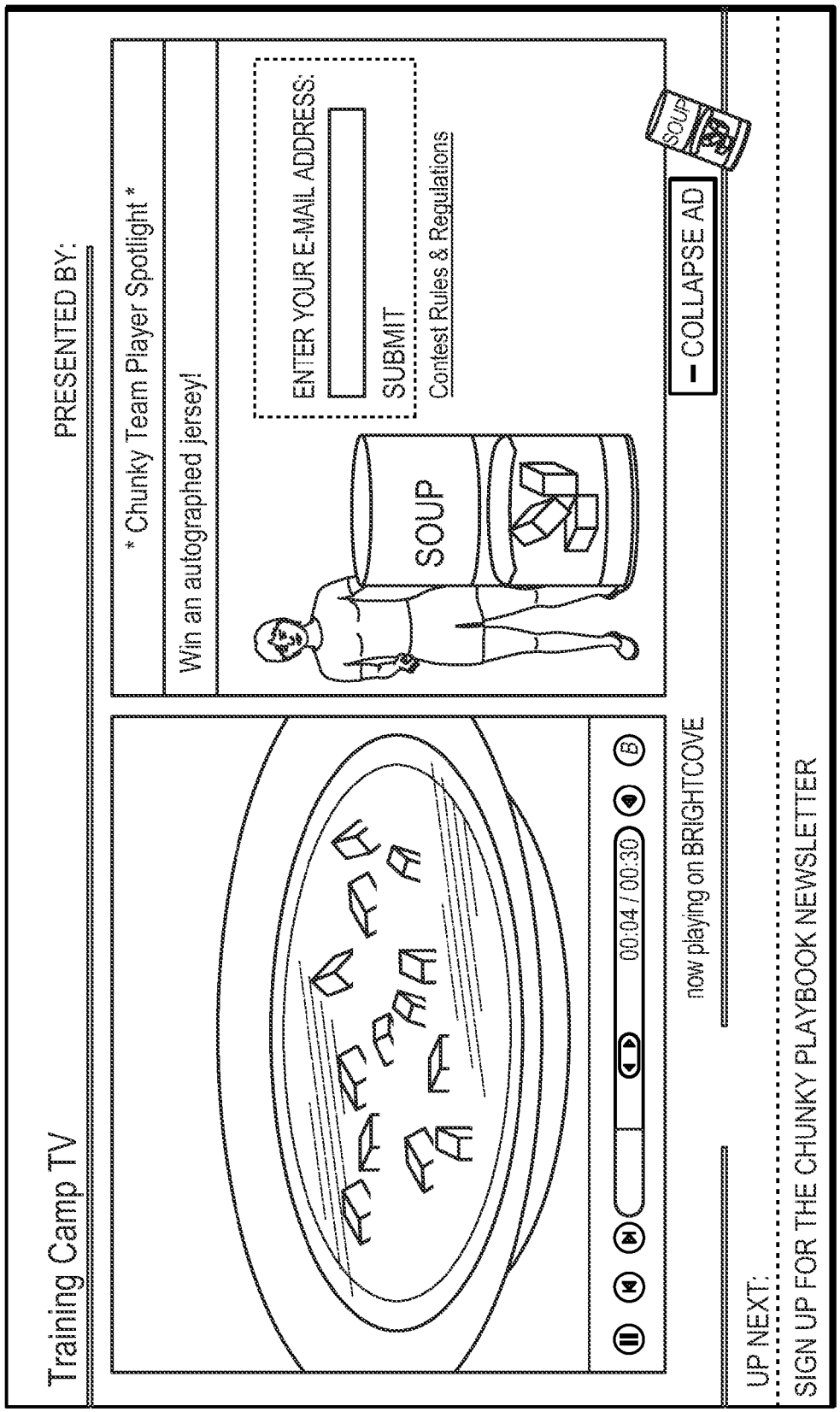
Figure 43:
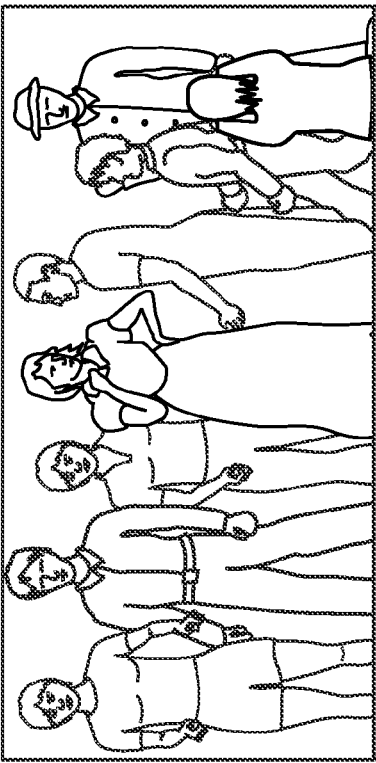
Figure 44:
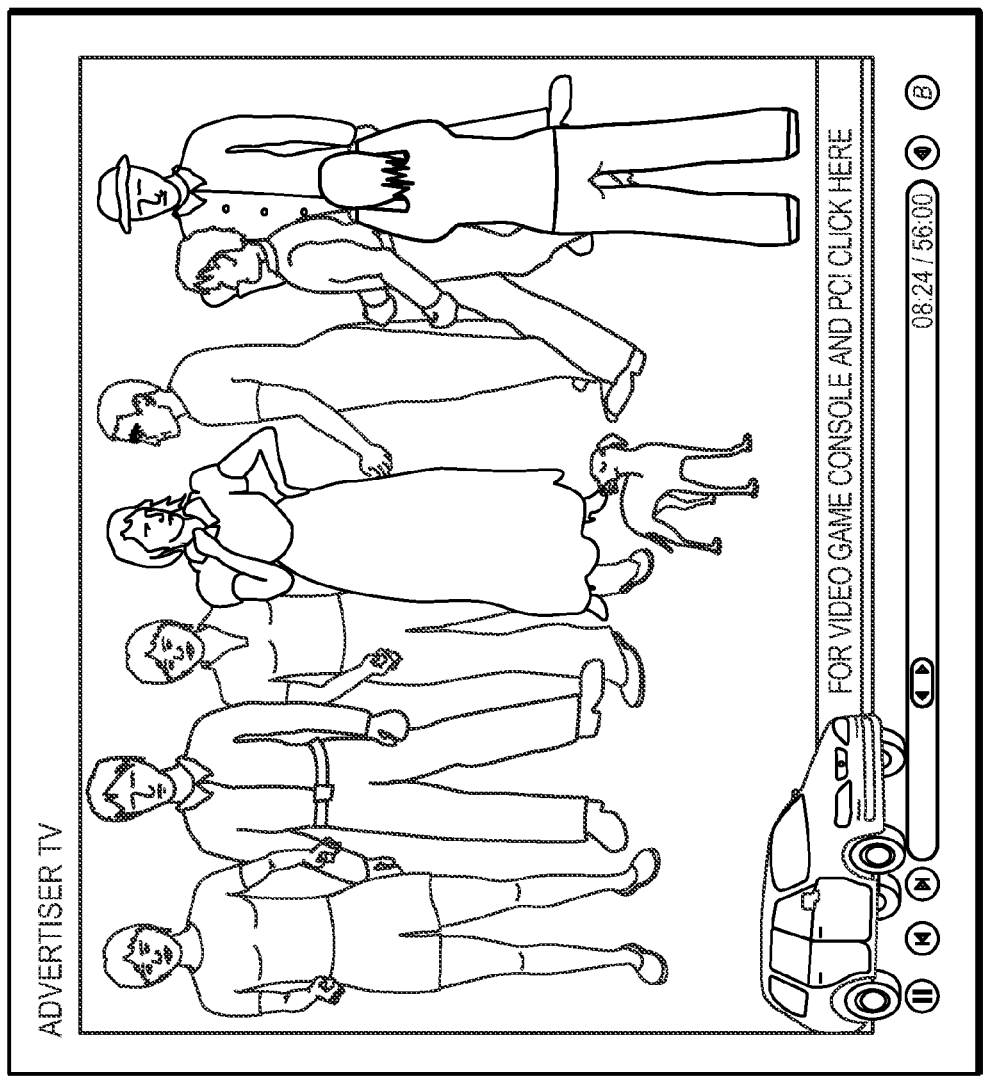
Figure 45:
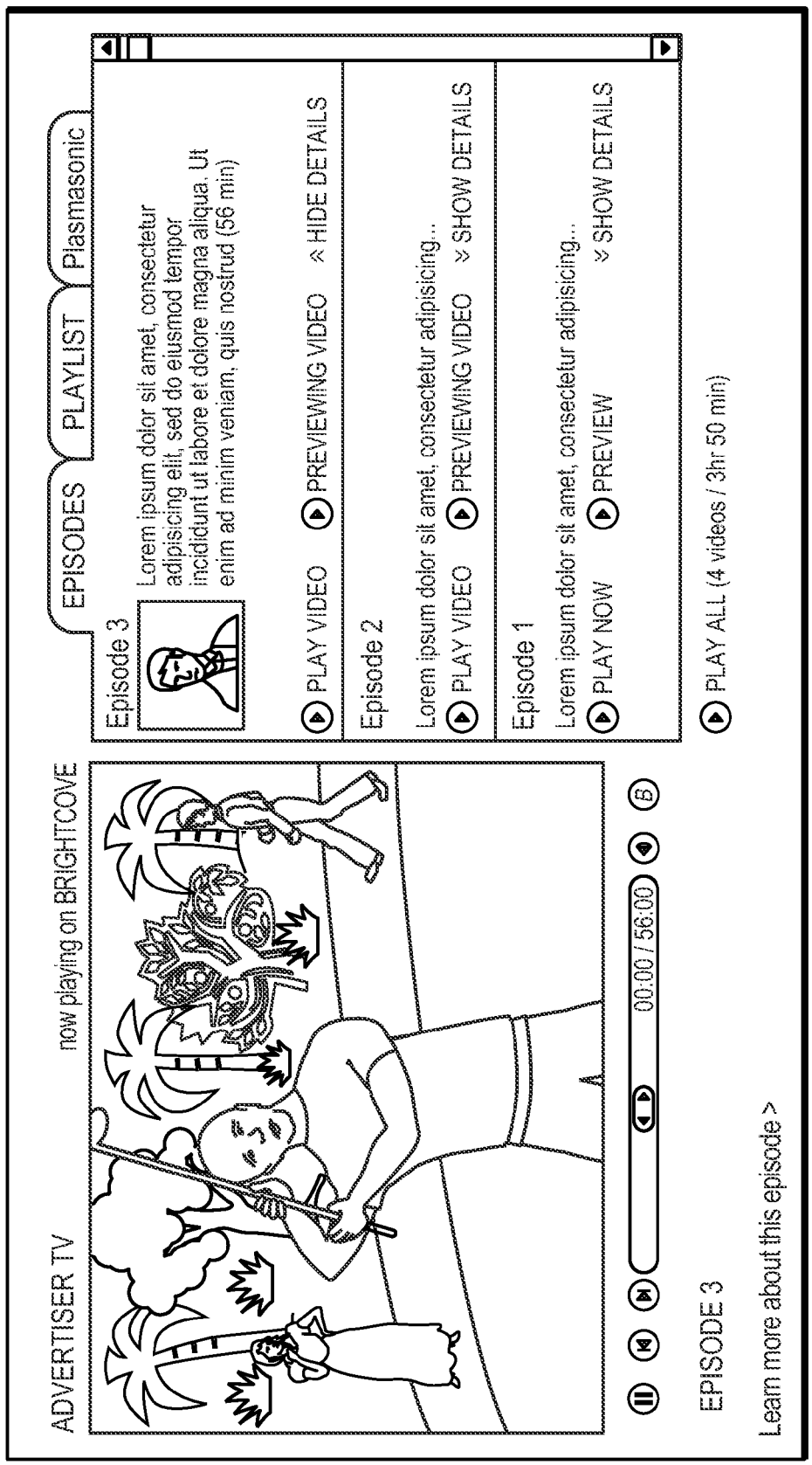
Figure 46:
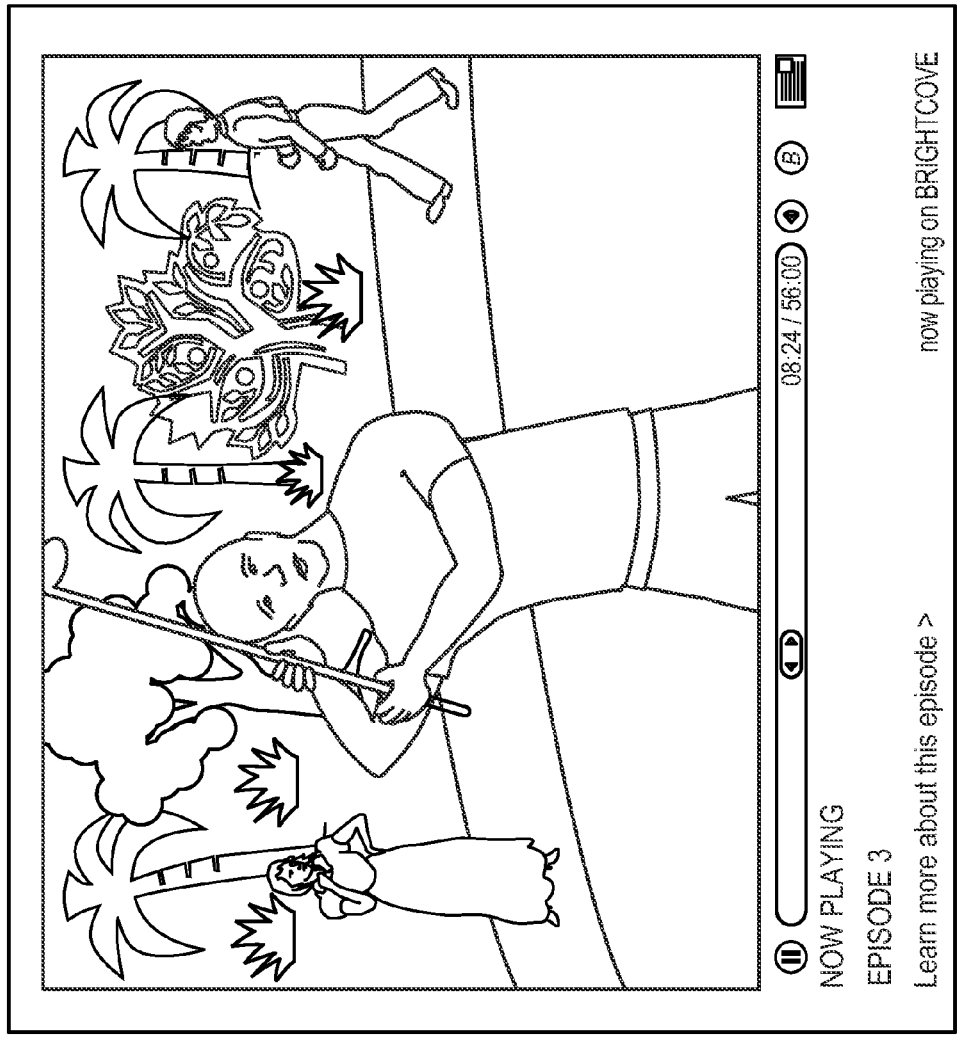

The section entitled Provisioning and Publishing Content Items describes the processes by which publishers, through the publisher console, upload and package content items and define a viewer experience for presenting the content items to a user in connection with the flowchart shown in FIG. 7. This section includes: a subsection entitled Registration that describes the process for registering a publisher with the service and creating an account; a subsection entitled Walkthrough Presentation that describes a process by which the system provides a "walk-through" (shown in the initial dashboard of FIG. 8) on how the publisher is to use the online programming and selling environment; a subsection entitled Uploading Content that describes the process by which a publisher uploads content to the service platform using a media management screen shown in FIGS. 9-10; a subsection entitled Title Generation that describes the process by which a publisher creates, edits, and manages titles of media content using a title management screen and a title editing screen (shown in FIG. 11 and FIG. 12) for defining and editing titles; a subsection entitled Lineup Generation that describes a process by which a publisher defines ordered lists of titles, referred to as "lineups" using a lineup management screen provided by the publisher console; a subsection entitled Player Definition that describes a process by which the publisher defines a player through which titles and lineups are presented according to a viewer experience using a player management screen shown in FIG. 13, a player editing screen shown in FIG. 14, and a template selection screen shown in FIG. 15 for selecting a player template from a selection of default player templates, examples of which are shown in FIGS. 16-19, a style editing screen shown in FIG. 20 for customizing the look and feel of the player, a content editing screen shown in FIG. 21 for selecting the content to be presented in the player, and a preview screen shown in FIG. 23 for previewing the player; and a subsection entitled Publishing Player that describes a process by which the publisher or any user can incorporate the player into their web page by inserting a presentation content code provided by the service platform. FIG. 24 shows an example of a presentation content code.

The section entitled Advertising, Promotion, and Marketing describes the tools provided to publishers that enable them to market their product offerings within the service platform network, including the publisher's websites or affiliate websites, and externally through marketing partners, customer messaging, and search engines. This section includes a subsection entitled User Notification that describes built-in mechanisms provided to publishers to notify users when new content items and services become available; a subsection entitled Keyword Bidding that describes tools provided to the publisher for managing and bidding on keywords and paid listings in search engines; a subsection entitled Advertisement-Supported Content that describes a feature of the service that enables advertising to be integrated with packaged content items; a subsection entitled Advertisement Insertion Tools that describe tools that enable the publisher to define the placement and accepted formats of advertising in a player; and a subsection entitled Advertising Templates that describes a selection of advertising templates, examples of which are shown in FIGS. 25-40, in which a publisher or advertiser may place video, banner, logo, or any other graphic or textual advertisement or promotional content and from the advertising templates, define the players shown in FIGS. 37-46; and a subsection entitled Ad Renditions that describes different renditions of ads that can be served to a user 12 based on the method that the user views the ad (e.g. video streaming).

The section entitled User Experience describes various features of a user experience and the process by which a user interacts with the service. This section includes a subsection entitled Desktop Client that describes the features of a desktop client application that provides an enhanced entertainment experience; a subsection entitled Service Platform Features that describes features made available to a user through the service platform; a subsection entitled Account Management that describes account management service provided to the user for registering with the system and creating and managing an account; a subsection entitled Television that describes the user functions that are available through a television interface; a subsection entitled Download of Content that describes various mechanism by which the service delivers downloaded files to a user; and a subsection entitled Communities of Interest that describes the community-oriented tools provided by the service to help users to share information regarding a content item with others.

A second part entitled Revenue Models provides a description of various revenue models that are supported by the content distribution system. The chapter includes a section entitled User Pays that describes a revenue model based on money collected from users. The different mechanisms by which revenue is collected from users are described in the subsections entitled Subscriptions, Rentals, Purchases, and Bundles. The subsection entitled Pricing and Payment describes different methods by which a publisher prices content items and mechanisms by which users pay for those content items. For example, as described in the sub-subsection entitled Demand Curve Model, a publisher can set the price of a package according a demand curve model and multiple pricing models that are linked to characteristics of different users (e.g., the interest of the user in particular topics and the user's impression of the quality of the publisher, etc.).

The section entitled Publisher Pays describes a revenue model based solely on money paid by the publisher for use of the service. The section includes a subsection entitled Listing Fees that describes the types of listing fees paid by publishers to use the service; a subsection entitled Activation describes the process by which a publisher activates publisher pays economics; a subsection entitled User Access describes various options available to a publisher for restricting access a users access to content items; a subsection entitled Usage Reports that describes the types of reports provided to the publisher that detail usage and invoice data associated with the publisher's content items.

The section entitled Affiliate Pays describes a revenue model based solely on money paid by the affiliate as fee to use content provided by publishers.

The section entitled Advertising Supported Content describes a revenue model based on advertising.

The third part entitled Business Models describes various business models supported by the content distribution system and the flow of money in accordance with the applicable business model. The business models are described in the sections entitled Open Marketplace and Federated Marketplace. Various features of the federated marketplace business model are described in the subsections: Federated Delivery, Federated Identity, Affiliate Relationships, and Revenue Sharing.

The fourth part entitled Components of the Content Distribution System describes various technical implementations of the content distribution system.

I. System Overview

The content distribution system 10 shown in FIG. 2 supports a variety of business models that enable publishers to publish, package, brand, and sell video and other content items (also called assets) through their own presentation contexts 15 (e.g., websites) and optionally through a marketplace of suppliers (referred to as affiliates). The term service includes all of the features, systems, and methods described here for enabling publication and delivery of content by any party.

The content distribution system 10 includes a service platform 30 maintained by the content distributor 31, client computers 14, 18, and 26, a network 36 (e.g., the Internet) that delivers data between the client computers 14, 18, and 26 controlled by publishers 22, affiliates 24, and users 12, and a content delivery network (CDN) 34 that delivers data on behalf of the service platform 30 to the client computer 14.

The publisher console 20 is a user 12 interface through which a publisher 22 at a client computer 18 interacts with the service platform 30. Using the publisher console 20, a publisher 22 registers with the service platform 30, which in turn assigns a unique publisher identification number to the publisher 22, and uploads assets to the service platform 30. The service platform 30 associates the assets with the publisher's identification number and stores the assets in the content library 32. The assets may include video, image, audio files, and any other kind of media content.

In connection with uploading, the publisher 22 can define and create packaged content items 23 from the assets uploaded into the service platform 30 and publisher 22 supplied metadata. The publisher 22 can create a range of commerce-enabled packaging options on their packaged content items 23, including: subscription packages that provide monthly and annual billing with constraints on available programming for the user 12; pay-per-view and purchase-to-own options with micro-payment billing on individual titles; and advertising supported media, including tools to easily insert and manage a set of rich media advertising formats, including interactive and video advertisements. The publisher 22 specifies the prices for accessing, renting, or purchasing or subscribing to packaged content items 23, and discounts that may apply to volume usage or other promotional mechanics. Publishers are also able to participate in a dynamic bundling system in which they can offer their content items as part of consumer self-packaged bundles of programming. The publisher 22 may choose to be pay listing fees for all costs associated with the distribution of packaged content items 23. Publishers 22 may grant access to their packaged content items 23 to affiliates 24. The affiliate 24 may in turn act as a distribution channel for consumer transactions or advertising on the behalf of publishers 22. An affiliate 24 may request the right to syndicate and pay publishers 22 for the privilege of delivering the publishers 22 packaged content items 23. The service collects revenue from publishers in the form of listing fees, from consumers in the form of payment for accessing content items, from affiliates 24 in the form of syndication fees, and from advertisers in the form of payments for performance-based advertising inventory. Gross revenues from consumers, syndication fees and advertisers are shared among affiliates, publishers, and the service.

In the publisher console 20, the publisher 22 defines a framework for displaying the uploaded assets and packaged content items 23 to a user 12. This framework is referred to as a "viewer experience" and is an example of the presentation style referred to with respect to FIG. 1. A viewer experience may include the order in which (e.g., as a video lineup or an audio play list) packaged content items 23 are presented and the display of the economic terms for accessing, renting, or purchasing packaged content items 23. A viewer experience may also associate various images with video clips such that when a user 12 runs a video clip, the client device displays a corresponding image. The viewer experience can be implemented as a Flash Macromedia® program or any other program for authoring and delivering multimedia.

The service platform 30 assigns an identification number to the player (that is, to a package of content and related viewer experience information) and returns the number to the publisher console 20. The publisher console 20 then presents a presentation content code 19 to the publisher 22 that includes any identification numbers required to present the viewer experience to a user 12. When the presentation content code 19 is embedded in the publisher's web page (or any other party's web page such as an affiliate 24 or a user 12), the media content identified by the presentation content code 19 can be viewed within the web page in the manner specified by the publisher 22. The publisher 22 may provide the presentation content code 19 to affiliates or other parties for embedding in their web pages, either under standardized commercial deals mediated automatically by the system or according to negotiated arrangements. The presentation content code 19 enables an affiliate web page to retrieve the assets from the service platform 30 and deliver it to a user 12 according to the viewer experience defined for the assets and packaged content items 23.

Using the publisher console 20, the publisher 22 also manages relationships with an affiliate 24. In some embodiments, the publisher console 20 provides the publisher 22 with a list of affiliates who have permission to access various assets. The publisher 22 may edit the list to include additional affiliates or to change the permissions granted to existing affiliates.

Similar to the publisher console 20, the affiliate console 28 is a user 12 interface through which an affiliate 24 at a client computer 26 interacts with the service platform 30. Using the affiliate console 28, the affiliate 24 can view the packaged content items 23 and viewer experiences to which the affiliate 24 has been granted access permissions and the terms of agreement. In some embodiments, the affiliate console 28 enables the affiliate 24 to request access to packaged content items 23 and viewer experiences belonging to a publisher 22 and to propose terms for a deal. The terms of the deal between the publisher 22 and the affiliate 24 may be determined by interaction through the affiliate console 28 and the publishing console 20.

A user 12 at a client computer 14 accesses publishers' and affiliates' web pages over the communications network 36 using a web browser program (e.g., Internet Explorer® or Firefox®). For example, the user 12 could provide the web browser with a Universal Resource Locators (URL) of a desired web page. When the user 12 opens a web page in which the presentation content code 19 has been embedded, the code sends the identification numbers to the service platform 30. From the identification numbers, the service platform 30 determines the assets and corresponding viewer experience that are to be supplied to the web page.

The client computer 14 includes a multimedia player 16 (e.g., a Flash Macromedia® player) for viewing the assets according to the defined viewer experience. After the multimedia player 16 launches, it invokes the service platform 30 to transmit the assets and viewer experience from the service platform 30 and/or the CDN 34. The service platform 30 returns a player component that contains information about the assets, packaged content items 23 and viewer experience. The multimedia player 16 uses the player component to fetch the catalog meta-data and assets from the service platform 30 and the CDN 34 and then presents the assets within the web page in accordance with the viewer experience. The service platform 30 may also allow a publisher 22 to leverage geographic targeting capabilities to fine-tune the availability of content to different target audiences.

The CDN 34 provides optimal performance on downloads and video streaming. In some embodiments, the CDN 34 is provided by vendors such as Akamai who handle scaling global media delivery and include additional tools, such as Akamai's EdgePlatform.

A. Overview of Client Platforms

1. User Platform

FIG. 3 depicts a block diagram of a client computer 14 at which a user 12 views assets provided by the service platform 30. In some examples, client computer 14 may be any type of web-enabled apparatus or system including but are not limited to a desktop computer, a laptop computer, a mainframe computer, a cellular telephone, a personal digital assistant ("PDA"), and a controller embedded in an otherwise non-computing device. The client computer 14 contains one or more processor(s) 40 (referred to simply as "processor 40") and memory 42 for storing software 44. The processor 40 executes software 44, which includes a Web client application 46, a multimedia player 16, an asset managing module 54, and operating software 48. The Web client application 46 includes one or more routines used in implementing the TCP/IP protocol, which allows the client computer 14 to communicate over the Internet 36 and over the CDN 34. The operating software 48 includes an operating system 50, such as Windows XP®, and a context presentation application 17, such as Internet Explorer®.

In some embodiments, the client computer 14 is a Web client that is part of a Web-based environment and the multimedia player 16 is a Flash Player runtime that is compatible with different operating systems and web browsers. In some embodiments, the client computer is a desktop container application that utilizes presentation technology available from Maven Networks Inc. And the multimedia player 16 is a combination of a Flash® player and a Windows Media® player. The multimedia player 16 enables a user 12 to interact with the assets provided by the service platform 30. The multimedia player 16 presents the assets from web pages belonging to a publisher 22 or an affiliate 24 of the publisher 22. In some embodiments, the multimedia player 16 is launched directly from a publisher's or affiliate's web page.

In some embodiments, the multimedia player 16 is based on Macromedia Flash Player 7, which is currently distributed on the Web, and supports Flash 7 video. In other embodiments, the multimedia player 16 is a Macromedia Flash Player 8 that supports Flash 8 video.

A consumer services module 54 provides a user 12 with a variety of web-based and desktop tools to enable consumers to find, aggregate, download, stream, and share content from multiple publishers. The consumer services module 54 also provides a variety of community tools for rating and reviewing content, sampling selected content (where enabled by the publisher) and remixing content to share with friends (where enabled by the publisher).

2. Publisher Platform

FIG. 4 depicts a block diagram of a client computer 18 at which a publisher 22 interacts with the service platform 30. Client computer 18 may be any type of web-enabled apparatus or system. Examples of such apparatuses or systems include, but are not limited to, a desktop computer, a laptop computer, a mainframe computer, a cellular telephone, a personal digital assistant ("PDA"), and a controller embedded in an otherwise non-computing device. The client computer 18 contains one or more processor(s) 40 (referred to simply as "processor 40") and memory 42 for storing software 44. The processor 40 executes software 44, which includes a Web client application 46, a publisher console 20, a software development kit ("SDK") 60, and operating software 48. The Web client application 46 includes one or more routines used in implementing the TCP/IP protocol, which allows the client computer 14 to communicate over the Internet 36. The operating software 48 includes an operating system 50, such as Windows XP®, and a Context presentation application 17, such as Internet Explorer®.

a. Publisher Console

The publisher console 20 is a browser-based rich internet application that provides the user 12 interface to work with all of the services provided by the service platform 30. A publisher 22 accesses the publisher console 20 by providing a secure password. Using the publisher console 20, the publisher 22 uploads assets to the service platform 30 and manages their distribution and delivery. In some embodiments, the assets are delivered by a third party post-production firms which provide turnkey encoding and uploading directly into the service platform 30.

The publisher console 20 includes an upload client that enhances the speed and reliability of the uploading of assets. In some embodiments, the upload client enables simultaneous uploading of multiple files. In some embodiments, files are uploaded in a batch using file transfer protocol (FTP) along with an extended markup language (XML) manifest which describes the files. The files are then automatically stored into the publisher's account.

The assets are identified by their name or other unique identifier. Within the publisher console 20, the publisher 22 assigns uploaded assets to titles. A title includes metadata that provides information about the content, quality, condition, and other characteristics of the assets. A title may include, for example, a name that identifies the content of the asset(s), a name of the producer/publisher that owns the title, the date on which the title was created, and the length of the asset.

Within the publisher console 20, the publisher 22 defines the viewer experience for presenting the titles to a user 12. The presentation of the titles according to the viewer experience is done by a "player" which is initiated by the presentation content code 19 of FIG. 1. Players enable a user 12 to interact with video in the service. Players live inside a variety of destinations including: web pages belonging to the party providing the service platform 30, affiliates' web pages, and publisher's web pages. On a publisher's web page, the publisher 22 controls all the programming in each of their players using a number of mechanisms. The publisher console 20 provides the publisher 22 with configurable templates that support a wide variety of player sizes and layouts. The publisher 22 may place players anywhere they want on their web pages, and they have strong control over the look and feel as well as the content in each of the players.

In some embodiments, the publisher 22, affiliate, or user 12 can develop their own custom player that integrates with the service platform 30. These custom players rely upon a set of application programming interfaces ("APIs") that expose functionality of the service platform. In some embodiments these APIs may be exposed as SOAP-based web services or Flash Remoting APIs.

After the publisher 22 finishes defining a player, the publisher 22 incorporates the player into their web site using a presentation content code 19 provided by the publisher console 20. The publisher console 20 provides the publisher 22 with a presentation content code 19 that contains a player ID for the player. When the presentation content code 19 is placed in a publisher's (or affiliate's) web page, the browser displaying the web page can retrieve the player from the service platform 30 and present the player to a user 12. The player that is presented to a user 12 and the media presented by the player is served by the service platform 30 or the CDN 34. Changing the player ID provided in the presentation content code 19 changes the player that is loaded from the service platform 30.

The publisher console 20 provides the publisher 22 with programming tools that control programming of assets and titles in a player. Examples of programming include (a) lineups, (b) fixed play, and (c) page-based programming. Within the publisher console 20, publishers 22 can define a lineup. A lineup is a collection of titles that can be organized by a number of mechanisms, including but not limited to the following forms: titles can be explicitly ordered; titles can by dynamically grouped based on a range of query parameters; titles can be organized in a hierarchy categories; titles can be sorted by common metadata. Fixed play programming combines content and layout into a single player experience. Fixed play programming is advantageous in situations where the lineup of titles is fixed or the number of titles is very small.

The content is specified when the player is created in the publisher console 20 by associating a specific video title with the player. For page-based programming, when a player is called from a web page, the call to the player can specify the title(s) or lineup(s) that the player will display. Through this mechanism, a publisher 22 can use the content management system that controls the text and graphic content in their websites to control the content that is delivered through the player in their website. Assets can be referenced by their unique identification numbers assigned by the service platform 30 or by a different identification number that is specified by the publisher 22 when the title is created.

The publisher 22 is provided with a software development kit 60 (SDK) to facilitate Web Services (i.e. SOAP or Flash Remoting) integration and custom Flash development. The SDK 60 enables the publisher 22 to created integrated brand experiences through their existing websites. The SDK 60 includes most, if not all, the main functions and services provided by the service platform 30 (e.g. search & browse, preview, account management, purchase, payment, streamed content viewing, and download delivery, as well as rating, review and messaging functions).

3. Affiliate Platform

FIG. 5 depicts a block diagram of a client computer 26 at which an affiliate 24 interacts with the service platform 30. The client computer 26 may be, for example, any type of web-enabled apparatus or system. Examples of such apparatuses or systems include, but are not limited to, a desktop computer, a laptop computer, a mainframe computer, a cellular telephone, a personal digital assistant ("PDA"), and a controller embedded in an otherwise non-computing device. The client computer 26 contains one or more processor(s) 40 (referred to simply as "processor 40") and memory 42 for storing software 44. The processor 40 executes software 44, which includes a Web client application 46, and an affiliate console 28. The Web client application 46 includes one or more routines used in implementing the TCP/IP protocol, which allows the client computer 14 to communicate over the Internet 36. The operating software 48 includes an operating system 50, such as Windows XP®, and a Context presentation application 17, such as Internet Explorer®.

a. Affiliate Console

The affiliate console 28 allows a registered affiliate 24 to select available titles and viewer experiences of publishers for inclusion on a web page. From the affiliate console 28, the registered affiliate 24 can retrieve the presentation content code 19 required to reference a viewer experience previously defined and authorized by publishers. The registered affiliate 28 may also have the option of directly selecting video titles from multiple publishers, creating their own line-ups and presenting these items in a viewer experience that the registered affiliate 24 creates.

In some embodiments, the publishers will have complete control over the titles and viewer experiences that registered affiliates may access. A publisher may authorize all affiliates access to all titles managed by the publisher. Alternatively a publisher may selectively grant access to specific affiliates for specific titles, line-ups or viewer experiences.

When the presentation content code 19 is placed in the affiliate's web page, the web page can retrieve the player from the service platform 30 and present the player to a user 12. In addition to any identification numbers required to display the correct viewer experience, the presentation content code 19 will include an identification number of the registered affiliate 24. This registered affiliate 24 identification code can be used by the service platform 30 to track usage and transactions facilitated through the affiliated viewer experience. The player presented to a user 12 is delivered by the service platform 30; however, from the consumer's perspective 12, the content appears to be originating directly from the affiliate's web page.

B. Service Platform

The service platform 30 shown in FIG. 6 may be any type of computing device or multiple computing devices that include a processor 40 and memory 42 that stores software 44. The processor 40 executes software 44, which includes a Web client application 46, a video streaming platform 70, a presentation services module 72, a media deliver platform 74, a media indexing module 76, a search engine 78, a content delivery engine 80, a financial management processor 25, a messaging module 84, a recommendation services module 86, a reporting module 88, and operating software 48. The operating software 48 includes, but is not limited to, an operating system 50 and a communication module 90 for effecting communication over the Internet 36 and the CDN 34.

1. Content Library

Service platform 30 includes a content library 32 for storing assets uploaded by publishers and data associated with the software 44. Although only one content library 32 is shown in FIG. 6, the depicted content library 32 represents any physical or virtual, centralized or distributed database suitable for the receipt and storage of files. Each file is an entity of data, i.e., a string of bytes that is capable of being manipulated as an entity. The files can represent any kind of information, such as video, audio, text, images, executables, or simply binary data.

2. Three-Tier Architecture

The service platform 30 has a three-tier architecture which scales horizontally as the load of users 12 on the system increases. The three tiers are: web servers, application servers and a database cluster. The service platform 30 incorporates redundancy and failover so that there are no single points of failure in the system. In some embodiments, the infrastructure of the service platform 30 is designed to provide approximately 99.99% uptime (less than approximately 120 minutes of unscheduled downtime per year). In some embodiments the content library 32, in which assets are stored, is a redundant and mirrored file storage database that is hosted at a facility that is multi-homed.

3. Video Streaming Platform

The video streaming platform 70 provides streaming video to a user 12 at client 14. One embodiment for the video streaming platform 70 is based on Macromedia Flash Communication Server or Microsoft Windows Media Services server, both of which can be deployed in an edge-based CDN environment.

The presentation services module 72 is built upon a Macromedia Flash MX client platform, HTML web pages and JavaScript code. The presentation services module controls the viewer experience as defined by the publisher 22 or affiliate 24. An affiliate 24 may also be a publisher 22 or an individual user. The consumer service can rely upon the Flash Player runtime to optimize both the performance and visual richness for users 12. The publisher, affiliate or other administrative consoles can be built upon the Macromedia Flex application framework to deliver services to publishers and affiliates. Tangential and supporting services will be built as J2EE Web Applications and integrated with the larger set of J2EE business objects.

4. Media Deliver Platform

The media delivery platform 74 intelligently distributes content based on schedule and time requirements, on-demand download and streaming requests, and cost constraints imposed by the packaging options. For example, a video program may be streamed on-demand via Flash for one user 12 on a pay-per-view or subscription basis; for another, the video program may be the same but with advertising; and for another, the video program may be a scheduled download delivery to a desktop using BitTorrent® P2P distribution. In some embodiments, the media delivery platform 74 uses Macromedia Flash Communications Server and Flash Video to deliver on-demand streaming video to a user 12, and Microsoft Windows Media Video formats and codec's to deliver TV and DVD quality videos to a user 12 for access on their personal computer (PC) or networked television.

a. Media Delivery Methods

The media delivery platform 74 provides different methods for delivering content services to users 12, including: multiple delivery methods for any single or set of packaged content items 23, including on-demand streaming in a web browser, on-demand TV-quality delivery, background or trickle-down downloads, and peer-to-peer distribution of media. The media delivery platform 74 optimizes the delivery method based on the consumer request and cost parameters defined by the service operator 30. Multiple clients and platforms are supported, including web-based streaming with high-quality experiences delivered in Macromedia Flash, PC-based TV-quality experiences offered in full-screen quality using technology from Maven Networks Inc, and TV-based experiences through integration with various consumer electronics devices, such as Microsoft Media Center, XBox or TiVo environments.

The media delivery platform 74 also provides a series of facilities for secure and reliable cross-device distribution of content. The media delivery platform 74 can accommodate the distribution and use of content across a network of websites, and across a range of primary end-user 12 devices including high-quality streaming through any Flash-enabled web browser, PC-based viewing in TV-quality format via download, on portable devices and DVD players, and directly on network-connected TV monitors. The media delivery platform 74 may integrate and distribute into additional and external media delivery platforms such as those offered by mobile carriers or Video On-Demand (VOD) platforms managed by cable and satellite corporations such as Comcast and DirectTV.

The media delivery platform 74 includes (a) a generic policy enforcement layer that can accommodate arbitrary use and delivery of content; (b) a transparent user 12 experience with respect to rights license acquisition and enforcement; (c) the ability to distribute across a federation of affiliate websites in a manner that simplifies the technical integration required by affiliates; (d) the ability to dynamically determine the most time-sensitive and cost-effective means to deliver the content; and (e) flexible deployment across streaming, progressive download, background download, peer-to-peer distribution, home network file sharing, and external media delivery platforms.

b. Policy Management

The media delivery platform 74 includes a policy management layer that provides fine-grained media access control for web-based experience, and rights license distribution and authorization for download and DRM-protected content. When publishers define packages within the service, a corresponding set of logical policies for that media are instantiated into the policy management layer. When a user 12 purchases or has gained rights to a packaged content item 23, a corresponding policy identifier is attached to the user 12 account. At delivery-time, the user 12 identity flows through the policy management service to determine whether and what rights the user 12 has to that packaged content item 23. In the event of a web-based experience, the application simply streams the content back to the user 12. In the event of a download-based experience, the application first enables content delivery of the file, and later when a playback event for the download media occurs the user 12's personal computer uses a pre-delivered digital rights management (DRM) license to grant usage of the media. All media usage events are audited and logged by the access control service.

c. Web Streaming

The media delivery platform 74 provides robust and high-quality media experiences for users 12 accessing the media. In some embodiments, streamed video creates an experience that is instant-on with as little buffering as possible; that does not require the user 12 to choose a video player or select a bandwidth option; that works automatically on approximately 90% plus of installed Internet-connected computers running any version of Windows, Macintosh, Linux or any web browser; that offers branded integration into the containing application or website; that enables inline and in-context video and interactive advertising; and that can easily enable synchronization to external content.

d. Downloading

The media delivery platform 74 provides multiple approaches to downloading the assets associated with packaged content items 23. In some embodiments the media delivery platform 74 may utilize two mechanisms for download delivery: foreground download and background download. Foreground downloads are delivered using the service operator's CDN partner and offers a near-on-demand experience for TV-quality media. Download events are trigged by consumer requests for a particular media product. These requests can be issued synchronously and asynchronously. Examples of request events that trigger downloads include: selecting a packaged content item 23 to have downloaded; browsing through a library via a TV that requests immediate playback; a consumer indicating interest in a packaged content item 23 upon receiving notification via a Instant Messaging (IM) or mobile Short Message Service (SMS) message; and packaged content items 23 becoming available as part of a series or subscription.

5. Media Indexing Module

The media indexing module 76 builds text-based meta-data from the audio track or other extracted meta-data of video files. This meta-data may be used to generate XML or HTML versions of video content that can be indexed by search engine crawlers.

The media indexing module 76 indexes discrete pieces of content according to publisher provided meta-data. Layered on top of this base-level of searchable data, a variety of end-user 12 feedback is added. For example content reviews, favored play lists, recommendations, and forum discussions all become useful end-user 12 generated meta-data for indexing content. The media indexing module 76 generates indices on a per-publisher and service-wide basis. Associated user 12-generated meta-data are indexed and linked to specific content items. The media indexing module 76 offers publishers an optional service to audio-index their video content, extract topics and keywords, and make this extracted content Internet search engine accessible.

6. Search Tool

The search tool 78 enables a user 12 to search the content library 32 of assets. In some embodiments, the search tool 78 is a database-driven search combined with full-text index searches using a third-party enterprise search engine, such as that provided by Lucene. The search tool 78 maintains indexes of assets on a channel, seller and global basis. In other embodiments, the search engine is an external service to the service platform such as those offered by companies like Google® or Yahoo®. When users 12 access these external search engines, they provide a search query which returns a result set. The result set offered by the external search engine can include entries that reference titles managed by the service platform.

The search tool 78 uses Rich Internet Application (RIA) techniques to provide users 12 with a visually compelling and highly productive interface for conducting searches and navigating results. The search tool 78 also provides a flexible and productive user 12 interface for browsing its content taxonomy by topic. This interface constantly evolves as new publishers participate in the service, and are maintained by the service content staff but with ongoing input and feedback from publishers 22, affiliates 24, and users 12.

The search tool 78 facilitates Internet enabled searches, where users 12 are able to find any service-contained content through Google or other search engines, as well as through any web links directly to media within HTML pages and RSS feeds; service-only searches, where users 12 are able to use keyword and category searches within the service itself; and searches across a topic hierarchy.

7. Content Deliver Engine

The content delivery engine 80 is used for intelligent and incremental downloads and uploads. The content delivery engine 80 defines optimization algorithms that leverage reliable content delivery networks and BitTorrent delivery. In some embodiments the content delivery engine 80 is implemented in conjunction with technology provided by Maven Networks, Inc. This technology offers reliable and secure, incremental uploads of content and supports background uploads of multi-gigabyte files. Some advanced publishers may provide video to the service through a third-party, but private label, service bureau via satellite feeds, physical media, or other forms and in full-quality MPEG-2 format. Additionally, the content delivery engine 80 offers private-label encoding and post-production services through an integrated third-party provisioning system.

The content delivery engine 80 uses the Windows Media DRM platform to protect and secure provisioned content. WMV files can be protected by the rights holder before provisioning into the service, or the service can secure the files before being made available through the marketplace. In either scenario, through the service's policy framework, the service verifies and authorizes consumer access and grant licenses.

8. Financial Management Processor

The financial management processor 25 supports billing services to handle consumer transactions and back office subscription management and billing functions. In some embodiments, the financial management processor 25 is integrated with mainstream transaction providers such as VeriSign® and PayPal®.

The financial management processor 25 also provides deployment infrastructure for handling all consumer facing transactions, including selection, order processing, and clearing and handling credit-card and other payment instruments. The service commerce features provides fine-grained access management rights based on DRM policies enabled by consumer payment.

The financial management processor 25 manages all consumer transactions including product and product-related options selection, payment method, authentication, order processing and settlement. This is handled though integration with a payment service vendor such as VeriSign. All consumer payments are made directly to the service—i.e. a credit card purchase would show the service as the merchant of record. Micro-payments and pre-paid accounts are supported to allow customers to purchase "Video Minutes". The financial management processor 25 provides real-time account balance management and supports account replenishment using authorized debit from consumer credit cards or bank accounts when the minutes balance is depleted. The financial management processor 25 also provides post-purchase care to handle refunds and chargebacks of settled transactions. Transactions from affiliate sites are captured in a way that identifies the affiliate as the source of the transaction. This information is used for affiliate payments and reporting. The financial management processor 25 also supports price discounts based on promotions, coupon codes and gift certificates.

9. Messaging Module

The messaging module 84 allow users 12 to easily share content with friends, colleagues and family using third party messaging techniques. In some embodiments, a mobile messaging platform such as that provided by m-Qube® or an instant messaging platform such as that provided by IMlogic® is integrated with the messaging module 84.

The messaging module 84 uses cross-channel messaging (i.e. email, instant messaging (IM), short message service (SMS), desktop client notification) for a variety of brand marketing, customer acquisition and retention strategies. Some messages are used to keep users 12 engaged with their entertainment choices. Certain messages are used as a means for extended control and media scheduling. Ideally all communication includes some manner of personalized content targeted toward the specific user 12. If the member has previously installed the desktop client, any links embedded in the message is used as an initiation to launch the service client.

The messaging module 84 regularly schedules mailings to users 12 to highlight new services and content available through the marketplace. These messages can include videos available from their subscriptions, videos they have not watched, advanced previews, recommended content, etc. For example, on a regular basis a user 12 could receive an email at work that highlights video programs that are newly available from their subscription packages or other recommended programs. From these messages the user 12 could indicate programs of interest.

Similarly a user 12 might send an Email, SMS or IM message about a video that might be of interest to one or more contacts. If the user 12 is authenticated, the service provides the option to send a message to a set of known contacts or defined social groups. A contact who receives the notice could then reply that they would like to view this content. If the contact is not registered with the service, the message might contain additional information about the service so the potential new customer is comfortable with establishing a new relationship. After the contact registers, the service provides the content to the contact. In some embodiments, registration is not required to view the content. For example, in some embodiments, registration need not be required for previews, nor for ad supported content.

The service can use this type of proactive service to initiate downloads onto a consumer's client computer 14 using commodity bandwidth. The service saves money by leveraging lower bandwidth costs and the consumer benefits because they can immediately watch DVD-quality video without having to search and browse the video library after coming home from work or outside activity.

10. Personalization Module

The personalization module 86 gathers user 12 recommendations based on explicit peer-supplied reviews and ratings, and based on affinity and click-stream based approaches. The personalization module 86 is optimized to increase consumers' video spending by highlighting relevant content to individuals, households, and other affinity groups. The personalization module 86 builds personalization profiles through implicit and explicit profiling of users 12. Implicit profiles are built by observing the actions of users 12, including analyzing their purchase history and active subscriptions. Users 12 are able to refine their recommendations through ratings, highlighting their favorite channels, and other integrated forms of active participation. Based on this information the personalization module 86 generates recommendations for video programs and subscription packages. Some recommendation processes are straight forward, for example promoting newly published content from producers they have previously enjoyed. Other algorithms might require licensing technology from vendors such as ChoiceStream. In some embodiments, the recommendation services module is a third-party personalization engine such as ChoiceStream®.

Accessing one's video library requires authentication, and as such the personalization module 86 can leverage personalization services to perform targeted advertising. The personalization module 86 determines the most relevant advertisements to deliver to a user 12 based on the context of their profile and the video program they are watching.

The personalization module 86 provides automated and manual recommendations based on recent, most popular, and other ranked lists provided by the service editorial staff. The personalization module 86 employs contextual personalization technologies to provide automated recommendations on content. Unlike collaborative filtering techniques which limit recommendations to social traits, the personalization module 86 targets content to users 12 based on their individual tastes and interests.

11. Reporting Module

The reporting module 88 provides a variety of standard reports that are accessible to the publisher 22 through the publishing console 20. In some embodiments, the service platform 30 provides the publisher 22 access to advanced reporting tools upon receiving payment of an additional fee. The reporting module 88 provides reports for each title and on an aggregate basis. Examples of reports include: (1) title views, (2) title preview play starts, (3) title full-play stream starts, (4) title full-play number of minutes streamed, (5) title full-play download starts, (6) title full-play download completions, (7) player load by player (8) play all clicks by player, (9) average total videos played in session, (10) average minutes played per video title, and (11) total videos completed per session.

The reporting module 88 provides publishers and affiliates with reports that describe the mix of users 12 accessing their assets (including demographic and contact data), the percentage of ad versus ad-free subscriptions, traffic statistics and earnings reports that are updated on a daily basis.

The reporting module 88 also provides standardized reporting on media usage, including streaming and downloads, amount of time spent, geographic and subscriber data, and revenue activity in the service. In some embodiments, the reporting module 88 leverages third-party software for performing data warehousing and analytics, with a custom user 12 experience on top of these packages.

C. Provisioning and Publishing Content Items

At provisioning and publishing time, the service platform 30 places a copy of the assets into the CDN 34 that then delivers the files to a global audience. At playback-time, the multimedia player 16 of client computer 14 requests a connection to the CDN 34 which then facilitates playback of a particular video product.

The service platform 30 provides a publisher 22 with tools to: upload media easily and robustly through an integrated desktop provisioning tool, as well as through back-end FTP and service bureau functions for getting video into the hosted environment; transcode video into relevant formats if they are not already available or if needed in other formats for specialized or syndicated distribution; classify and index video using both manual meta-data input mechanisms as well as automated video indexing techniques that extracts key topics and content from video for use in private search as well as indexing by Internet search engines; and select a standard set of viewing experiences for uploaded media using a set of Flash-based user 12 experiences. The publisher 22 accesses these tools through the publisher console 20.

FIG. 7 shows a process 100 by which a publisher 22 enables publication and delivery of media content using the publisher console 20. FIGS. 8-24 show screenshots of the publisher console 22 during a player definition process (112).

1. Registration

The publisher console 20 provides (102) the publisher 22 with a registration screen for registering an account with the service in a self-service manner. To create the account, the publisher 22 enters basic user 12 and service meta-data into the publisher console 20. During the registration process (102) the publisher 22 establishes payment and invoicing terms with the service to be scheduled with regular payment and billing cycles. The financial management processor 25 of service platform 30 supports handles scheduling of payments and invoicing functions. In some embodiments, the financial management processor 25 is integrated with mainstream transaction providers such as VeriSign®, PayPal®. For example, the financial management processor 25 may use a mainstream transaction provider for smaller-scale publishers. The financial management processor 25 may also provision an account in advance.

In some embodiments, the account assigned to the publisher includes multiple user 12 accounts with roles-based permissions. For example, each user 12 account can have one of three levels of permission. These include an administrator level which permits a user 12 to do any action in the account including creating or deleting users 12; a programmer level which permits a user 12 to do any action in the account except create and delete users 12; and a contributor level which grants a user 12 the ability to upload assets into an account. The contributor level is generally assigned to post-production partners or other people in the publisher organization who handle post-production needs and content provisioning.

During the registration process (102), the publisher console 20 prompts the publisher 22 to define a set of information about their content and services. The information includes, but is not limited to, the type of content they offer, basic brand assets to be used in listing their products, and additional user 12 accounts. In some embodiments, publishers are required to support a fixed set of video formats and quality controls. For example, for online streaming, videos may be encoded with Flash Video. For publishers that are providing TV or DVD quality products, the publishers may be required to provide the produces as secure Windows Media Video files.

The publisher console 20 also enables the publisher 22 to configure their merchant payment and invoicing terms (e.g., their PayPal, or credit card account information) where cleared transactions are to be delivered.

2. Walk-Through Presentation

The publisher 22 logs into the account by entering authentication information (e.g., a username and password) into the publisher console 20. After the service platform 30 verifies the publisher's authentication information, the service platform 30 (via the publisher console 20) presents (104) the publisher 22 with a presentation that provides a detailed walk-through of how to use the online programming and selling environment. The walk-through is a high level overview to acquaint the publisher 22 with the functions of the service. After the providing (104) the presentation, the publisher console 20 presents an initial dashboard that provides the publisher 22 with instructions for publishing media content.

a. Initial Dashboard

Figure 8:
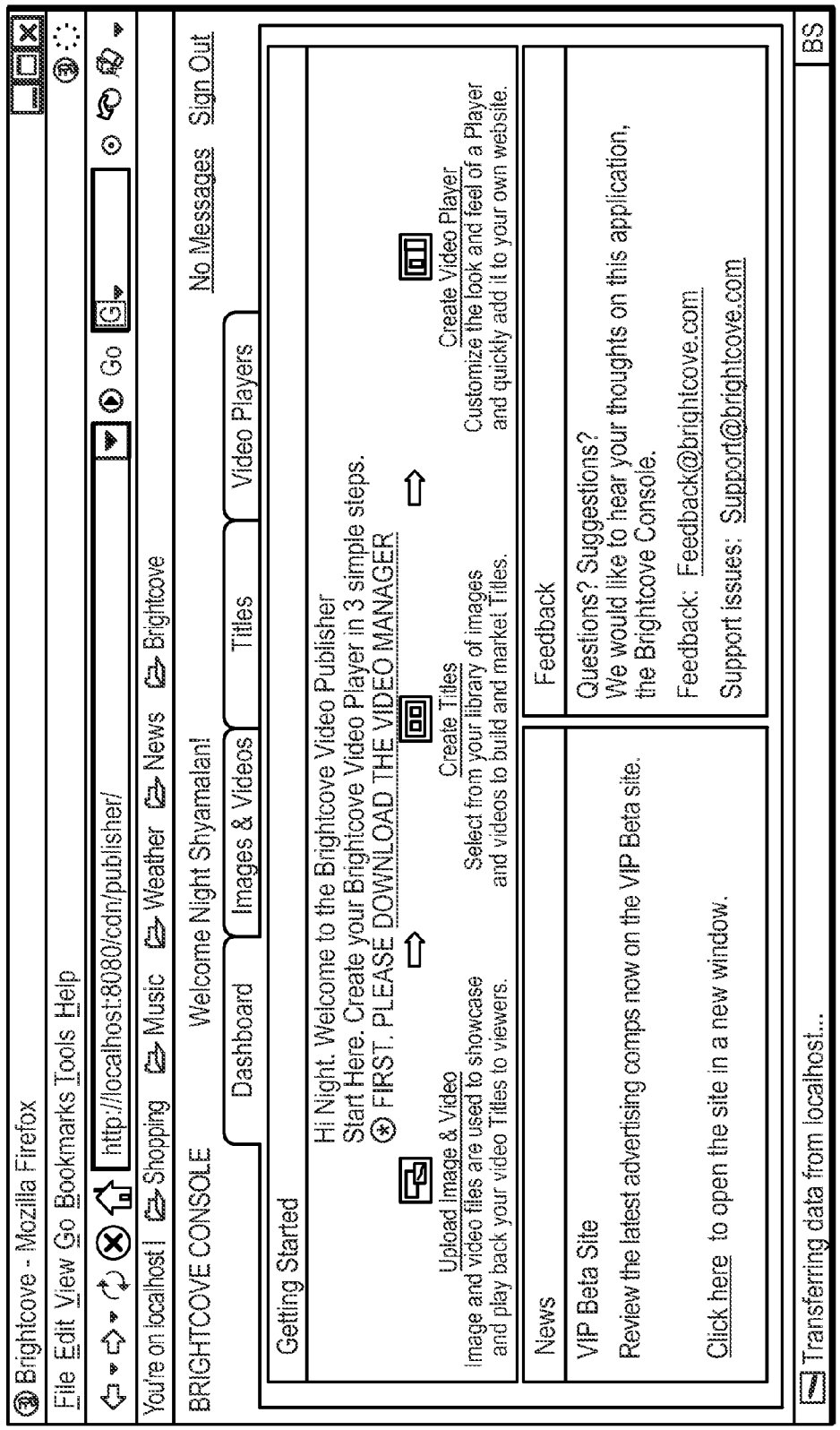

An example of the initial dashboard is shown in FIG. 8. The initial dashboard includes a welcome message, a description of three basic steps for creating a player, a section that provides news and updates relating to the service, and a feedback panel in which the publisher 22 can send comments and questions to the party managing the service platform 30.

3. Uploading Content

When the publisher 22 clicks on the "Upload Images & Videos" icon presented in the initial dashboard 200, the publisher console 20 presents (106) the publisher 22 with a media content management screen 202 through which the publisher 22 uploads assets to the service platform 30. The service platform 30 associates the assets with the publisher's ID and stores the assets in the content library 32.

a. Media Management Screens

Figure 9:
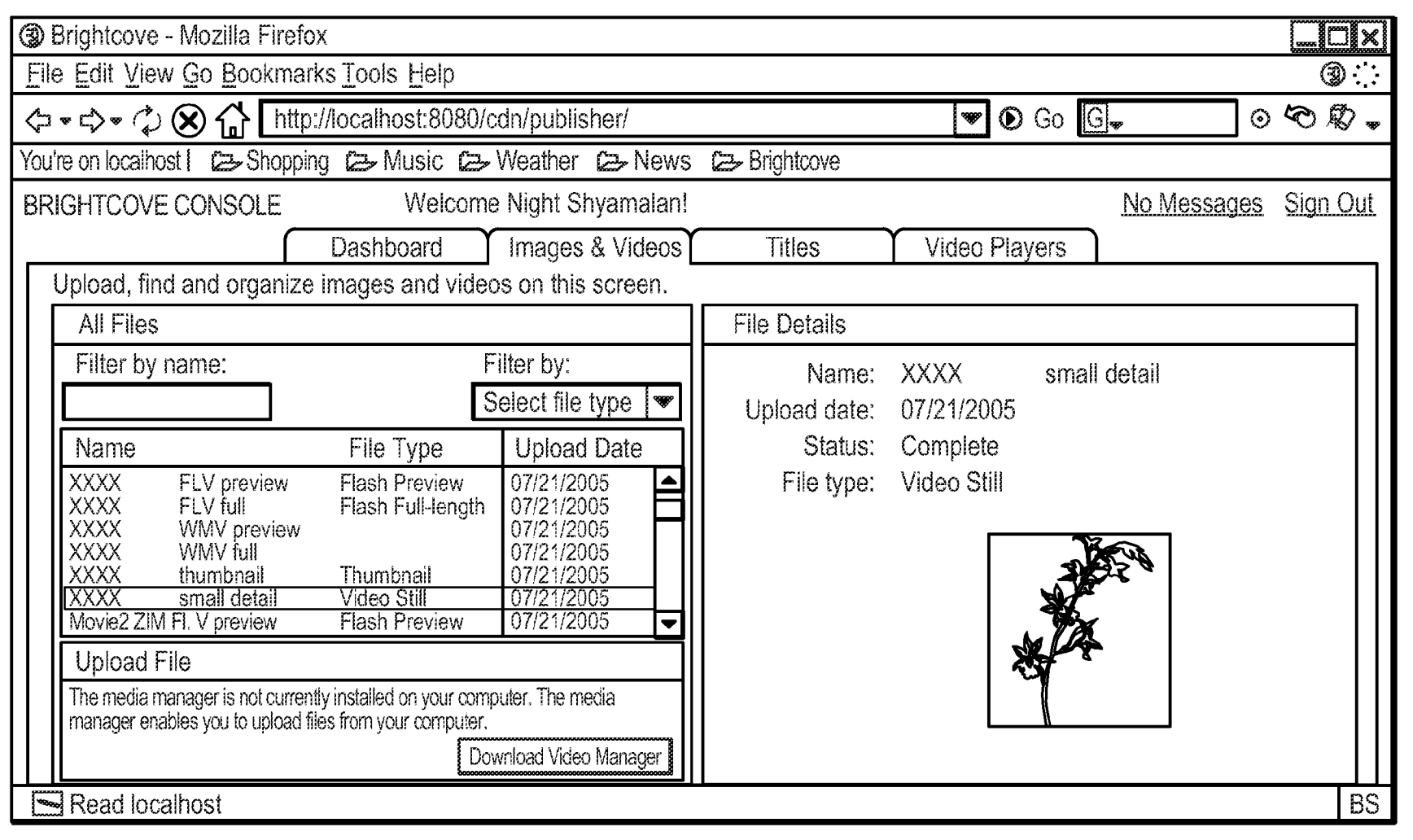
Figure 10:
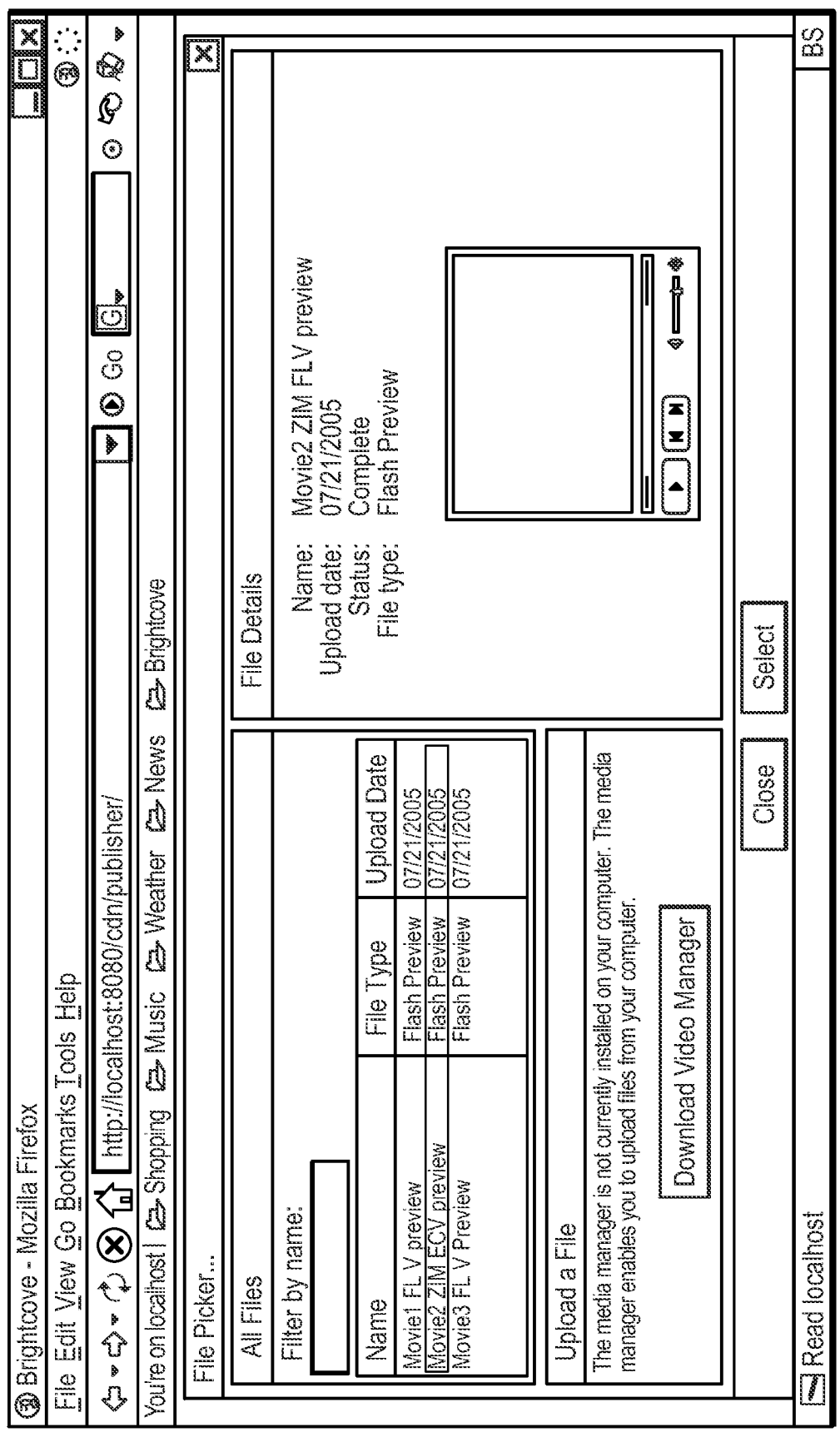

Examples of the media content management screens are shown in FIGS. 9 and 10. The media content management screen includes a scrollable panel that displays a list of assets uploaded by the publisher 22. The list is displayed as a data grid that includes a row entry for each asset. A row entry is partitioned into columns, each of which include information about the asset such as the name of the asset, the file type, and the date that the asset was uploaded. The publisher 22 may sort the data grid by column and filter the data grid such that only the entries of interest to the publisher 22 are displayed. The media content management screen also includes a file detail panel that displays information about each file in the list when selected. When a file (i.e., an asset) is selected in the list, the file detail panel displays information related to the file. This information may include, for example, the name of the file, the upload date of the file, the upload status of the file (e.g., complete or in progress), the file type, and a thumbnail image (FIG. 9). In some embodiments, the file detail panel includes a small video window in which the full length video or preview clip can be played (FIG. 10).

In some embodiments, assets including videos and graphics are uploaded through the publisher console 20 using a service upload client that enhances the speed and reliability of the uploading. The service upload client is a program that can be installed on the client computer 18. The service upload client facilitates the simultaneous uploading of multiple files. The files may also be batch uploaded using FTP and an XML manifest that describes the files. The files may then be automatically ingested into the publisher's account. In some embodiments, before the publisher console 20 delivers (106) an asset to the content library 32, the asset is encoded into a desired format. Examples of such formats include Flash Video at 500 kb/s for streaming video and Windows Media Video at 1.5 MB/s for downloads.

Additionally, some sellers (both basic and advanced) are not able to provision and upload media themselves. The service offers these firms third-party managed, but private labeled, service bureau functions that can receive physical media (VHS, DVDs) and create appropriate encodings and source media and upload them over high-speed lines to the service, or a third-party satellite/media post-production facility such as Comcast Media Center or Ascent Media who receive satellite feeds and grab MPEG-2 as well as create other encodings.

4. Title Generation

After the publisher 22 uploads assets to the service platform 30, the publisher console 20 provides (108) the publisher with a title management screen for defining and editing titles. A title is an example of a packaged content item 23 as shown in FIG. 1 and includes metadata that provides information about the content, quality, condition, and other characteristics of the uploaded assets.

a. Title Management Screen

Figure 11:
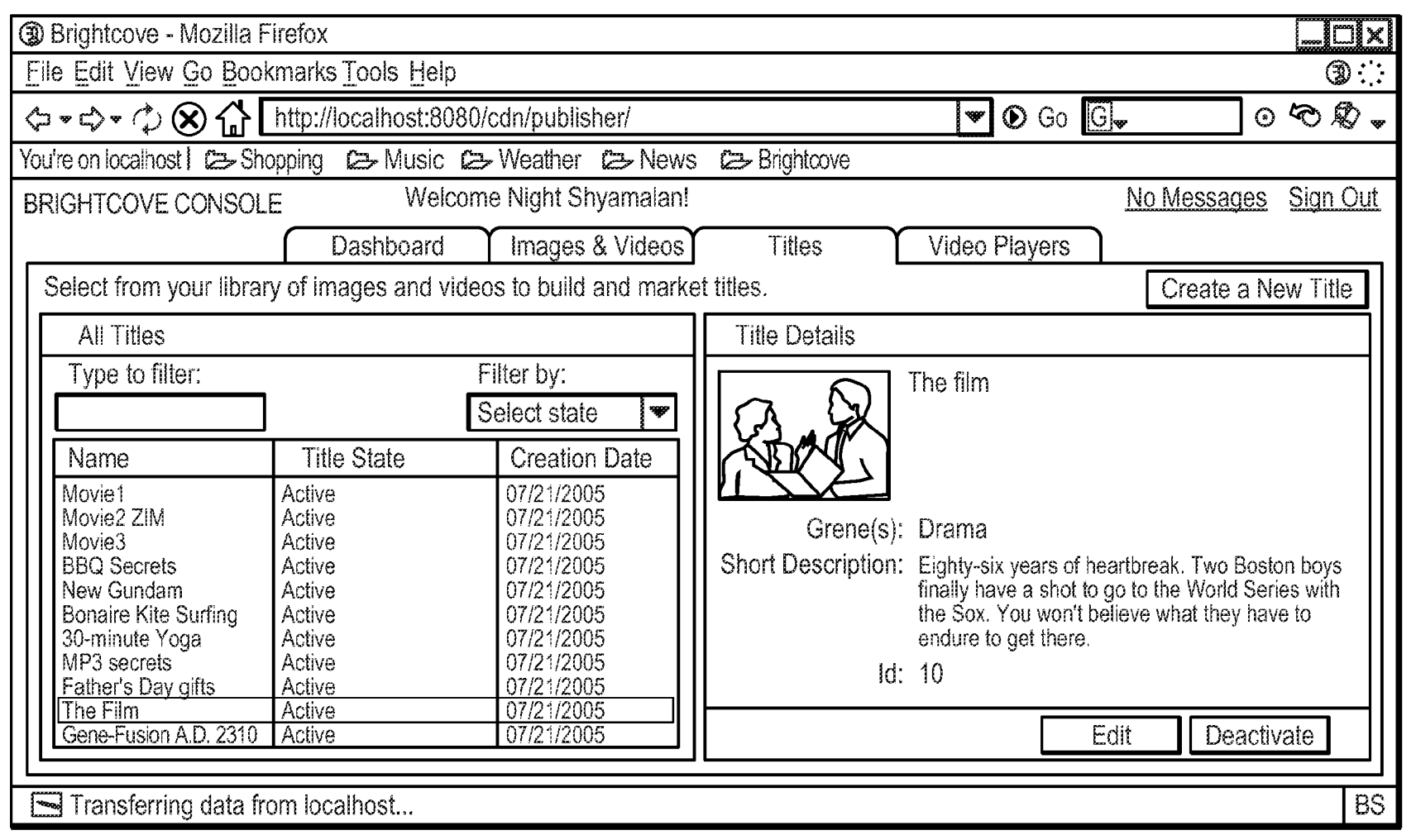

An example of a title management screen 240 is shown in FIG. 11. The title management screen displays a list of titles created by the publisher 22. The list is displayed as a data grid that includes a row entry for each title. A row entry is partitioned into columns, each of which includes information about the title such as the name of the title, the title status (e.g., active or inactive), and the creation date of the title. The publisher 22 may sort the data grid by column and filter the data grid such that only those titles fitting publisher-selected criteria are displayed. The title management screen 240 also includes a title detail panel that displays information about each title in the list when selected. For example, when the title named "1918: The film" is selected from the list, the title detail panel displays the name of the title, the genre, a short description, the title's reference ID, and a thumbnail graphic displaying information associated with the title. In this example, the thumbnail graphic displays a picture of the actors starring in the film.

b. Title Editing Screen

The publisher 22 may edit the title by manipulating the title in the list (e.g., double clicking on the title) and create new titles by selecting the "Create a New Title" button displayed in the upper right-hand corner of the title management screen. When a publisher 22 indicates the desire to edit a title or create a new title, the publisher console 20 provides the publisher with a title editing screen. An example of a title editing screen is shown in FIG. 12.

Figure 12:
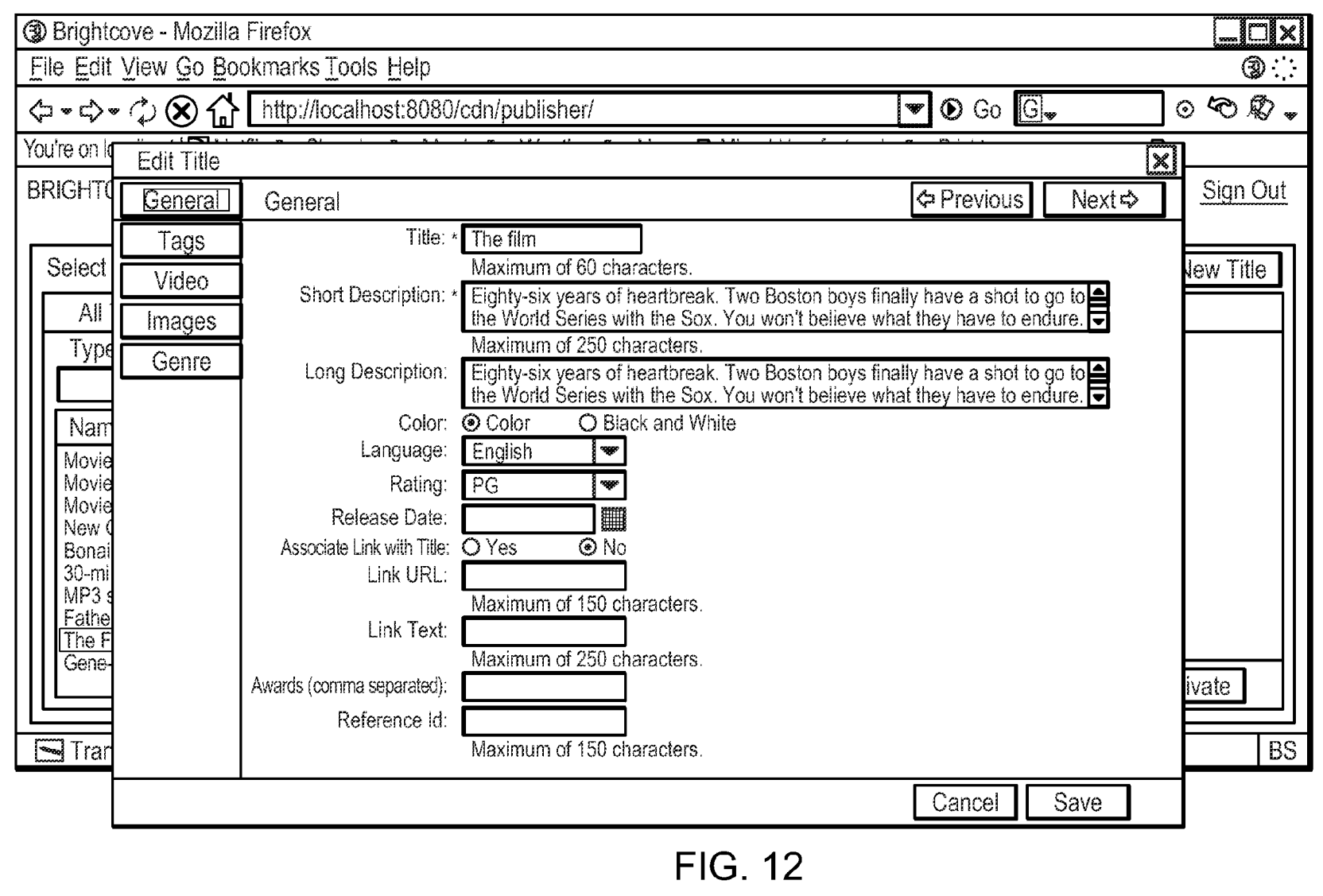

As seen in the title editing screen 260 shown in FIG. 12, the meta-data associated with the title, "1918: The film" includes a name that identifies the title's content, short and long descriptions of the content, whether the title is displayed in color or black and white, the language, a rating, a release date, a linked web site, awards received, and a reference ID. In some embodiments, the meta-data also includes a name of the producer or publisher that owns the title, the date on which the title was created, the length of the title, the genre of the content, key words, credits (e.g. director=xxx, screenwriter=yyyy), a production year, and a product reference id for linking the title to a product title id in an existing catalog or content management system. A title may have multiple graphics associated with it for use in different promotional contexts. For example, a graphic could be a thumbnail (e.g., a 160×120 24-bit jpeg image), a small image (e.g., a 480×360 24-bit jpeg image), a branding graphic, or a background image. The meta-data associated with a title may be provided in a service defined XML format, such as a format based on the XMLTV or a derivative format.

In some embodiments, a title has a name and a single asset that is associated with it. In other embodiments, the same title may have multiple assigned assets (e.g., video files) that are each played back in different contexts (e.g. preview vs. full) and delivered through different delivery mechanisms (e.g. streamed online, download to PC, etc.). For example, a single title could be a combination of multiple video files that include a full-length streamed version, a full-length download version, a streaming video preview, and a downloadable preview.

Titles that are being distributed can be viewed streamed or optionally they can be made available for download. The value of downloading is the quality of the play-back experiences (near DVD at full screen). The title may be downloaded and viewed by a user 12 connected to the Internet 36. The publisher 22 may specify the conditions under which a user 12 can download a video. In some situations, a publisher 22 may not permit a title to be downloaded unless the user 12 pays a fee.

5. Lineup Generation

After titles for the uploaded assets have been defined (108), the publisher console 20 provides (110) the publisher 22 with a lineup management screen for its own staff to define ordered lists of titles, referred to as "lineups," Within the publisher console 20, the publisher 22 can define lineups of titles. In some cases, lineups are created by the publisher 22 as a way to organize and recommend specific videos that the publisher 22 is offering. The same title may belong to more than one lineup. Lineups are published and accessed through a viewer experience, permalink URL or through an RSS feed.

When creating a lineup the publisher 22 specifies a name for the lineup and assigns it at least one title. The publisher 22 may provide a description and may select a thumbnail image for the lineup. While creating or editing a lineup, the publisher console 20 presents the publisher 22 with a scrollable, ordered list of uploaded titles. The title list includes a sub-panel that displays information associated with a title in the list. A button is provided to add a video to the list. This button brings up a video title picker. If possible and if consistent with other dialog boxes, the picker allows the publisher 22 to select multiple videos to include in a lineup. In some embodiments, newly added videos are placed at the end of the list and titles can be dragged and dropped from one location in the list to another.

a. Lineup Management Screen

A lineup management screen (not shown) is also displayed in the publisher console 20. The publisher 22 accesses and manages lineups using the tools provided in the lineup management functions. The initial screen for this tab contains two main sections. The right side lists all lineups in a data grid. The left side contains a lineup detail panel that displays information about a selected lineup. The data grid includes a row entry for each lineup. A row entry is partitioned into columns, each of which include information about the lineup. Examples of such information include: a lineup name, the number of videos included in the lineup, an active/inactive flag indicating whether the lineup is available for distribution, and the date on which the lineup was either created or last modified. The publisher 22 may sort the data grid by column and filter the data grid such that only the entries of interest to the publisher 22 are displayed. The publisher 22 may edit a lineup by double clicking on any portion of its row entry. When selected the lineup detail panel displays the following information: the name of the lineup; a description of the content in the lineup; a thumbnail image; and the lineup's reference ID. The detail panel then displays a scrollable, ordered list of titles contained in the lineup. Next to this list is a sub-panel that displays information about each title in the lineup when selected. When a title is selected in the sub-panel, a video detail sub-panel displays the following information: the name of the title and a short description of the title's content. In some embodiments, the video detail sub-panel includes a small video window in which the full length video or preview clip can be played.

The lineup detail panel includes a button to edit and delete the currently selected lineup. If the publisher 22 wishes to delete a lineup that is not being used within any player, the publisher console 20 prompts the publisher 22 to confirm or cancel the delete operation. After receiving confirmation to delete the lineup, the publisher console 20 sends a command to the service platform 30 that causes the lineup to be deleted from the publisher's account.

If a lineup selected for deletion is being used within any player, the publisher console 20 displays a warning dialog that informs the publisher 22 that the lineup is in use. The warning dialog includes a scrollable list of all the players that are using the selected lineup. The publisher is given the option to delete the lineup which causes all references to the lineup to be removed from all of the players displayed in the list or to cancel the delete operation, in which case the lineup will remain. The publisher 22 can activate and deactivate lineups. Deactivated lineups are not publicly accessible, but can still be edited within the publisher console 20.

b. Dynamic Lineups

In some embodiments, publishers define lineups based on a set of rules applied to dynamic data. These types of lineups are referred to as "dynamic lineups." For example a dynamic lineup could be composed of video titles that have a common keyword, include popularity ranking or be driven by other recommendations. Dynamic lineups may also have a variety of sorting mechanisms for organizing titles (e.g., alphabetical, newest to oldest, oldest to newest). Publishers have the option to cap the maximum number of titles contained in a dynamic lineup.

c. Non-Dynamic Lineups

In some embodiments, publishers have the ability to pre-populate non-dynamic lineups from a search query. For example a publisher 22 could form a rule that queries for all video titles with the keyword "Travel" and with a popularity rating of "5 Stars". This result set may return a total of 17 titles, from which the publisher might hand select or reorder a subset of 10 from the 17 total available titles.

d. Series

In addition to augmenting the catalog with lineups, the publisher console 20 provides the publisher 22 with tools to organize titles within a series. A series is a special type of lineup whose titles can belong only to that series. The titles in a regular lineup can also belong to other lineups. Series are created and managed along with other lineups. The same functions that are used for managing lineups are used for managing series. For example, a publisher 22 can add or remove a title from a series in the same manner describe for a lineup. When creating or editing a video title a publisher 22 can associate it with a series. When looking at lists of video titles, publishers have the option of viewing the titles grouped by their associated series. A title knows what series it belongs to, but it is not a requirement that a title need to know each lineup it has a relationship with. Within the publisher console 20, the publisher may configure a lineup display to group video titles by their associated series and display only those titles that belong to a particular series.

e. Lineup Subscriptions

Publishers have the option of creating a subscription from a lineup. When creating a subscription the publisher would specify the payment terms. Payment term options may include monthly or yearly billing. If a user 12 purchases a subscription and their subscription account is valid then the user 12 will have access to the titles within the lineup.

6. Player Definition

Within the publisher console 20, the publisher 22 defines the viewer experience for presenting the titles to a user 12.

The presentation aperture 13 within a presentation context 15 (e.g., a web page) in which titles and lineups are presented according to the viewer experience is referred to as a "player." In certain embodiments, a player can be an application that is built upon the Macromedia Flash platform.

Publishers have the ability to create as many viewer experiences as they like, enabling power-sellers to offer dozens of viewer experiences, and basic original programmers to offer just one viewer experience with a handful of programs. When creating a viewer experience within the publisher console 20, the publisher must first provide basic information about the viewer experience such as a name.

Through the publisher console 20, publishers can select and enable components of the players that are to be made available as part of a viewer experience. Such components include programs that collect and report user 12 input (e.g., ratings and comments) and tools that allow a user 12 to share the content with others.

Additionally, beyond selecting a pre-built player from within the publisher console 20, a publisher may author a customized player using the provided SDK 60 that includes Flash and XML Web Services.

Figure 13:
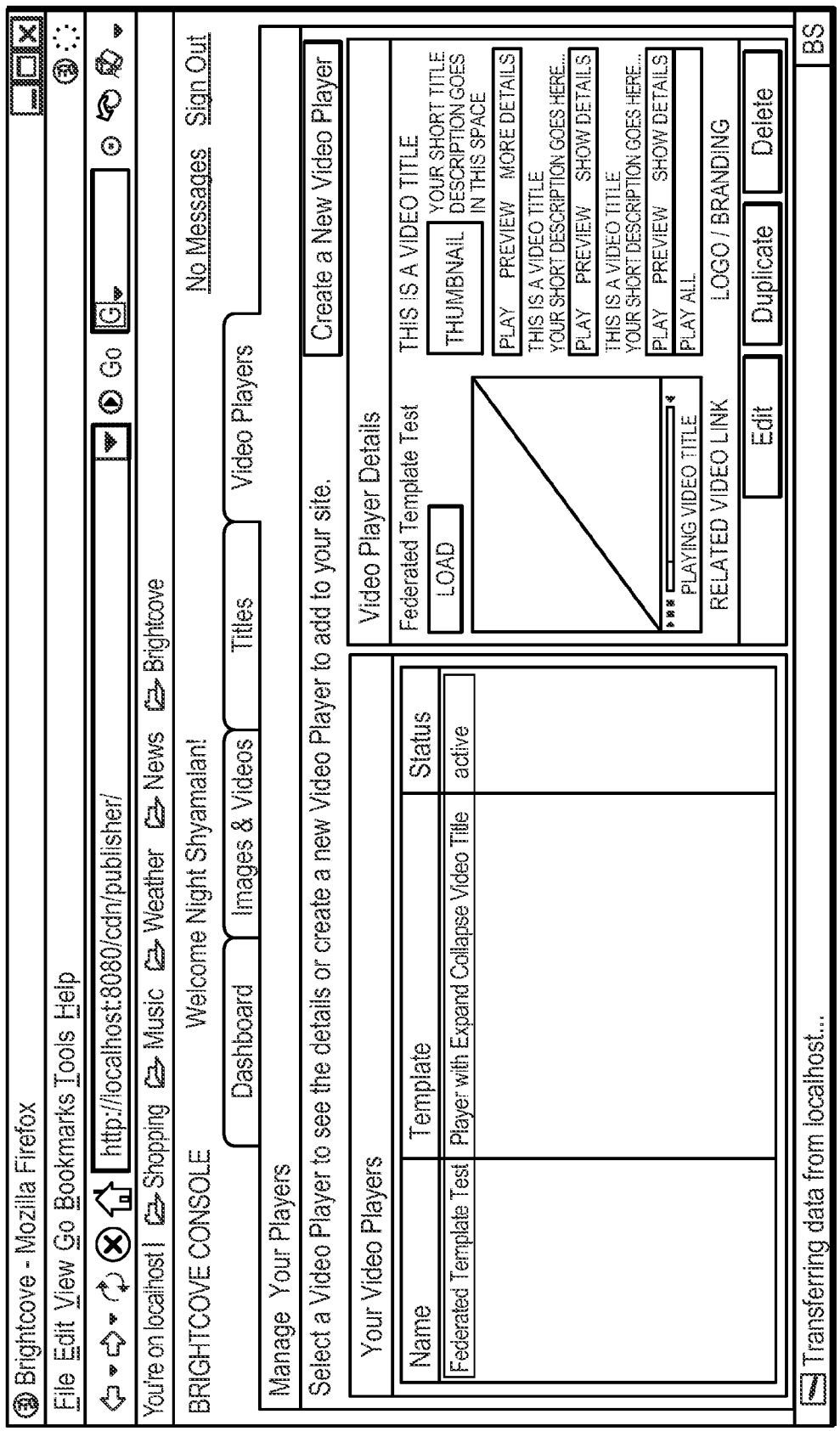

FIG. 13 shows a player management screen that displays a list of players created by the publisher.

a. Selecting a Player Template

The publisher console 20 provides (112) a template-selection screen for selecting a player template that defines the format and layout of the player and the rules by which users 12 are able to view/select the titles associated with the player. The visual presentation of the player is defined by a "player template". The service platform 30 includes a variety of player templates that each has a different theme and style. Themes establish look and feel for control and elements. Styles set fonts and colors on items like text, buttons, and controls. By choosing a player template with a specific desired layout of text, images, lists, controls, and video playback space, the publisher 20 determines the layout of the player.

Figure 14:
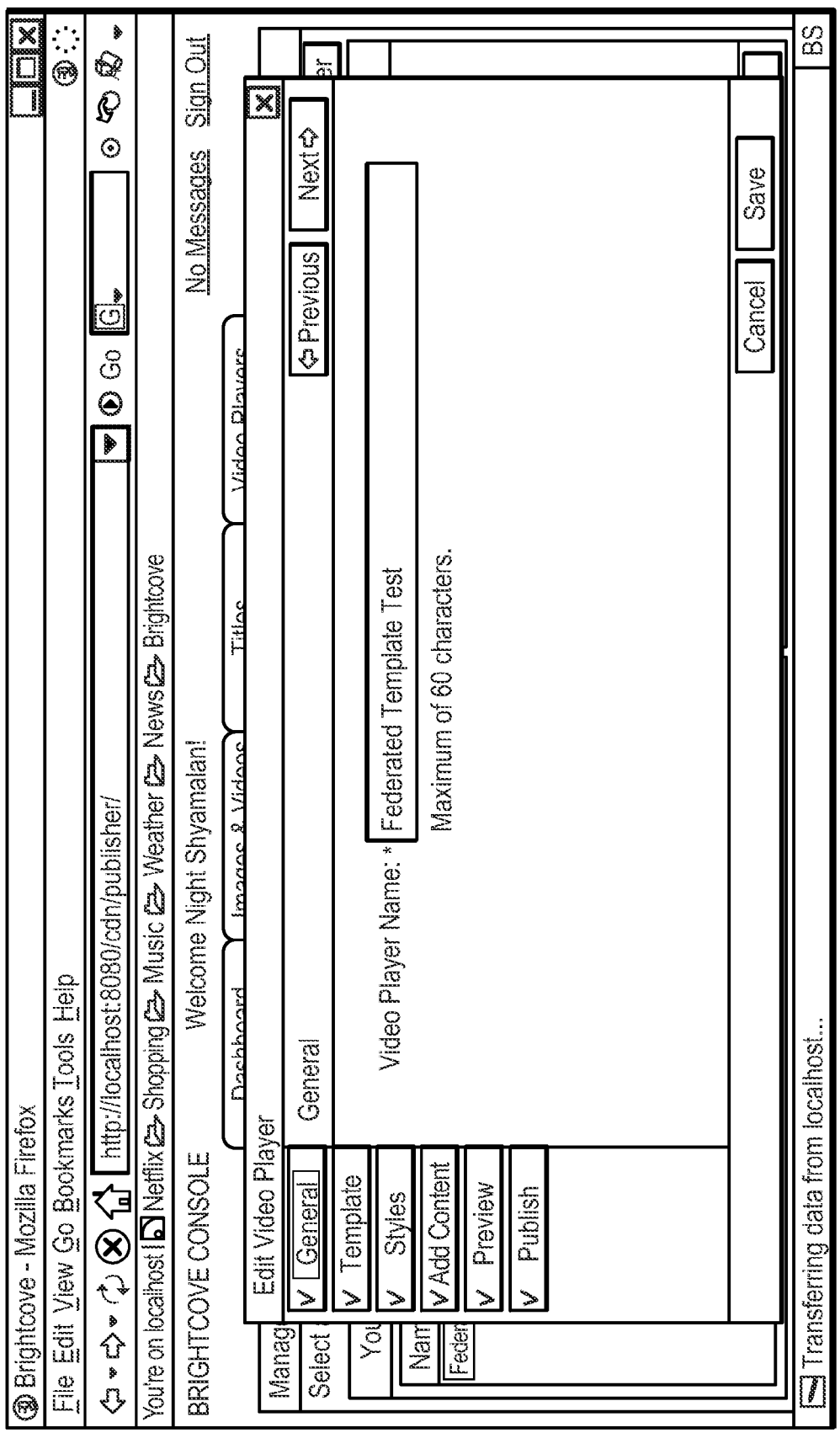

FIG. 14 shows a general player editing screen that allows the publisher 22 to edit an existing player. The publisher can change the player template assigned to the player by selecting the template button in the left-hand side of the general player editing screen. If the publisher selects the template button, the publisher console 20 displays a template-selection screen that provides a list of different templates that the publisher can choose.

Figure 15:
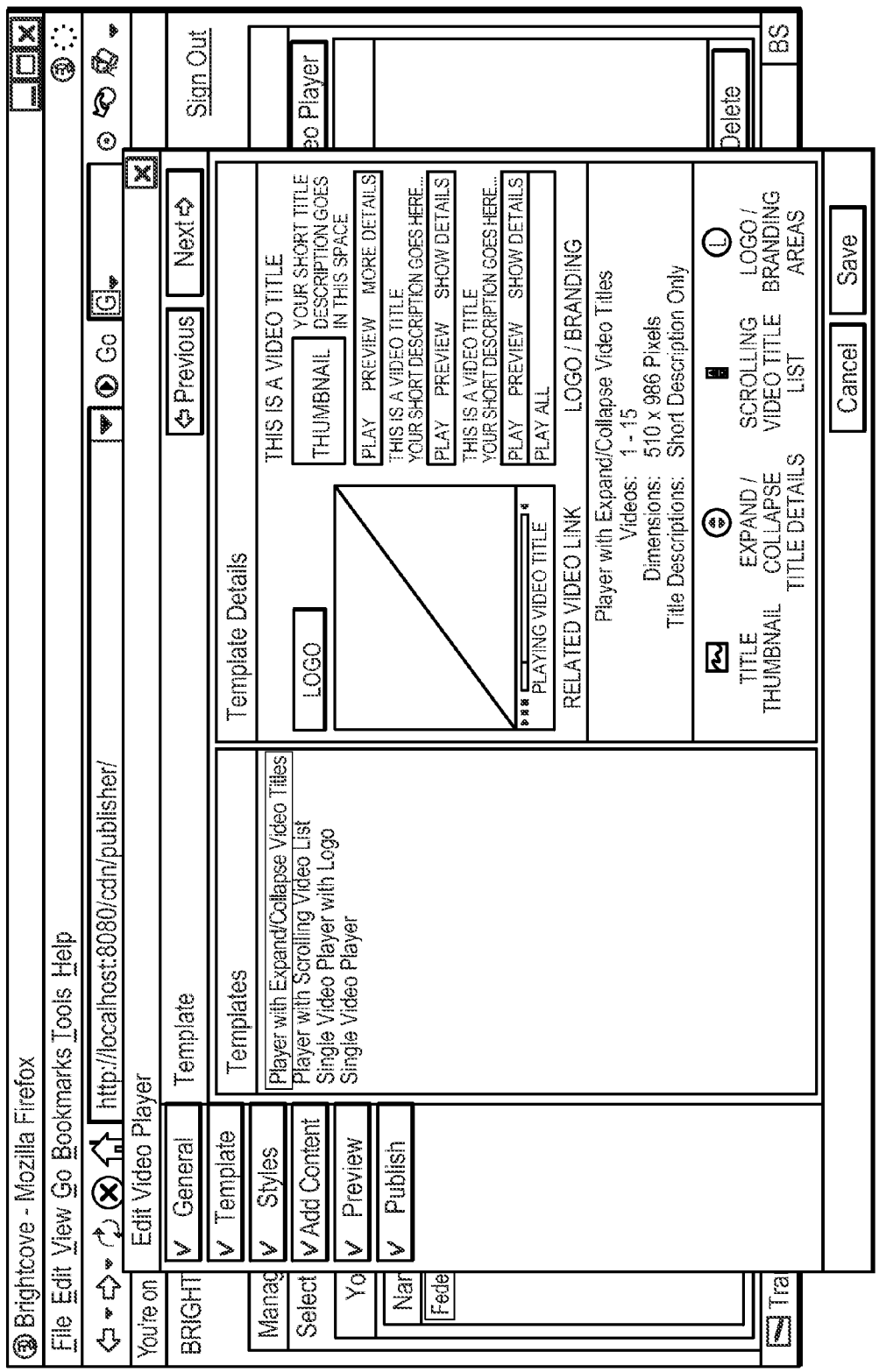

FIG. 15 shows an example of a template-selection screen that provides a selection of four default templates (e.g., Player with Expand/Collapse Video Titles, Player with Scrolling Video List, Single Video Player with Logo, and Single Video Player). When the publisher selects a template from the list, the template-selection screen displays the information regarding the template in a template details panel. The template details panel displays the dimensions of the player and the arrangement and layout of player components such as video screens, thumbnails, logos, titles, buttons, and brands.

Figure 16:
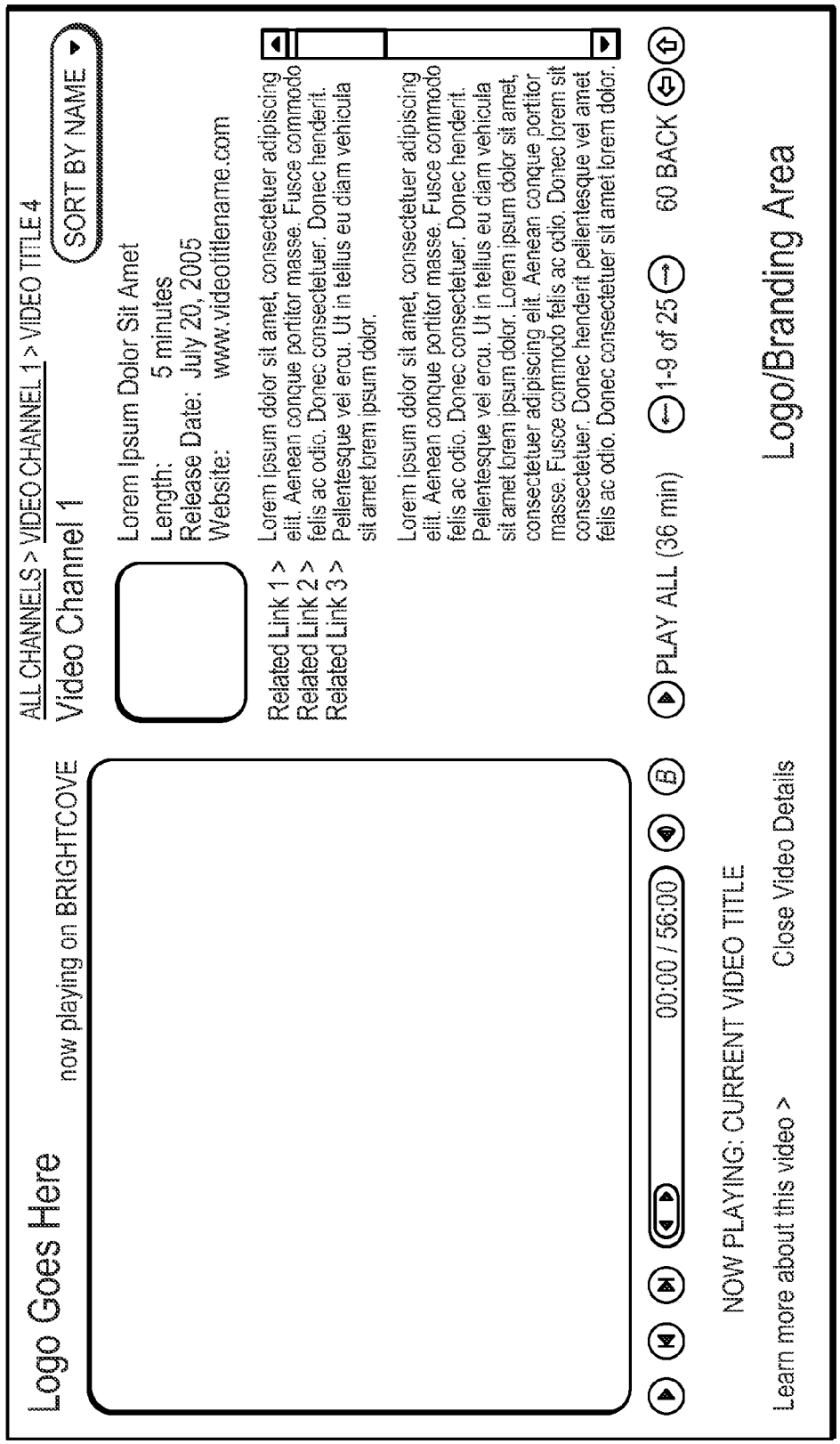
Figure 17:
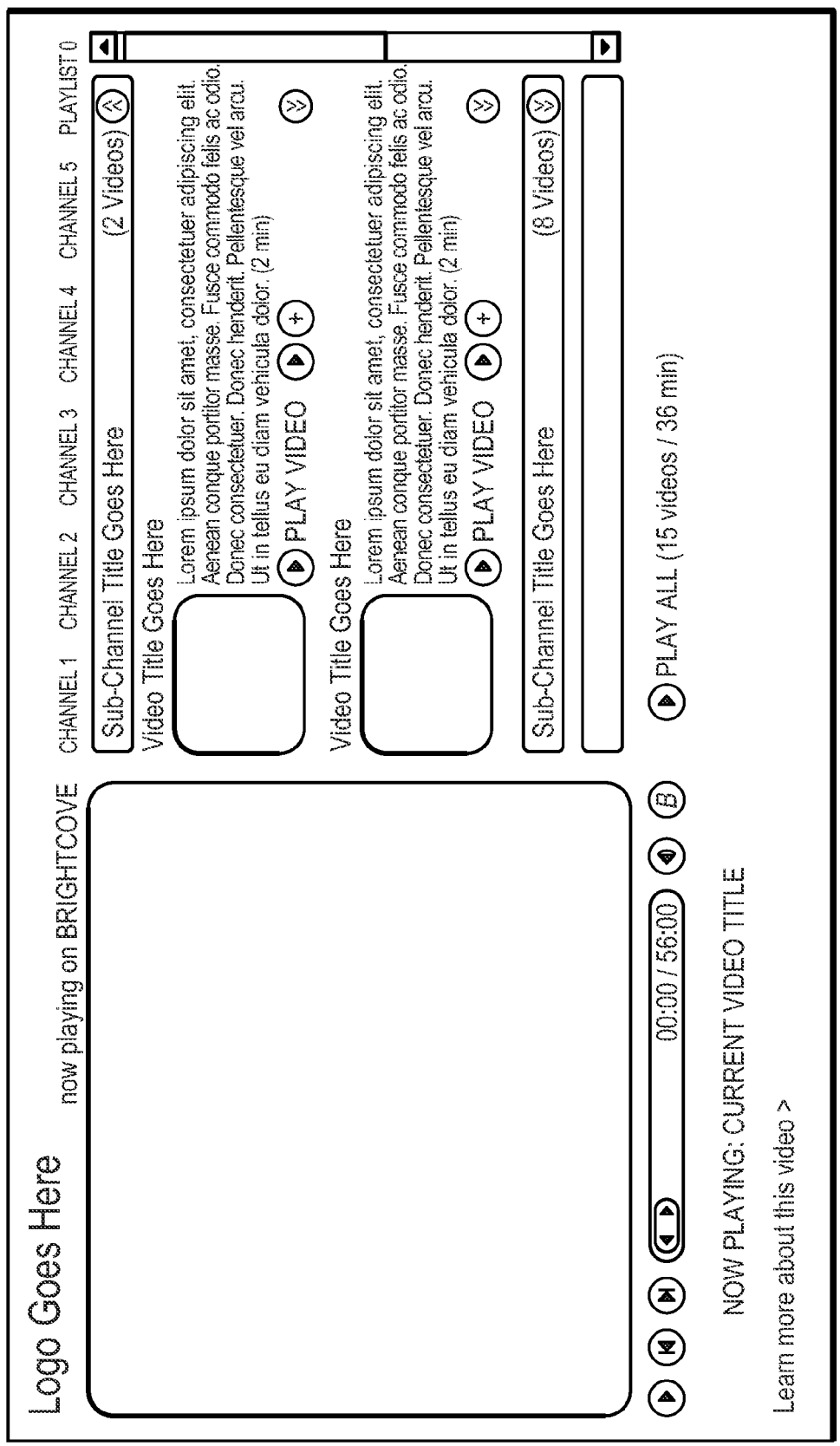
Figure 18:
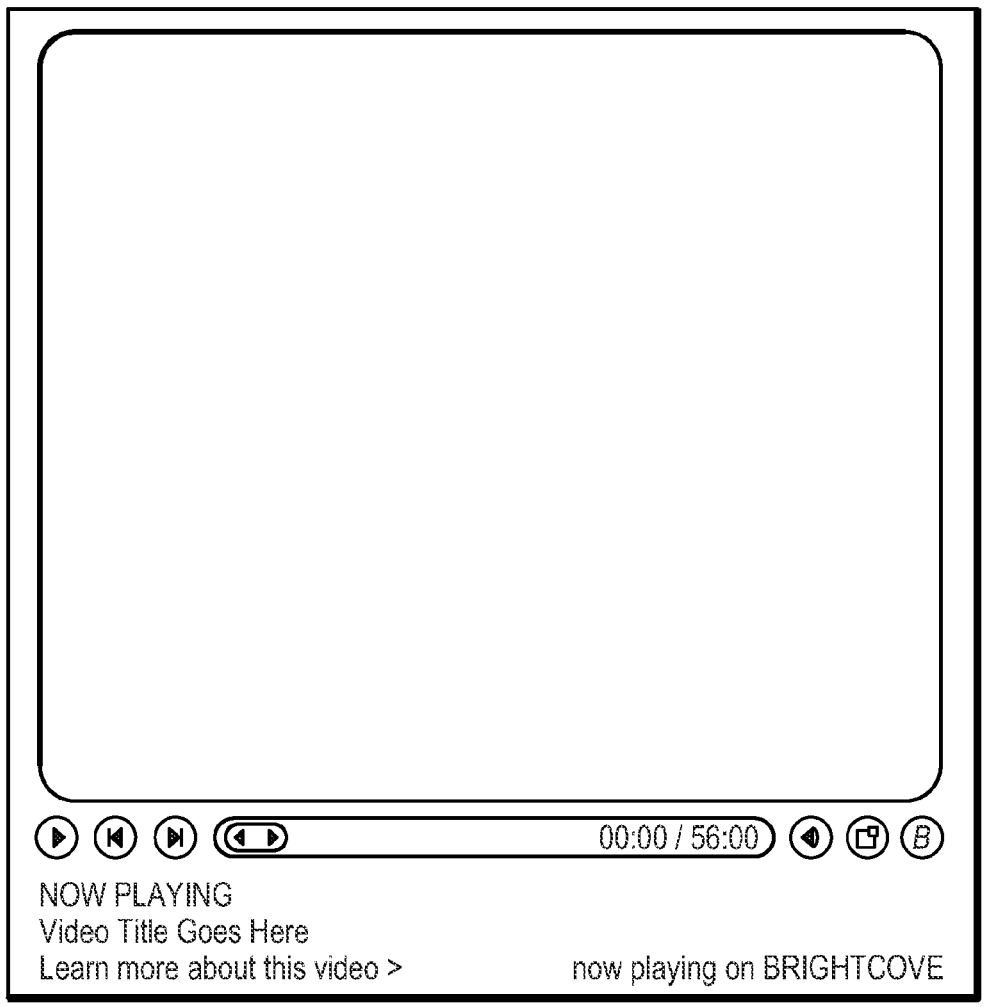
Figure 19:
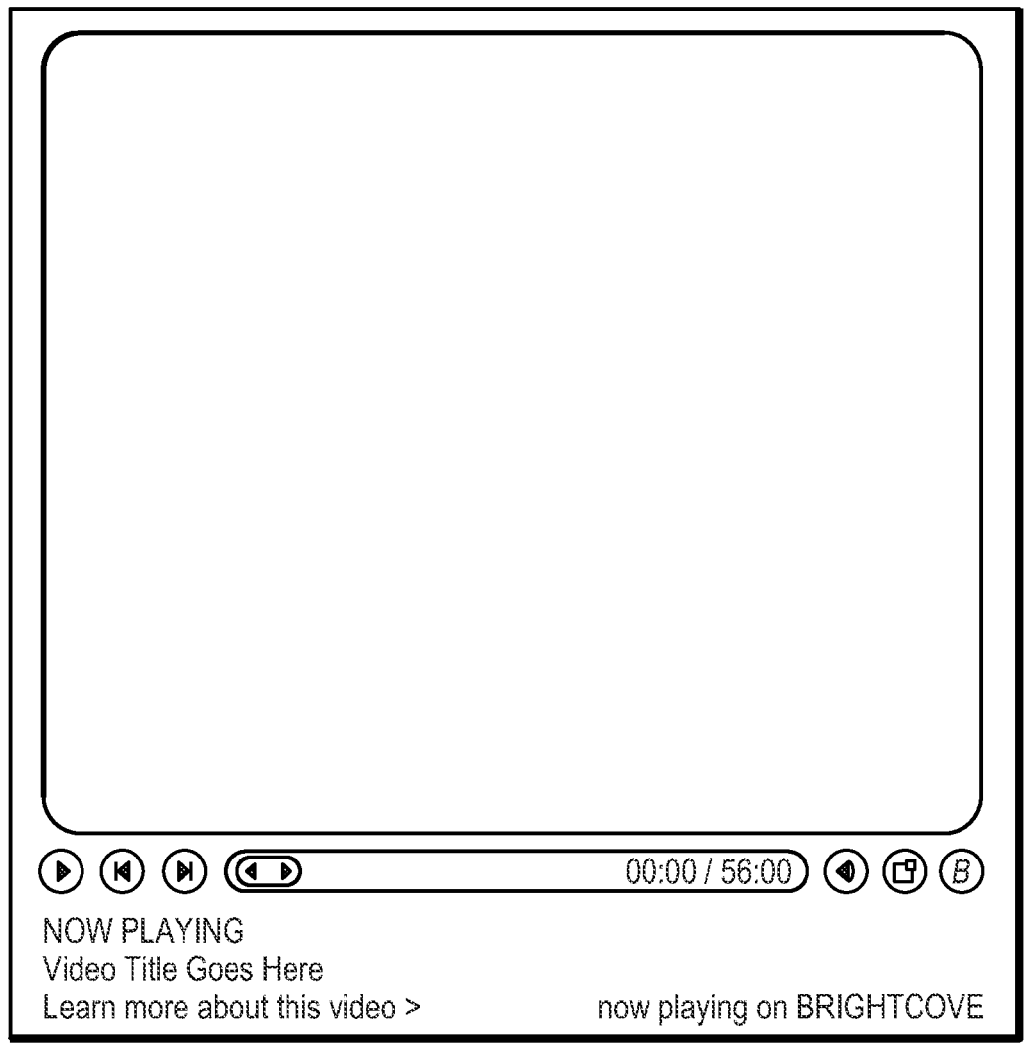

FIGS. 16-19 show examples of the four default templates. FIG. 16 illustrates the "Player with Expand/Collapse Video Titles" template. FIG. 17 shows the "Player with Scrolling Video List" template. FIG. 18 shows the "Single Video Player with Logo" template. FIG. 19 shows the "Single Video Player" template. The publisher 22 can further configure and customize the player template. For example, the publisher 22 may, for example, change the aspect ratio of a video screen or adjust the layout and/or dimensions of the player template.

b. Selecting the Style of the Player

After the publisher 22 selects and configures the player template, the publisher console 20 provides the publisher 22 with a style editing screen that enables the publisher 22 to customize the look and feel of the player.

Figure 20:
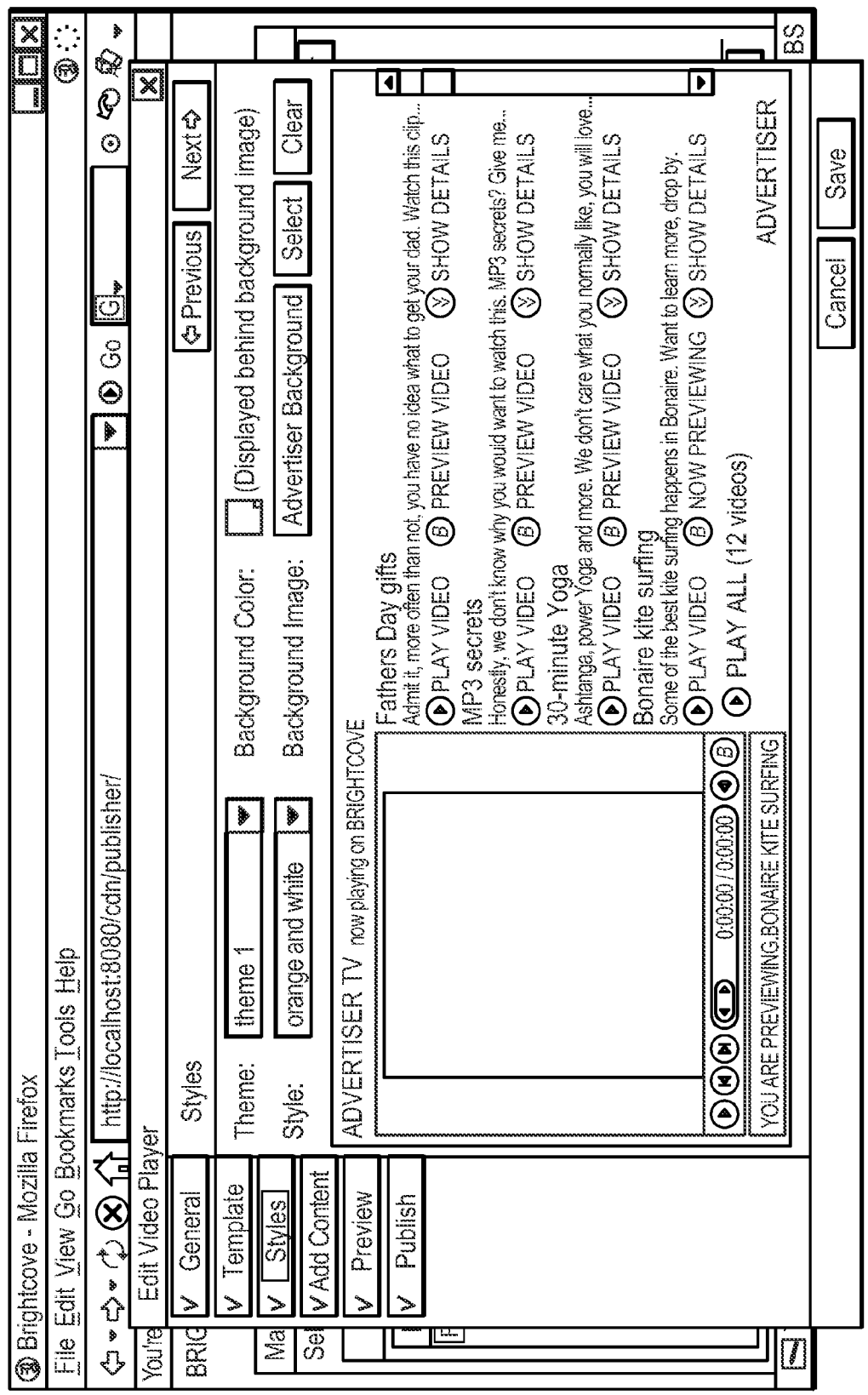
Figure 21:
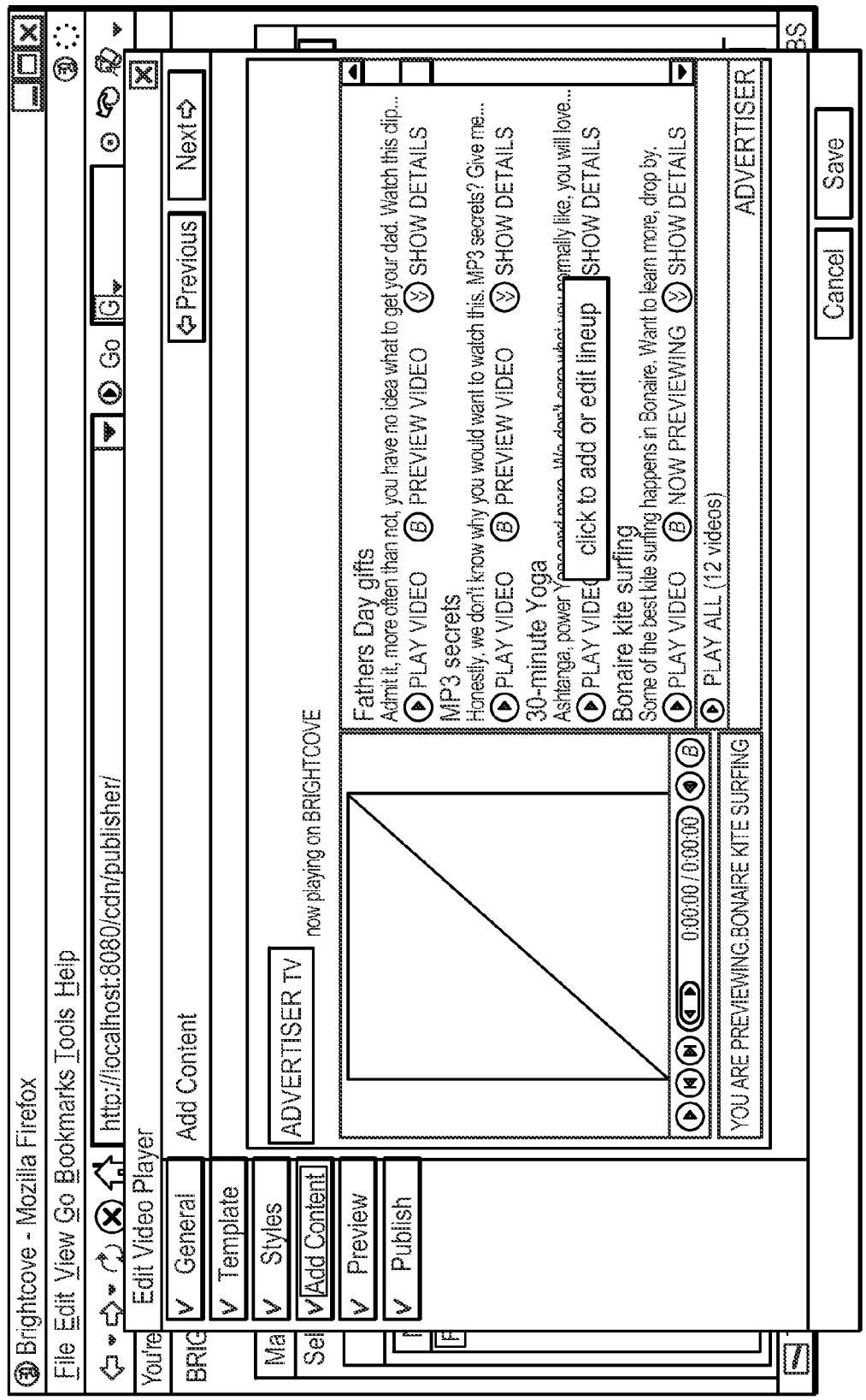

FIG. 20 shows an example of such a style editing screen. Using the tools provided in the style editing screen, the publisher 22 can select between different player themes and styles for displaying different styles, sizes, and colors of fonts, borders, buttons, and other features in the player. The style editing screen also enables the publisher to set the background of the player. For example, the publisher 22 can upload a background image that can be used to paint the entire background of the player template. If the publisher 22 has not already specified a background image, the publisher 22 may also select a background color of the template.

c. Selecting Content to Include in the Player

After specifying the aesthetics of the player, the publisher 22 selects the content to be presented in the player in a content editing screen. An example of a content editing screen in shown in FIG. 21. To add content to the template, the publisher enters a video title or lineup in the appropriate location of the template. In some embodiments, the content editing screen provides the publisher with a button, that when pressed, allows the publisher to add, delete, or edit content. If the publisher indicates the desire to add content to the template, the publisher console 20 presents the publisher 22 with two main options: choose titles from a whole library or select a lineup from a list of existing lineups. If a publisher 22 selects the source to be the complete library, the publisher 22 is given the option to sort the list alphabetically or by date (Newest to oldest; oldest to newest). If the publisher 22 selects a lineup the publisher console 20 presents the publisher 20 with a lineup picker (similar to the title picker described above) for selecting lineups from a lineup management screen (not shown).

The lineup management screen includes a first section that lists all lineups provided by the publisher 22 and a second section that displays information about a selected lineup. The lineups are listed in a data grid that displays the names of the lineups and their titles. The data grid allows for sorting on each column and type-ahead filtering on the name. When selected the lineup detail panel displays the name of the lineup; a description of the content contained in the lineup; and a thumbnail image. The detail panel also displays a scrollable, ordered list of titles contained in the lineup. In some embodiments, the scroll bars only appear if the list exceeds the size of the panel. The detail panel includes a sub-panel that displays information about a title that has been selected by the publisher 22. When a title is selected in the sub-panel, the title detail sub-panel displays information related to the title. Such information may include a name, genre, description, and ID number of the title. In some embodiments, a small video window is displayed with controls to play the full length video or preview clip. Within the lineup management screen, the publisher may create a new lineup or edit an existing lineup.

A player can present a single lineup or multiple lineups. The lineups may include non-dynamic lineups, dynamic lineups, or a combination of both. The publisher 22, for example, may create a player that has a fixed number of pre-placed tabs or buttons that are each associated with a different lineup. The publisher 22 may also configure the player to display the description and/or thumbnail of the lineup after the corresponding button is selected. In another example, the publisher 22 could configure the player such that a single tab/button corresponds to an initial lineup, whose list of titles are to be loaded and played first. At any time, the publisher 22 can add or delete lineups from a player and change the order in which the lineups are displayed.

In some embodiments, the player is configured to send usage data when lineups are viewed by users 12. The usage data may include the names of the titles within the lineups that are accessed and played. If a lineup is accessed by a user 12 usage data may include one or more of the following: a publisher ID, a player ID, a player name, a lineup ID, and a video title ID.

Figure 22:
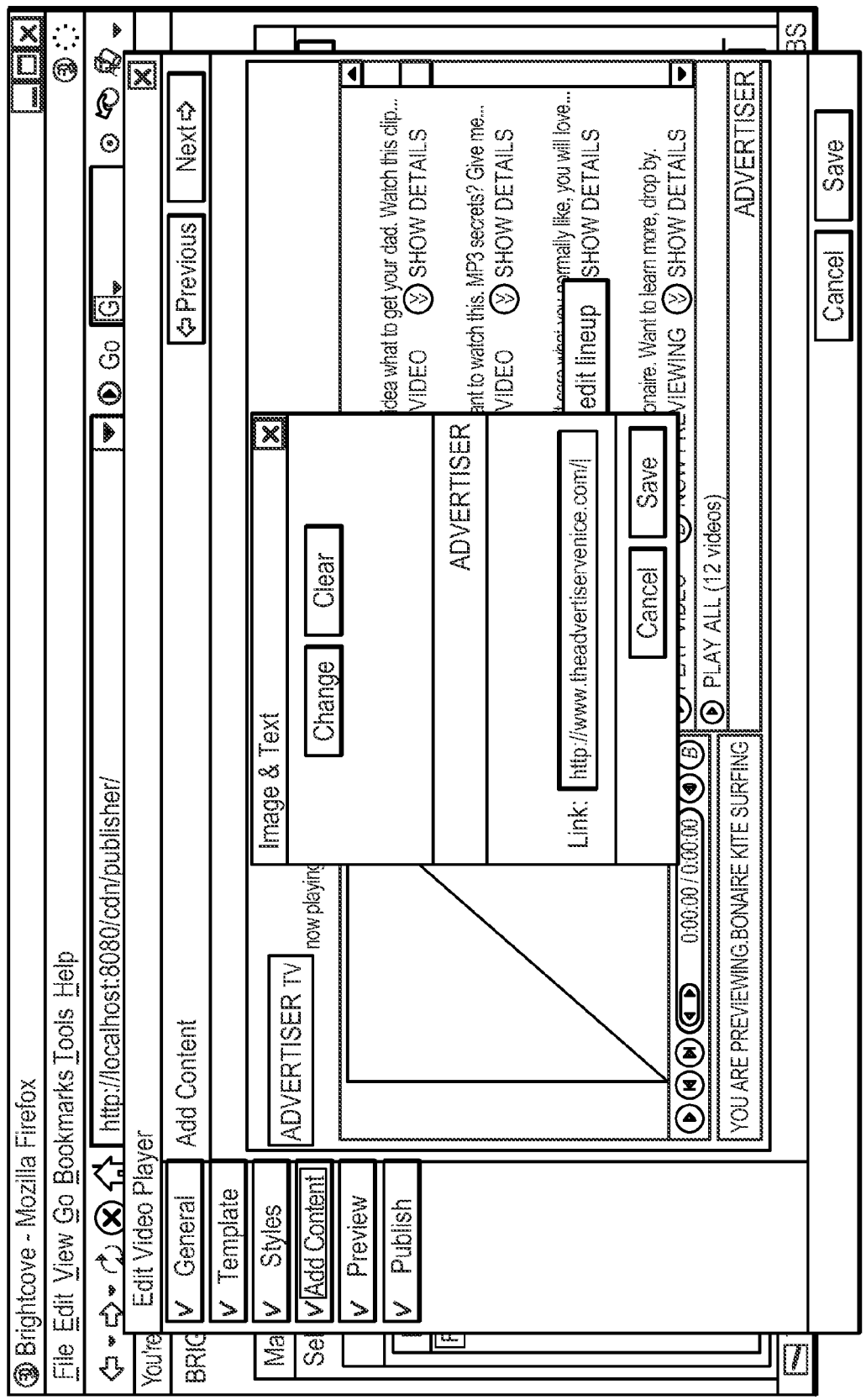

The content editing screen also enables the publisher to add, delete, and edit graphics and text displayed in the player. FIG. 22 shows an example of a content editing screen in which the publisher adds a link to an image displayed in the player.

d. Player Preview

After the publisher 22 specifies the content to be presented in the player, the publisher console 20 provides the publisher with a player preview screen. An example of a preview screen is shown in FIG. 23. The player preview screen allows the publisher 22 to preview the player before publishing it. If the publisher 22 wants to make further changes to the player, the publisher 22 can return to the previous screens and the return to the preview screen to view the player. The publisher 22 may continue to make changes to the player and preview the results until the publisher 22 is satisfied with the player.

7. Publishing Player

After the publisher 22 finishes defining the player, the publisher console 20 provides (114) the publisher 22 with a presentation content code 19 (i.e., a presentation facility) that can be incorporated into the publisher's web page or potentially into any other web page. FIG. 24 shows an example of a presentation content code 19.

The presentation content code 19 contains a player ID for the player (e.g., experienceID=5). When the presentation content code 19 is placed in a publisher's (or affiliate's) web page, the web page can retrieve the player from the service platform 30. When a user 12 at client 14 opens the web page, the embedded presentation content code 19 invokes the service platform 30 to supply the client 14 with the player associated with the player ID contained in the presentation content code 19. Changing the player ID provided in the presentation content code 19 changes the player that is loaded from the content library 32 of service platform 30. FIGS. 47-53 show a database schema used in the content library 32. As the user 12 interacts with the player, the player communicates with the service platform 30 and loads the appropriate titles and/or lineups to be displayed. A publisher may also instruct the presentation content code 19 to initially load specifics titles and/or line-ups on invocation. Through this mechanism, a publisher 22 can use the same content management system that controls the text and graphic content in their web page to control the content that is delivered through a player in their web page. The player is presented to the user 12 as if it is being supplied directly from the web page.

D. Advertising, Promotion, and Marketing

The service provides tools to publishers 22 that allow them to market their product offerings within the service platform network, including the publisher's websites or affiliate websites, and externally through marketing partners, customer messaging, and search engines. Assets provisioned into the service are not immediately made available for use and access by users 12. Instead, the service platform 30 provides publishers with a set of tools for defining and making titles and lineups available to users 12, including controls on scheduling and distribution. Publishers also are provided a variety of tools for highlighting and promoting programs, placing program information into search engines, and managing program availability on an ongoing basis. While many published programs are made immediately available, often publishers want to control their availability on a scheduled or embargoed basis. Furthermore, publishers may want to constrain the time and geographic availability for programming based on contract and distribution agreements that they have in place.

1. User Notification

The service platform 30 provides built-in mechanisms to notify users 12 when new content items become available, including interfaces for desktop notification, SMS and IM notification (using m-Qube and IMLogic gateways), and email notification. The service platform 30 provides standard templates for these notifications, which can be customized with HTML or Flash. Additionally, publishers have access to all opt-in consumer data provided by users 12 via the Web, or an XML interface for integration into their own customer contact systems.

2. Keyword Bidding

The service platform 30 provides the publisher 22 with tools to manage and bid on keywords and paid listings in search platforms such as Google, Overture and MSN. Using these tools, publishers 22 manage their keyword inventory and purchase across services (through third-party ASPs who offer such services, wrapped in a web service). For example, a publisher 22 of videos about training dogs could purchase and bid on "dog training videos" in various search engines, with links directly back into the item-level detail for a specific lineup or title. The service platform 30 automatically generates HTML-text pages for each program in the system which can be URL accessed, linked to by any affiliate or consumer website, and available as part of an rich site summary feed, ensuring that all media can participate in broader Internet sites and search engines.

In addition to paid keyword campaigns for the content items, the service platform 30 provides a set of services to automatically integrate information regarding the content items into search engines, as well as optimizing content for search engines through linking and sharing techniques.

The service platform 30 ensures that uploaded media content and meta-data is spider accessible through an HTML document. The service platform 30 automatically publishes an indexer/robot friendly version of content. Additionally, various components of the service have a permanent URL link ("permalink"), including major sections and sub-sections, publisher home screens, video detail screens, videos themselves, and even cue points within a specific video. The service platform 30 automatically publishes new and updated content meta-data into search engines, such as those provided by Yahoo, Google, SingingFish and MSN's emerging audio/video indexing services.

3. Advertisement-Supported Content

The service platform 30 implements an environment where publishers and users 12 are brought together in an online marketplace. Various packaging and pricing options are available to publishers, ranging from ad-free media paid for entirely by the consumer, to ad-supported media which is free to the viewer. Support for a variety of advertising related needs is integral to the service offering.

In the service, video products are delivered and viewed using the power and flexibility of network connected PCs. This enables rich media advertising to be integrated with packaged content items 23 in ways that are not possible with traditional video distribution systems such as broadcast or cable television. For example, ads can be comprised of video, with overlay graphics, and interactive areas enabling the user 12 to click on parts of the ad to get more information or to change the course of the ad itself. In general, the full power of interactive media can be applied to ads that are delivered in media packages.

The service also makes it easy and automatic for ads to be associated with video products based on content and viewer demographics. This enables advertising to be focused in ways that bring more value to both the advertiser and the viewer. The service platform 30 provides a rich set of tools for integrating advertising into the media package, optimizing the needs of producers, viewers and advertisers.

4. Advertisement Insertion Tools

In some embodiments, the publisher console provides the publisher with tools to offer ad-supported programs. Advertisements may be simple video streams, or be interactive, or even be overlaid on the video stream itself such as in an icon or sidebar or a scrolling footer. Interactive advertisements may be created which allow a user 12 to follow a link to more detailed information. The viewing of advertisement links may be deferred so that a user 12 may view a program with minimal interruption while building a list of links and promotions to be viewed at a later time.

The ad insertion tools allows the publisher 22 to define the placement and accepted formats of advertising, and the content delivery engine 80 (FIG. 6) dynamically matches and serves advertisements based on the content and user 12 context. Media packages and advertisements can have meta-data linked to them that describes the content. This meta-data is used by the service to automatically associate ads with programs that have related content, targeting ads to users 12 that are more likely to respond to them, and improving the consumer's experience by showing ads that are tailored to their interests. Additionally, as more information is known about a consumer's preferences and demographics, the personalization module 86 (e.g., provided by ChoiceStream) is used to inform the ad matching process, and to target ads at specific groups of viewers.

After the publisher 22 provisions and publishes a program, the publisher console 20 provides the publisher 22 with an interface in which the publisher can set advertising cue points in the player, and choose the quantity and format of advertising at these cue points. For example, for a 45-minute video a publisher could set a cue point for pre-roll advertising that enables 2 20-second video spots, another cue point at a transition 15 minutes into the program where they enable an overlay-based advertisement, another cue point at 35 minutes that inserts 3 video spots, and so on.

Additional information can be associated with these cue points to increase the likely hood of relevant advertising. The ad insertion tool allows the publisher 22 to define the placement and accepted formats of advertising, and the content delivery engine (FIG. 6) dynamically matches and serves advertisements based on the content and user 12 context.

5. Advertising Templates

The service platform 30 and the delivered viewer experiences support a selection of advertising templates and advertising areas in which a video, banner, logo, or any other graphic or textual advertisement or promotional content can be placed. Advertisers may bid on or purchase advertising areas so that their advertisement appears in the publisher's or affiliate's player. The advertising areas can also be used by the publisher 22 to promote new services and/or products offered by the publisher 22. In some embodiments, the publisher 22 populates the advertising areas and defines simple rules for their display (e.g., time windows, rotation behavior, etc.). In some embodiments, the advertisers themselves have access to the areas and can populate the areas and define simple rules for their display.

FIGS. 25-40 show exemplary advertising templates. FIGS. 41-46 show exemplary players built upon various advertising templates.

6. Ad Renditions

The service allows different renditions of ads to be served to a user 12 based on the method that the user 12 uses to view the ads for optimal viewing. For example, in a web-browser, ads are able to take full advantage of the capabilities of Flash and Flash Video in a streaming delivery. In full screen mode, fewer capabilities are available. When viewing on a television, interactions with a remote control are supported.

The desktop client provided to a user 12 enables different forms of advertisements to be displayed. The desktop client enables rich forms of ads: images, video and interactive ads. These ads can be displayed in different ways. They can be displayed pre-roll, overlaid, in-feed, or post-roll. The desktop client displays a canvas over the running video and can detect keystrokes and mouse movements from the user 12. These events can result in different types of actions including navigating to a web site and capturing information for reporting.

To reduce the impact that ads have on the download times of media packages, ads may be cached on the consumer's client computer 14. This enables an ad that may be shown multiple times to be delivered only once and not incur any delivery cost for other products into which it is inserted.

The service platform 30 provides tools for advertisers to purchase available inventory, and to change their purchases dynamically based on market conditions. When the service is an online system with direct customer interaction, no advance notice is necessary to change the advertising associated with a particular media product as there is in a traditional broadcast distribution system. As advertisers' needs change, they can adjust their campaigns on the fly and those changes are instantly reflected in the distribution of their ads. Also, as the popularity of a particular product changes, or as the distribution of users 12 changes, the service can react instantly and reflect those changes in the automatic association of ads with content.

The service platform 30 provides reporting tools to inform advertisers about the progress of their campaigns. This information enables advertisers to respond quickly and change strategy based on the measured success of their ads.

E. User Experience

The user experience spans multiple interaction channels including web browsers, desktop clients, email, instant messaging (IM)/SMS and televisions through convergence devices. Content available from the service platform 30 is capable of being consumed on a wide array of consumer electronic devices. This includes both in home electronic devices (TVs, Media Renderer) as well as portable Media Centers. Users 12 are able to view their available content on any device, at any time.

The service provides three primary user 12 experiences: web based client, desktop client, and Windows Media Center client. The desktop and Media Center clients are installed applications. The installed applications enable a set of functionality that builds upon and extends that of the web client. The features of the desktop client and Windows Media Center client are: a rich environment for viewing available content; ability to display both rich and interactive media ads; background and foreground downloading of content for high quality video; full access to the service's website; ability to copy purchased content, where entitled, to physical media such as a DVD or Portable Video Player.

1. Desktop Client

On client computer 14, the service is accessible both through a web browser and a desktop client application. The initial access for the service is through the web. The website acts as a gateway for many types of users 12, all with different goals and expectations. A desktop client is offered to users 12 who are registered members and provides a richer and more compelling entertainment experience. The website and the desktop client through which content items are presented to a user 12 take advantage of Macromedia Flash and broadband connections to ensure a rich, visual experience.

When a consumer registers and becomes a member, they are prompted, though not required, to download and install a desktop client. The desktop client provides a more exciting and higher quality environment. For example, through the desktop client one is able to access downloaded DVD-quality videos, whereas through the web browser the consumer can only access a streamed video of lower quality. Overall, the desktop client experience can be more engaging with an increased sophistication in user 12 interactivity and visual and aural experiences. All functionality and content delivered through the website is also accessible through the desktop client.

The desktop client's functions are synchronized with operations performed through the web site. The desktop client leverages a public set of web services to process commands directed by the user 12. As an aid to rationally manage multiple interfaces into the same functions, the desktop client may act as a "browser proxy" to special sections of the website. From the user 12's perspective it appears to be a seamless environment, but the interface may be a mixture of local GUI resources and remote content. The desktop client functions in a more limited fashion when offline (browsing, searching and viewing downloaded content and advertisements), though all locally cached and stored videos are accessible.

2. Service Platform Features

The following features are made available through the service platform 30.

In the area of video browsing: browse by hierarchal content categories; content can be placed within multiple categories; "Custom catalogs" provide limited view into entire available library; browse through branded lineups; and browse through user 12 programmed lineups.

In the area of search for video: search across all available content meta-data; automatic search narrowing as user 12 types (e.g., similar to Apple iTunes); search results are dynamically clustered (e.g., using technology provided by Vivizimo); and define "saved search" criteria that automatically group video content (e.g., akin to "smart folders").

In the area of automated recommendations: "People like you, liked this" recommendations; recommendations from people in your important "social network" (i.e. your friends, your brother, etc); most popular (by viewership, ratings, etc.) videos broken down by categories, channels, etc; and personalized new arrivals.

In the area of editorial recommendations: content reviews; explicit cross sales between channels and videos; reviews, content and lineups "authored" by well known individuals (e.g., critics, celebrities, movie directors, etc); and produced magazine-like content that highlights programs available through the service.

In the area of preview of video: Flash streaming video; and a consistent preview length, for example, 1-minute.

In the area of customer registration, authentication and account management: registration is a streamlined process; potential members need to provide a bare minimum of information; billing information is only required upon first purchase; members are prompted to answer a number of questions to tailor their automated recommendations (using ChoiceStream personalization engine); service can optionally "remember" that the user 12 has previously authenticated (i.e. save username and password in local shared objects); manage trial memberships (limited access for periods of time; maximum number of viewings); an account can manage a household of other users 12; parental controls can be defined for certain users 12; monetary allowances and time thresholds (e.g., 2 hours per day; 10 hours per week, etc) can be established; system implicitly builds simple contact lists through "tell a friend" operations; user 12 is allowed to explicitly create contacts and organize them into groups; include name, email address, IM, mobile/SMS info; integrate with a federated identity management system to enable easy re-use of existing online accounts and profile information.

With respect to the purchase process: first purchase (subscription or download) prompts for billing information if not already known; and standard billing process for credit card information, and other services such as Paypal.

In the area of experiencing on-demand media: browser based viewing is streamed Flash video; Limited resolution and screen size; progressive downloads; full-screen DVD-quality video and sound; initial delay of a minute or less as buffer is built; and pre-roll advertisements can be shown during delay.

For experiencing delivered media: full-screen DVD-quality video and sound available for offline viewing and display through TVs.

With respect to advertising: ads are based on rich media, primarily Flash and Flash Video or Windows Media Video; integration with third party ad formats. Ads are blended into the viewing experience, depending upon ad format. Ads can be played before, during and after the video. For repurposed TV commercials, during video playback, the system pauses video, rolls ad and then resumes video.

In the area of "New Media" rich ads, the service offers: a variety of ad sizes and formats (related to IAB standards) layered over video in desktop client (swipes, dissolves, movement, callouts, etc); interactive ads that contain mini-sites for use in the desktop client. The desktop client can pre-deliver and intelligently download ads and as such can be much larger in size (tens of megabytes) and ad placement is based on context of user 12 and content.

With respect to reviewing and rating media: provides basic rating system (e.g., 1-5 Stars). Members given opportunity to write reviews, including audio/video reviews, rate the reviewers—their reputation increases or decreases, and implicitly rank content based on the number of times they are included in user 12 programmed lineups. As an example of automated promotion of quality titles, the service platform 30 could promote those titles that have both a high user 12 rating and a high "play count".

In the area of copying media to DVD or Personal Video Player (PVP), the desktop client allows user 12 to burn limited set of content items to DVD, receive authorization in DRM provisioning; integrate content items with portable video players such as Microsoft Portable Media Centers.

For managing subscriptions, bundles and purchases, the service platform 30 provides members with tools to: search and browse the available lineups and individual videos, and add selections to their video library. For those items that require additional payment beyond existing accepted terms and conditions, the member is prompted to authorize payment and billing authorization is performed before granting access rights. The service platform enables members to build scheduled channel guides; e.g., On Sundays at 8 pm queue the latest show of subscription X, followed by series Y, and rent program Z; to review purchases and active subscriptions; to mark subscriptions for auto-renewal (otherwise the members are prompted when subscriptions are up for renewal); to bookmark content categories, lineups, producers; and to mark "favorite entries" that become available for browsing through the TV.

With respect to getting technical support, the service primary support through online channels (email and self-service knowledge base) and telephone support. Online help is context sensitive, and integrated into functional user 12 interface. Where possible and appropriate, wizards and other directed processes are used to guide users 12 to accomplish key tasks.

3. Account Management

Users 12 receive access to the service by registering directly though the service's website using a simple registration process. They may also receive access as a trusted customer of a publisher. Users 12 can then choose between several payment options including PayPal or credit card, bank account transfer or a pre-paid account.

Users 12 are provided with account management services. Users 12 can access their account to change profile information or to change payment and billing options. They may also renew subscriptions, re-activate their account after it has been disabled, and review their purchase history and subscriptions.

Media programs are watched together within households. As such the system supports aggregated profiles of household members. Individual users 12 can have their own personal media library, which they sometimes access and watch on their own. In addition, with parental controls, family members' video programs are made available to the entire household.

4. Television

In some embodiments, the client computer 14 is a television. The TV interface has a limited set of user 12 functions, due to the limited interactivity available through TV remotes. Simple interactivity ties back into the PC environment. For example, an advertisement, served from the PC through a Microsoft "extender device", might have an option to "get more information." With the click of a remote, a message is then stored and relayed from the PC back to the service, which can then queue up a richer and more interactive advertisement application playable through the desktop client.

Functions that may be made available through the TV include: browse "personal channel guide" of available downloaded media; browse favorite content categories, lineups, initiate on-demand downloads; view available videos, with advertisements as required; conduct simple transactions initiated from advertisements, including: external orders; purchase video or add subscription from a cross-sell ad; tell a friend (from previously defined contacts or groups); tell me more info (i.e. email or interactive ad delivered to PC); and mail me Information (lead sent to advertiser).

5. Download of Content

Content delivered to the service client is generally done in the background providing for the inexpensive delivery of large binary files, but can also be delivered in the foreground for near-video on demand experiences. The technology used to download the files is dependent on the ubiquity of the file. If the video being requested is common among users 12, peer-to-peer file sharing technology can be used to obtain the file, permitting that the user 12 has opted to allow this, and that the client does not experience firewall or operator-based restrictions. Using peer-to-peer file sharing technology would result in no bandwidth costs to the service. If the video file is not available on many users 12' machines, intelligent download technology provided by Maven Networks Inc is used which results reliable delivery.

One important aspect of the service client is that it runs as a background process on the consumer's machine (e.g., in the system tray) and can be notified by the service to determine if a download needs to be initiated. This enables several important scenarios: automatic delivery of scheduled programming or user 12 requested downloads. In these scenarios, the service can identify the user 12 and determine what content needs to be downloaded. The service indicates the file(s) that needs to be downloaded and the download is initiated. The service client can process multiple download streams, with different priorities, and can respond to end-user 12 network or PC-activity and throttle the delivery.

6. Communities of Interest

The service offers users 12 a range of community-oriented tools, including ratings and reviews of all video products and sellers, and integrated tools for messaging and communicating with other users 12 such as friends or family members, and a platform for third-party websites to offer and point-to service-hosted content as affiliate marketing partners.

The service leverages and disseminates knowledge about relevant and interesting video content to members of the network. One effective process is to use relationships between members as marketing programs to highlight content to each other. The consumer is provided rapid and easy mechanisms to inform others, within their social network, of relevant content.

A wide range of tools and communication forums are available to the user community as a means to share and discover content in the service. These tools include: authoring reviews and editorials, including simple rating systems; building recommendation; generating lineups comprised of diverse titles that are potentially across publishers; discussion forums for titles, publishers, or tangential topics; externally linkable context into the service client for use in web blogs, personal homepages, externally generated emails, etc. linkable contexts include all product links, articles, lineups, and other textual media as well as video titles themselves including cue points within the video so as to link to a specific scene or piece of dialogue; and end-user 12 to end-user 12 communication initiated from within the service client via instant messaging, email, SMS, or other appropriate forms of communication. Such tools turn community interests and efforts into an effective means of exposing users 12 to desirable content as well as reduce the effort required in the content discovery process.

H. Revenue Models

The publisher console 20 enables publishers to offer multiple forms of packaging against the same set of packaged content items 23, enabling users 12 to have access to the packaged content items 23 across a full demand-curve for media. For example, publishers can offer their products on a free, ad-supported basis, as micro-payment based rentals and purchases, and as stand-alone and bundled subscriptions. Publishers can scale the quantity and quality of these package types while ensuring that the broadest range of users 12 can access their content easily.

A. User Pays

The publisher 22 can provide packages paid for by a user 12. The packages may include the following: rented streaming and downloaded videos which are time-limited in their use; purchased streaming and downloaded videos that give the user 12 perpetual rights to the content; subscriptions to monthly or annual streaming and download rights to all published products in a package; and bundled packages offered by publishers with discounts. In some embodiments, bundles may also be defined by the user 12 and be based on a pricing floor and performance-based discounting.

1. Subscriptions

Subscription packages can vary in format, schedule and price—all of which are determined by the publisher 22. Users 12 who subscribe have continual access to the video programs while their subscription is current. The service determines appropriate policies to deal with cancellations and breach of contract by the video producers (e.g., a subscription package calls for 12 videos per month, but the producer does not fulfill their obligations).

Different levels of video subscription plans demarcate different levels of quality and options for consumption. The levels and options include consuming media in a streamed, delivered or on-demand manner and varying amounts of advertising. At the lowest level users 12 have limited access to streamed content, which is supported entirely by advertising. There is no subscription fee for this package. The uppermost plan removes all advertising from programs and delivers DVD-quality video to the PC, which can be viewed on a TV.

Instead of going through an explicit process of creating separate subscriptions, publishers are given the option of enabling a subscription from a line-up. These subscriptions would prohibit access to the full length videos within the line-up unless the user 12 has the proper entitlement. The user 12 could still access the previews associated with each video title of the line-up. If the publisher 22 adds or removes a title from a line-up, then the consumer's set of entitlements to the titles change.

For example, the user 12 is presented with two line-ups: "WWII" and "Battle of the Bulge". The WWII line-up requires a subscription and includes the complete World War II video collection. The publisher 22 wishes to highlight certain videos related to the Battle of the Bulge that are available within the WWII subscription. The publisher 22 creates a promotional Battle of the Bulge line-up that has no associated economics; it is used purely as a vehicle to highlight a selection of videos. When a new user 12 selects a video in the Bulge line-up the service recognizes that they have no entitlements. The service platform 30 recognizes that this title is offered through the WWII subscription and the user 12 is presented with the offer to purchase the subscription.

In another example, the publisher 22 has created both "WWII" and "History of America" line-up subscriptions with some video title overlap. One of these titles, about the death of FDR, is also available for rent. If a user 12 looks at the FDR title, contained in a promotional line-up highlighting the 1940s, they are presented with the option of purchasing either subscription or rent the individual title.

In a further example, the publisher 22 or an affiliate 24 creates a promotional line-up that includes a mix of pay-media and ad-supported video titles. Likewise a user 12 creates and shares their own line-up that mixes a similar set of videos.

2. Rentals

Some video programs are not packaged into a subscription, but users 12 can rent these items. Users 12 are given a chance to rent a program for a limited period of time and/or viewings.

3. Purchases

Users 12 have the option of purchasing the program, which entitles them to an extra set of privileges (e.g., lifetime viewing, burn to DVD, etc.). Users 12 build a personal video library by self-assembling subscription packages and individual downloads.

4. Bundles

Similar to subscriptions built from line-ups, a publisher has the option of creating a product bundle from a line-up. The publisher 22 can set a rental and purchase price. These prices would override any per video title pricing established. When the user 12 purchases the line-up they are granted the entitlements for the video titles at the time of purchase. A consumer's set of entitlements would not change based on any modifications to a line-up after the time of purchase.

A publisher 22 can also authorize dynamic bundles in which the publisher 22 bases the prices of user 12 subscriptions on volume of usage. As the number of subscribers for a particular service increases, the future price of the service is lowered. Video titles or subscriptions managed by publishers can be aggregated by a user 12, affiliate 24 or any third-party to form a custom-selected subscription. Each these items are subject to a pre-set (by the publisher) volume discount based on volume of usage by all users 12 of those items. The usage and therefore the discounts are tracked, payments are collected, and funds are remitted to publishers, the system operator, and other parties. The cost of the user 12's custom-selected subscription is variable depending on the discounts that end up applying to the streams that are part of the subscription. If discounts produce a lower cost, the reduction is automatically passed on to the user 12.

If the costs go up because of reduced usage, the customer could terminate their custom subscription, or agree to pay more, or encouraged to adjust the mix of items in their subscription, for example. The custom-aggregating could also be done by an affiliate on behalf of a community of users 12. Any affiliate that promotes and closes a transaction for a dynamically bundled subscription will receive their appropriate revenue share.

The service provides a dynamic pricing and bundling engine for independent sellers, in which a consumer can purchase a bundle across publishers, and publishers participate in a dynamic pricing approach that ensures high perceived value for the consumer and a fair share of revenue for each publisher in the bundle.

5. Pricing and Payment

A publisher 22 determines acceptable prices for all pay-media packaged content items 23. For example, an independent producer filming his friends snowboarding, given their production costs, can afford a lower price, than, for example, ESPN delivering the a packaged content item 23 focused on the Winter X Games. When choosing a video title or lineup the user 12 is shown the cost for any available economic terms (i.e. rental, pay-to-own, subscription, advertising, etc.).

When paying for a product, users 12 are required to provide payment account information such as a credit card or PayPal account that is used to authorize and debit purchases. With an account on file, users 12 can purchase items without having to place items into a "shopping cart" and go through a formal purchase process.

a. Demand Curve Model

The publisher 22 can set the price of a package according a demand curve model. In the demand curve model, a publisher 22 is able to easily promote content using multiple pricing models that are linked to characteristics of different users 12 (most notably the interest of the user 12 in particular topics, the user's impression of the quality of the publisher, etc.) The publisher 22 defines different pricing models (rental, purchase, subscription, advertising, etc) and defines the context in which each might be offered.

When a user 12 wishes to share access to content, the multimedia player prompts the user 12 to share the content by having them provide the correct information to contact the target user 12. For example the user 12 may provide an email address or Instant Message handle for a friend or family member. The service platform 30 determines whether the email address is registered to an existing user 12 account. If so, the service platform determines the rights of the target consumer to use the content (for example, as a buyer or renter)

and delivers the content to the target consumer (by means of a link embedded in an email) accordingly.

For a non-registered user 12, the service platform 30 delivers to the target user 12 a promotional message and a packaging model (e.g. advertising or rental) that is chosen to optimize the customer experience and the publisher's revenue. For example, if the packaged content item 23 is available only for purchase, the service platform 30 may send a message that includes a link to preview the packaged content item 23 with instructions for purchasing. The service platform 30 tailors the viewer experience according to economic models that the publisher 22 has established.

B. Publisher Pays

In a publisher pays business model, the publisher 22 distributes content without advertising and without requiring user 12 payment and pays the service provider for assisting in the distribution of the content. The publisher pays a predetermined fee based on usage.

1. Listing Fees

Listing fees are paid by publishers who sell and operate using the online service. The primary listing fees include: delivery and distribution of content; per video product listed per month, with a pricing scale that discounts on volume; feature-based listing fees, such as placement in a category top-level screen, within the service search results, or for use of advanced features such as automated video content indexing, video comments, etc.; value-added services, where publishers purchase outsourced services from the service on a cost-plus basis, including post-production, encoding and content ingestion services; search engine keyword campaigns; professional design services for branding; and free content listings. In this model, all of the revenue collected for listing and value-added services fees are retained by the service.

After uploading and provisioning videos into the service, a publisher can specify that the video is available for free to users 12. The service monitors the usage of the video and invoices the publisher 22. The service tracks all of the video delivered, and based on the pricing and credit terms either invoices or automatically debits an account on file on a periodic schedule. Publishers are able to get a report that shows them the total number of videos minutes streamed or titles downloaded. These reports show a breakdown of usage based on time and title. Publishers are able to set limit caps on the total number of video minutes served and videos downloaded by title and overall per month for the account. They also may get notification if caps are being approached and set rules for what happens when a cap is reached (no more video served or notification sent). At any time a publisher may deactivate free access to immediately change any established policies that grant access to the streaming video.

Publishers may also specify that all the videos within a line-up are free to users 12. In this situation, free access applies when the title is accessed in the context of the free line-up. For example, if a consumer was to access the title without reference to the line-up then the consumer's access would be restricted to the default economics associated with the title. Users 12 are given an option of subscribing to free line-ups.

As an example, a title named "Lions of Africa" has default economics of a $2.99 rental; the publisher includes "Lions of Africa" within a promotional line-up called "Adventures in Africa" and marks the line-up as publisher pays; the publisher 22 offers the line-up exclusively through a travel oriented web affiliate partner; the title is only available for rent through the publisher's player; if a user 12 comes to the publisher's player, the user 12 can rent the title for $2.99; if a user 12 discovers the travel affiliate 24, the user 12 can watch the same video free of charge (through publisher pays); the user 12 saves a reference to the "Adventures in Africa" line-up. The user 12 can continue to watch "Lions of Africa" because the context of the line-up is preserved. The user 12 creates a personal line-up ("Future Vacation Ideas") and includes the video title "Lions of Africa". When the user 12 watches "Lions of Africa", through their personal line-up, the service verifies their free access because of the active "Adventures in Africa" line-up. If the publisher 22 were to deactivate the line-up "Adventures in Africa" then the user 12 would no longer have free access. The service would need to inform the user 12 that the title is now only available for rent.

2. Activation

When a publisher 22 activates publisher pays economics for any video or line-up, the service checks to determine if a valid publisher invoicing account is on file. If a valid account is not on file, the system prompts the publisher 22 to provide a credit card or arrange for a purchase order. A publisher 22 cannot offer a publisher pays video until a valid payment instrument (e.g., a credit card) is available. With free access activated, the publisher 22 may choose from several sub-options that refine the requirements for consumer access, as follows.

3. User Access

In one mode, all users 12 have complete and unconstrained access. The service monitors all usage of the video stream and invoices the publisher by tracking: the publisher ID, affiliate ID, and video ID. This data is periodically summarized and placed into a database table that captures per publisher usage charges. The summarized publisher data includes: publisher ID, video ID, total minutes, and total charge. The service's publisher invoicing system aggregates these records into invoice line items, which are eventually netted against any revenue owed the publisher 22.

From the same data a separate summary table is populated with the associated affiliate usage including: affiliate ID, video ID, total minutes, and total revenue. Based on this information, a modest affiliate margin is rolled into the publisher invoice, and the affiliate 24 is compensated for the distribution of content through their presentation context 15.

Publishers can define per month usage caps for individual titles, in aggregate for a line-up, and in aggregate across all titles and line-ups. For each of these three levels publishers can specify a "warning threshold". The threshold value can be specified either in hours or as a monetary unit. When the system recognizes that the warning threshold has been first exceeded then the system sends the publisher a notification.

In some uses, the user 12 must supply some information before access to the video stream is granted. In this mode, the publisher 22 can specify the following meta-data: name (required; unique per publisher); short description (optional); thumbnail (optional). The name is used for tracking and reporting, and the description and image are presented to the user 12 to help explain the reason for the information request.

The publisher 22 can specify the time code where the gate is introduced. For example, a publisher could specify that the video is interrupted 30 seconds or perhaps 5 minutes into the program. The publisher can manually enter the time code. The publisher selects the categories of information they require for example: name (first+last); email address; mailing address (street+city+state+zip); phone number (area code+3 digits+4 digits). At the designated time code, the player pauses the video and transitions to the form.

The player presents two user 12 actions: send and cancel. If the viewer hits "send" they are thanked for their submission and the player transitions and starts playing the video from the point where it was paused. If the user 12 hits the "cancel" button, the video is stopped and the video title is brought to the "initial state" (e.g., video still image shown). If the user 12 attempts to play the video again, the player pauses the video at the same time code breakpoint.

On submission of the collected data, the service records the following data elements: publisher ID; affiliate ID; player ID; submission date; "gateway name"; first name; last name; email address; street address; city; state; zip code; phone number. Publishers are able to access this collected data from within the publishing console.

4. Usage Reports

Publishers have access to usage reports every day. The publisher console 20 presents some basic reports on publisher pays usage. The report data are presented across a number of different time slices (e.g., per day, per week, per month, per month for the quarter, per month for the year, etc) and can highlight, for example, top 20 publisher pays video titles (by total minutes); top 20 publisher pays video titles (by start play events); current total invoice amount; and aggregate usage over time with visual indicator of warning threshold.

The service provides specific reports that provide detailed usage and invoice data associated with each packaged content item. Publishers are able to specify specific criteria for the output of the report (i.e. date period, title ID or name), for example period start (date); period end (date); video title ID; video title name; view accesses per title; view time (hours: minutes) per title; average view time per title access; and total charge per title C. Advertising Supported Content Publishers are offered the option to include their content in the service-managed pool of free video content supported by rich media advertising. Publishers provide the service with relevant demographic and content meta-data associated with their content and are able to choose the number and format of ad insertions associated with their content. Advertisement insertions are part of a pool of advertising inventory that the service sells. In some embodiments, advertisers provide the service with service-compatible rich media ad formats based on Macromedia Flash and Flash Video. Advertisers purchase inventory on a blended cost based on impressions and performance. The service delivers the rich media advertising in-context with the video, and contextually matches the consumer, content and advertising on a personalized basis. Revenue generated from the advertising presented to the users 12 is shared amongst the publisher, affiliates and service operator.

D. Affiliate Pays

In an affiliate pays business model, the publisher 22 grants access to their packaged content items 23 to affiliates. The service tracks all of the packaged content items 23 delivered, and based on the pricing and credit terms either invoices or automatically debits an account on file on a periodic schedule. Affiliates 24 are able to get a report that shows them the total number of videos minutes streamed or titles downloaded. These reports show a breakdown of usage based on time and title. Affiliates 24 are able to set limit caps on the total number of video minutes served and videos downloaded by title and overall per month for the account. They also may get notification if caps are being approached and set rules for what happens when a cap is reached (no more video served or notification sent). At any time an affiliate 24 may stop distributing content provided by a publisher 22.

1. Syndication Fees

For the benefit of having the ability to distribute content through their presentation context 15, the affiliate agrees to pay a syndication fee. This syndication fee can be brokered and collected by the service platform 30, a portion of which can then be shared with the publisher 22. The affiliate pays a pre-determined fee based on usage.

2. User Access

In one mode, all users 12 have complete and unconstrained access. The service monitors all usage of the video stream and invoices the affiliate by tracking: the publisher ID, affiliate ID, and video ID. This data is periodically summarized and placed into a database table that captures affiliate usage charges. The summarized data includes: affiliate ID, video ID, total minutes, and total charge. The service's affiliate invoicing system aggregates these records into invoice line items, which are eventually netted against any revenue owed the affiliate 24.

From the same data a separate summary table is populated with the associated revenue owed a publisher 22, including: publisher ID, video ID, total minutes, and total revenue.

Affiliates 24 can define per month usage caps for individual titles, in aggregate for a line-up, and in aggregate across all titles and line-ups. For each of these three levels affiliates can specify a "warning threshold". The threshold value can be specified either in hours or as a monetary unit. When the system recognizes that the warning threshold has been first exceeded then the system sends the publisher 22 a notification.

In some uses, the user 12 must supply some information before access to the video stream is granted. In this mode, the affiliate can specify the following meta-data: name (required; unique per affiliate); short description (optional); thumbnail (optional). The name is used for tracking and reporting, and the description and image are presented to the user 12 to help explain the reason for the information request.

The affiliate 22 can specify the time code where the gate is introduced. For example, an affiliate could specify that the video is interrupted 30 seconds or perhaps 5 minutes into the program. The affiliate can manually enter the time code. The affiliate selects the categories of information they require for example: name (first+last); email address; mailing address (street+city+state+zip); phone number (area code+3 digits+4 digits). At the designated time code, the player pauses the video and transitions to the form.

The player presents two user 12 actions: send and cancel. If the viewer hits "send" they are thanked for their submission and the player transitions and starts playing the video from the point where it was paused. If the user 12 hits the "cancel" button, the video is stopped and the video title is brought to the "initial state" (e.g., video still image shown). If the user 12 attempts to play the video again, the player pauses the video at the same time code breakpoint.

On submission of the collected data, the service records the following data elements: affiliate ID; player ID; submission date; "gateway name"; first name; last name; email address; street address; city; state; zip code; phone number. Affiliates 24 are able to access this collected data from within the affiliate console.

3. Usage Reports

Affiliates 24 have access to usage reports every day. The affiliate console 28 presents some basic reports on affiliate pays usage. The report data are presented across a number of different time slices (e.g., per day, per week, per month, per month for the quarter, per month for the year, etc) and can highlight, for example, top 20 affiliate pays video titles (by total minutes); top 20 affiliate pays video titles (by start play events); current total invoice amount; and aggregate usage over time with visual indicator of warning threshold.

The service provides specific reports that provide detailed usage and invoice data associated with each packaged content item. Affiliates 24 are able to specify specific criteria for the output of the report (i.e. date period, title ID or name), for example period start (date); period end (date); video title ID; video title name; view accesses per title; view time (hours: minutes) per title; average view time per title access; and total charge per title III. Business Models The service platform 30 manages the flow of money in accordance with the applicable business model. The sources of revenue in the business models can include publishers, affiliates, advertisers, and users 12. The revenue is distributed to publishers, affiliates, and the system operator.

A. Open Marketplace

An open marketplace provides a publishing, selling, marketing and user 12 experience platform for rights-holders and both a distributed and centralized end-consumer experience. The content distributor 31 may operate one or more open marketplaces as a retail environment that acts a distribution channel for the packaged content items 23 provisioned by the publishers 22. The content distributor 31 may promote and offer for sale a selection of packaged content items 23 from across a range of publishers.

B. Federated Marketplace

The service's federated deployment approach enables publishers to develop and offer their own co-branded, direct selling and viewer experience environment for their video titles and lineups, and to be reached through the service's consumer service, as well as generally through Internet search engines, weblogs, and affiliates. The service allows publishers to create syndication and distribution partners who participate via co-branded affiliate marketing agreements, enabling both "wholesale" and "retail" selling approaches.

1. Federated Delivery

Federated delivery is made possible through a combination of viewer experiences, their players and Web Services. Web Services enables remote websites and applications to access data, business logic and content from the service platform 30. A player enables websites to embed a reference to a Macromedia Flash application that is actually delivered from the service platform's servers, but creating the illusion that the content is delivered directly from the containing website. In addition, third-party developed Flash applications can include shared libraries, components and delivered media from remote servers and services.

Examples of federated delivery include: a publisher 20 using the service to offer their video products through a marketing page created on their own website that offers previews of their video products; a publisher 20 using the service to offer a full viewing experience of their video within their own branded destination; an affiliate 24 embedding a promotion and preview of a video in their website; and a user 12 maintaining a weblog or "blog" linked to a specific video clip and embedding the experience in their own website. In addition to user 12 policy enforcement, the federated delivery service provides policy enforcement for publisher and affiliate remote service usage.

2. Federated Identity

The service uses the single sign-on or "federated identity" approach to allow consumer authentication to happen seamlessly as users 12 move between the service and its affiliate's and publisher's sites. This is accomplished with the federated identity protocols SAML or "Security Assertion Markup Language and Liberty". SAML is an XML-based framework that allows organizations in a trusted network to exchange authentication and authorization information. Using these standards provides many benefits. Users 12 can access any site in the trusted network using a single login. Users 12 are seamlessly signed-on when navigating to a partner site. Users 12 can perform a single, global logout. The logout event performs a synchronized session logout across all sessions authenticated by the initial authentication provider. Users 12 are provided with a federated identity. Their single login grants them access to multiple sites without requiring that their user 12 information to be stored in a central location. The service enables user 12 profile information to be dynamically provisioned into the service from a pre-existing account.

3. Affiliate Relationships

Individual users 12 and companies are given the opportunity to register as members of an affiliate network. Affiliates are encouraged to promote content external to the service website and applications. Content publishers can automatically be enrolled into the affiliate program and is encouraged to promote the content they provision into the service platform 30. An "internal" affiliate program may extend the affiliate compensation model to users 12 of the marketplace that create and promote personal video lineups. Users 12 might receive a percentage of the revenue associated with the internal recommendation.

In the federation model, the presentation aperture 13 in the affiliate web page serves as a "store front" at which a user 12 can directly and immediately watch, buy, rent, or subscribe to content (or any other product, for that matter). By contrast, in a conventional model, the affiliate sites have links that funnel users 12 to a central retail site and the sale is actually made at the linked retail site. In the federation model, when the user 12 spends money at the affiliate store front, the consumer transaction occurs through the affiliate 24 presentation context 15. The federation model makes it easier to convert users 12 into customers by allowing users 12 to watch or purchase products within the context of their current destination. The affiliate 24 also receives a cut of revenue from advertising that is part of the viewer experience. The terms of the deal between the publisher 22 and the affiliate 24 may be determined by interaction through the affiliate console 28 and the publisher console 20.

a. Affiliate Application

Any website owner can sign-up to be an affiliate of the service. To do this, they must provide detailed information about their business and website, agree to the terms of service, provide the service with appropriate payment information (e.g. PayPal account), and allow the service to properly review their credentials. As part of sign-up, the service would gather demographic and content information about their site, and possibly recommend packaged content items 23 from a variety of publishers.

The affiliate console 28 includes tools for browsing a set of publisher packaged offers, service packaged offers, or creating their own lineups from the content library 32 using tools provided by the service. Once a request for a title or lineup is made that requires publisher approval, a message is sent to the publisher and that title is marked 'pending' for the affiliate until it's approved. Once the affiliate 24 has defined a lineup, they can match it to an affiliate player, unless it is a prepackaged player, in which case they can provide whatever custom branding elements are allowed. In the other case, they would customize the player brand as allowed, and then integrate to their website using a presentation content code 19 provided by the service operator 30. The affiliate console 28 would also provide a reports dashboard that allowed them to view usage, revenue and payments reporting. The console would include links and references to Affiliate help and FAQ content, as well as submitting customer service requests.

b. Affiliate Access Control

Publishers have the ability to grant and restrict access to video titles, line-ups and viewer experiences for affiliates. Publishers may want to provide specific line-ups or viewer experiences to specific affiliates. From the affiliate console 28, an affiliate is able to see the titles, line-ups or viewer experiences that are available to them from each publisher.

c. Affiliate Transactions and Payment

The system tracks all transactions that result from affiliates. The two types of affiliate sales (direct and indirect) have different commission structures. There are two types of affiliate sales: direct and indirect. Direct affiliate sales occur within a Player embedded in an affiliate website or from the result of a referral that results in the immediate transaction of a pay-media product. Indirect sales are sales resulting from general referrals that do not drive transactions for specific products. Affiliates have a single active billing account that is credited based on aggregated referral revenue during the specified pay period.

Publishers may offer their titles or lineups as packages from which the affiliate may choose to pay for the costs of distribution, delivery and usage of the packages. The service operator 30 collects payments from the affiliate from which the service operator 30 provides the publisher with any revenue based on the usage of the packages.

The affiliate model enables content publishers to work with online sites and services to easily market, promote and distribute their video content. The broad goals and assumptions for the affiliate services are: enable publishers to reach targeted and niche audiences by enabling website operators focused on those niches to market and distribute their content; facilitate powerful forms of distributed editorial and content programming that increase the value and relevance of content to audiences; provide publishers with mechanisms to easily package affiliate offers, and combine pre-sold advertising and brand sponsorship for these packages; provide economic uplift and network effects by giving millions of websites a chance to participate in the economics of television distribution, and add broadband content to their sites; generate network-wide scale for service-enabled advertisers, enabling high-quality targeting and broad reach; enable both publishers and affiliates to operate within an entirely self-service system.

d. Affiliate Distribution

Broadly speaking, there are two approaches to affiliate distribution: publisher packaged and affiliate packaged. The publisher packaged approach is centered on publishers defining specific packages of content that they would like to make available to the service affiliate network. It is characterized by publishers having fine-grained control over the branding and programming in their package, and the specific affiliates who can use the content The affiliate packaged approach is centered on affiliates defining specific packages of content they would like to promote and syndicate, built from a broad-based library of content available in the service. It is characterized by affiliates having fine-grained control over the content they want to promote, or even by having service dynamically create line-ups for their sites based on automated recommendations.

The service affiliate network enables hundreds of thousands of website operators to easily gain access to a massive inventory/library of relevant video content for their websites, and to easily promote and syndicate the content into their sites. In this model, affiliates more freely create lineups of the library of service content, and offer that via affiliate branded players.

e. User Experience and Branding

Publisher control over the branding of the affiliate experience is enabled by a range of 'Affiliate Player' templates. The publisher 22 can deeply brand the player container. The publisher 22 can define multiple affiliate players based on the type of affiliate and the package of content. For example, a content source may create a specific 'affiliate player' for a WWII package and within that create an affiliate player that is geared towards teaser/promotional content with some free, ad-supported products, and one that is a full pay media package view into the WWII library, and yet another that is simply a previews & links player that drives the users 12 back to their own website to purchase the subscription product.

Packages support both 'promotional players' (e.g., marketing links, with link referral mechanism) and syndicated content players (e.g., where full content is viewed in affiliate website). Players also support Affiliate co-branding—e.g., affiliate has ability to provide one or more brand assets that match the template and incorporate their own branding into the experience. A publisher 22 could optionally allow the affiliate to set colors and styles to match their website.

4. Revenue Sharing

The service collected revenues may be shared and distributed. Gross revenues from pay and advertising revenue may be shared between an affiliate 24, a publisher 22, and the service operator. Any website owner can become an affiliate of the service in a self-service manner. Leads and transactions are tracked from the affiliate through the service or a federated service co-branded with the service. In some embodiments, affiliates receive 10-15% of gross revenue.

After affiliate deductions, the publisher 22 receives a portion of the revenue. In some embodiments the publisher's portion is approximately 70% of the revenue. The service provides publishers with detailed usage reporting so that publishers can determine any royalties they need to pay associated with their rights. The service is not responsible for paying any royalties associated with publisher rights.

After affiliate and publisher deductions, the service collects the remaining portion of the revenue. In some embodiments, the service collects approximately 30% of the revenue.

As one specific example, suppose that over a 1-year period, a small action sports video publisher offers five (5) 40 minute videos through the service. The publisher packages these videos for rental, for purchase, and as a bundled subscription. The publisher also offers one of the videos for free with advertising, but are doing this primarily as a marketing vehicle to attract users 12 to pay media, as they do not expect sufficient impressions to return their cost of production. The publisher prices rentals at $3, purchases at $10, and an annual bundled subscription to all five videos for $30. The publisher's products are offered through a variety of sports-related affiliates and websites, which drives approximately 50% of the transactions with their content. Over the course of the year, 10,000 users 12 rent at least one video, 3,000 users 12 purchase at least one video, and 1,000 users 12 purchase the bundled subscription. The free product is viewed by 140,000 users 12 over the course of the year. Revenue for this scenario would work as follows: listing fees. $50/month or $600 in annual revenue to the service; gross revenue: rentals=$30,000 annual, purchase=$30,000 annual, subscriptions=$30,000 annual, advertising=$7,000 annual, total=~$100,000; revenue share: total affiliate revenue=$100 k*50%*15%=$7,500; publisher revenue=$92,500*70%=$65,000; the service revenue=$92,500*30%=~$28,000.

When a user 12 purchases content through an affiliate, during the transaction process the multimedia player 16 provides the ID of the affiliate to whom the purchase is to be credited, and a referral type code (direct or indirect, or even some other category). When the invoice is processed and accepted, a payable item is added to the corresponding affiliate's current account, and a separate payable item is added to the corresponding publisher's current account. Note that the addition of the payable item is only done after the customer sales order has been processed. This way, the revenue is secured before paying out to the publisher 22 and the affiliate 24.

IV. Components of the Content Distribution System

The components of the content distribution system 10 can be implemented, at least in part, in digital electronic circuitry, analog electronic circuitry, or in computer hardware, firmware, software, or in combinations of them. The components of the content distribution system 10 can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with content distribution system 10 can be performed by one or more programmable processors executing a computer program to perform functions of the invention by operating on input data and generating an output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one r more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Other embodiments are also within the scope of the following claims.

What is claimed is:

1. A method comprising:
   storing at least one digital content item in a content library, each digital content item having:
   a presentation style in which the digital content item is to be presented to a user, the presentation style comprising features that define a user experience, and
   an access condition, indicative of a condition under which the user may have the digital content item presented;
   storing the presentation style and the access condition for each digital content item in a server;
   enabling a first party that controls a presentation context that is accessible to users to permit inclusion of a presentation content code from a second party in the presentation context, wherein:
   the presentation context comprises a context in which digital content is displayed to the user in digital form, and
   the presentation content code comprises computer code configured to cause a computer to:
   present digital content items to the user within the presentation context, and
   control the presentation of each of the digital content items in accordance with the presentation style and the access condition, and
   paying the first party that controls the presentation context for permitting the inclusion of the presentation content code in the presentation context.

2. The method of claim 1 further comprising delivering the digital content items to the user operating the presentation context in response to receiving the presentation content code.

3. The method of claim 2, wherein the digital content is delivered such that to the user, the digital content appears to be originating directly from the presentation context.

4. The method of claim 1, wherein presentation context control includes:
   obtaining the at least one digital content item from the content library; and
   controlling the presentation context so that it occurs in accordance with at least one of the presentation style and the access condition.

5. The method of claim 1 further comprising obtaining the presentation style and access condition from the server after the user initiates the presentation of the digital content item.

6. A method comprising:
   storing at least one digital content item in a content library, each digital content item having:
   a presentation style in which the digital content item is to be presented to a user, the presentation style comprising features that define a user experience, and
   an access condition, indicative of a condition under which the user may have the digital content item presented;
   storing the presentation style and the access condition for each digital content item in a server;
   enabling a presentation content provider that electronically provides a presentation context to the user, to include with the presentation context a publicly available presentation content code from a code provider, wherein:
   the presentation context comprises a context in which digital content is displayed to the user in digital form, and
   the presentation content code comprises computer code configured to cause a computer to enable a presentation of digital content items that are controlled by one or more offerors, the presentation being made under the access condition and in the presentation style that are defined by the offerors, and
   compensating the presentation content provider for permitting the presentation content code to be included in the presentation context.

7. The method of claim 6 wherein the presentation context includes advertisements that generate advertisement revenue.

8. The method of claim 7 wherein compensating the presentation content provider comprises sharing a portion of the advertisement revenue with the presentation content provider.

9. The method of claim 7 wherein compensating the presentation content provider further comprising sharing, with the presentation content provider, a portion of revenue collected from payments made by the user to receive the digital content items.

10. The method of claim 6, wherein presentation context control includes:
   obtaining the at least one digital content item from the content library; and
   controlling the presentation context so that it occurs in accordance with at least one of the presentation style and the access condition.

11. The method of claim 10 further comprising obtaining the presentation style and access condition from the server after the user initiates the presentation of the digital content item.

* * * * *

UNITED STATES PATENT AND TRADEMARK OFFICE
CERTIFICATE OF CORRECTION

PATENT NO. : 9,292,866 B2  
APPLICATION NO. : 13/051282  
DATED : March 22, 2016  
INVENTOR(S) : Jeremy Allaire and Robert Mason Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1179 days.

Signed and Sealed this  
Fifth Day of July, 2016

Michelle K. Lee  
*Director of the United States Patent and Trademark Office*